US006169865B1

(12) United States Patent
Miyabe et al.

(10) Patent No.: US 6,169,865 B1
(45) Date of Patent: *Jan. 2, 2001

(54) DEVELOPING DEVICE FRAME PROCESS CARTRIDGE AND ELECTROPHOTOGRAPHIC IMAGE FORMING APPARATUS

(75) Inventors: Shigeo Miyabe, Numazu; Yoshiya Nomura, Toride; Kanji Yokomori, Odawara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/906,094

(22) Filed: Aug. 5, 1997

Related U.S. Application Data

(63) Continuation of application No. 08/687,952, filed on Jul. 26, 1996, now abandoned.

(30) Foreign Application Priority Data

Jul. 31, 1995 (JP) .................................................. 7-215447

(51) Int. Cl.[7] .................................................. G03B 21/00

(52) U.S. Cl. ............................ 399/111; 399/119; 399/25

(58) Field of Search .................................. 399/111, 110, 399/113, 119, 120, 25

(56) References Cited

U.S. PATENT DOCUMENTS 4,803,521 2/1989 Honda ................................ 355/14 R
5,198,860 3/1993 Yamanaka et al. .................. 355/246
5,331,378 7/1994 Baker et al. ......................... 355/210

FOREIGN PATENT DOCUMENTS 0 586 042 3/1994 (EP) .
0 679 963 11/1995 (EP) .
0 679 964 11/1995 (EP) .
0 708 387 4/1996 (EP) .
2-163761 * 6/1990 (JP) .
6-130745 5/1994 (JP) .

OTHER PUBLICATIONS

Patent Abstracts of Japan, vol. 009, No. 265 (P–399), Oct. 23, 1985, relating to JP–A–60 114870, Jun. 21, 1985.

* cited by examiner

*Primary Examiner*—Richard Moses
(74) *Attorney, Agent, or Firm*—Fitzpatrick, Cella, Harper & Scinto

(57) ABSTRACT

A developing device frame usable with a process cartridge detachably mountable to a main assembly of an image forming apparatus, wherein the process cartridge includes an electrophotographic photosensitive member, a developing roller for supplying toner to the electrophotographic photosensitive member to develop a latent image formed on the photosensitive member, a toner accommodating portion for accommodating the toner to be used for development operation of the developing roller, and a stirring member for stirring the toner fed out of the toner accommodating portion, the developing device frame includes a developing roller mounting portion for mounting the developing roller; an antenna member mounting portion for mounting, along a longitudinal direction of the developing roller, an antenna member having a portion opposed to the developing roller and an extension discharging portion extended to a portion not opposed to the developing roller from the opposed portion, wherein the antenna member produces an electric signal to be transmitted to detecting means provided in the main assembly of the electrophotographic image forming apparatus to notify that the process cartridge is mounted to the main assembly of the electrophotographic image forming apparatus.

75 Claims, 31 Drawing Sheets

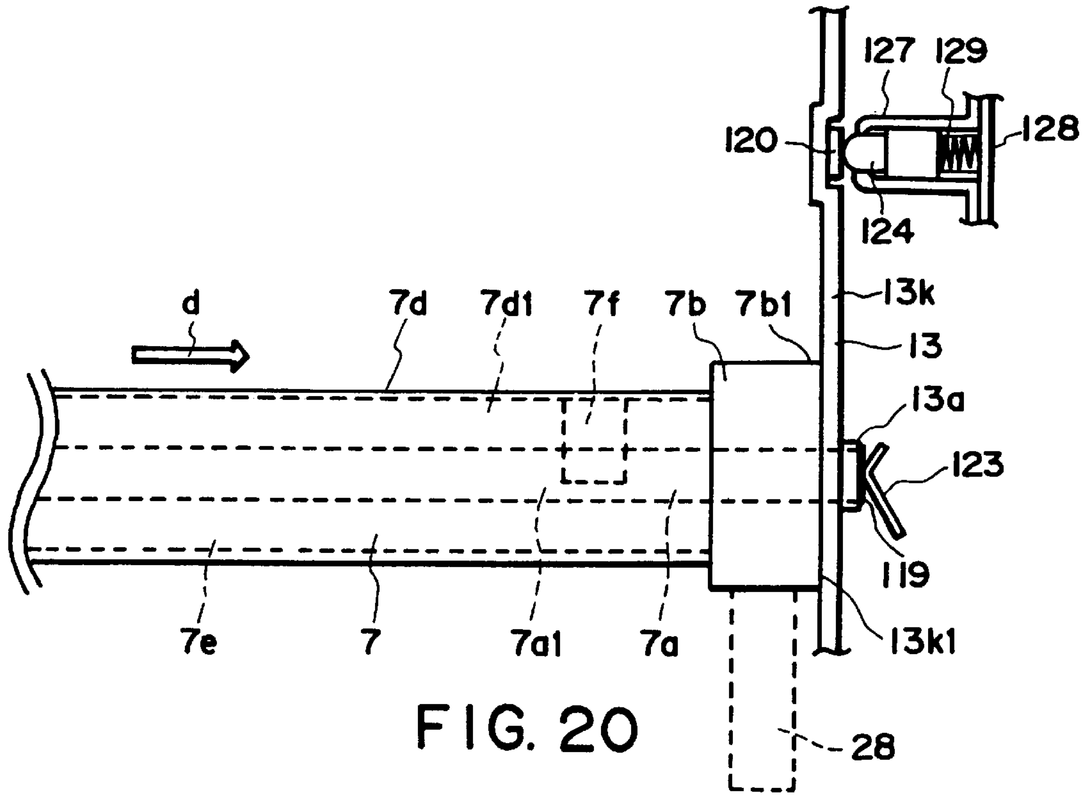
FIG. 20
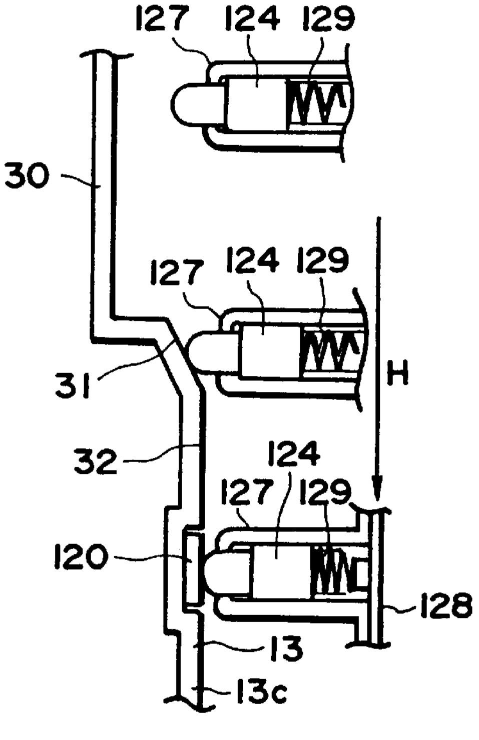
FIG. 21A
FIG. 21B
FIG. 21C

DEVELOPING DEVICE FRAME PROCESS CARTRIDGE AND ELECTROPHOTOGRAPHIC IMAGE FORMING APPARATUS

This application is a continuation of application Ser. No. 08/687,952, filed Jul. 26, 1996, now abandoned.

FIELD OF THE INVENTION AND RELATED ART

The present invention relates to a developing device frame, a process cartridge and an electrophotographic image forming apparatus usable with the process cartridge.

Here, the electrophotographic image forming apparatus means an apparatus which forms images on recording medium, using an electrophotographic image forming process. It includes an electrophotographic copying machine, an electrophotographic printer (for example, LED printer, laser beam printer), an electrophotographic facsimile machine, an electrophotographic word processor, and the like.

The process cartridge means a cartridge having as a unit an electrophotographic photosensitive member, and charging means, developing means and cleaning means, which is detachably mountable to a main assembly of an image forming apparatus. It may include as a unit an electrophotographic photosensitive member and at least one of charging means, developing means and cleaning means. It may include as a unit developing means and an electrophotographic photosensitive member.

An image forming apparatus using electrophotographic process is known which is used with the process cartridge. This is advantageous in that the maintenance operation can be, in effect, carried out by the users thereof without expert service persons, and therefore, the operativity can be remarkably improved. Therefore, this type is now widely used.

The process cartridge is constituted by a cleaning unit having integral charging means, cleaning means and photosensitive drum, and a developing unit having integral developing means and toner container for supplying toner to the developing means. The process cartridge is provided by coupling the cleaning unit and the developing unit with a coupling member.

Here, the developing unit comprises a toner frame for accommodating the toner to be supplied to the developing means, and a developing device frame for supporting the developing means. The toner frame and the developing device frame are unified by ultrasonic welding or the like.

To the developing frame, developing roller and developing blade for charging the toner on the developing roller, which are extended in the longitudinal direction, are mounted.

It is desired to mount the parts to the developing device frame efficiently.

Thus, the present invention was made to further develop the aforementioned art.

SUMMARY OF THE INVENTION

Accordingly, it is a principal object of the present invention to provide a developing frame process cartridge and an electrophotographic image forming apparatus wherein parts are efficiently mounted to a developing frame.

It is another object of the present invention to provide a developing frame, process cartridge and an electrophotographic image forming apparatus, which are easy to assemble.

It is a further object of the present invention to provide a developing device frame, process cartridge and electrophotographic image forming apparatus, wherein an antenna member is mountable to produce an electric signal to be transmitted to detecting means provided in the main assembly of the electrophotographic image forming apparatus in order to notify the mounting of the process cartridge to the main assembly of the electrophotographic image forming apparatus.

It is a further object of the present invention to provide a developing device frame, process cartridge and an electrophotographic image forming apparatus, which has a gear mounting portion for mounting a gear for transmitting, to the stirring member, driving force for rotating a stirring member, wherein the gear mounting portion is mounted in the same side where an extension discharging portion of the antenna member mounted to the antenna member mounting portion is located, in the longitudinal direction of the developing device frame.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 20 shows contact between a contact member and a contact point.

FIGS. 21A, 21B, and 21C show contact between a contact member and a contact point.

DETAILED DESCRIPTION OF THE PRESENT INVENTION

Figure 1:
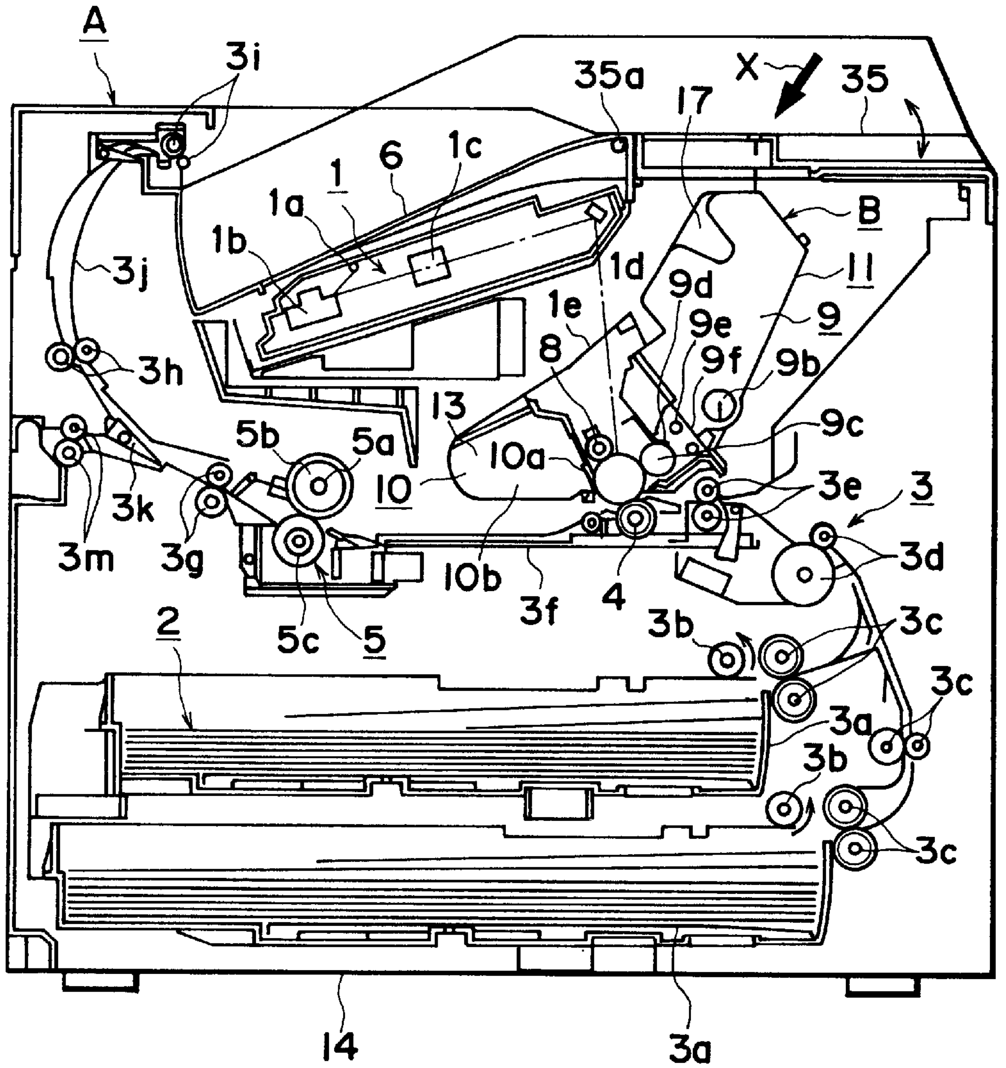
FIG. 1 is a side sectional view of an electrophotographic image forming apparatus according to a first embodiment of the present invention.
Figure 2:
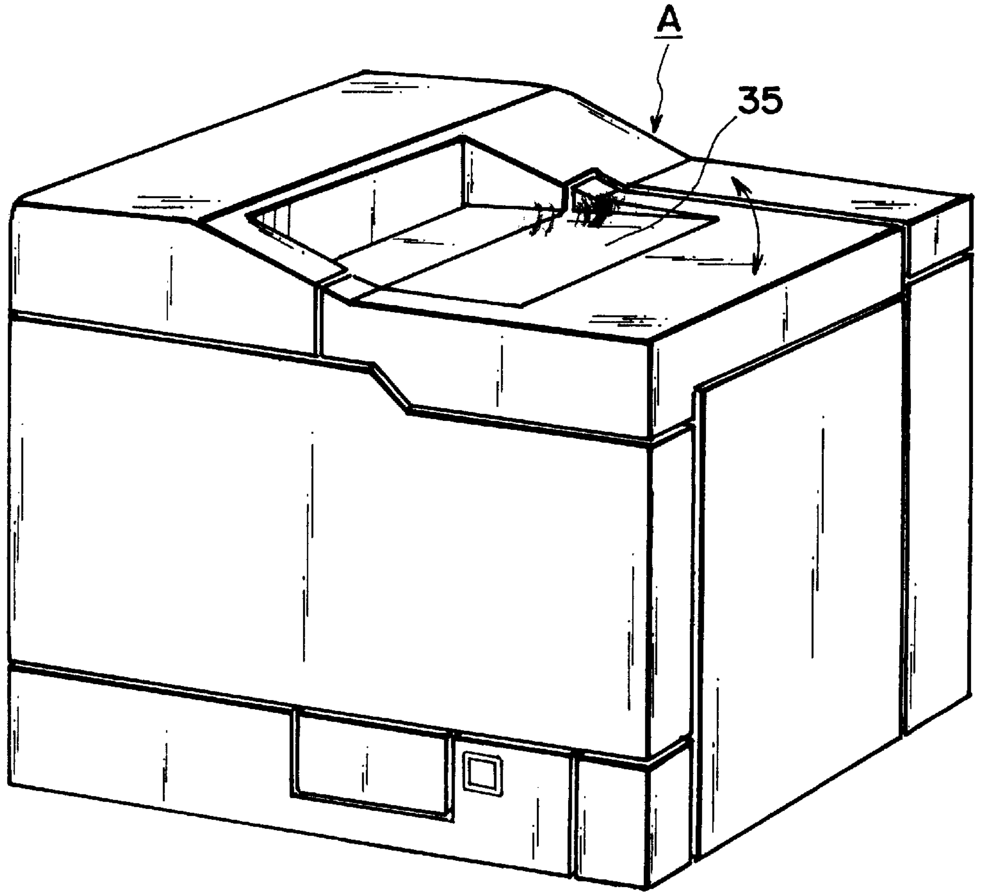
FIG. 2 show an outer appearance of the apparatus of FIG. 1.
Figure 3:
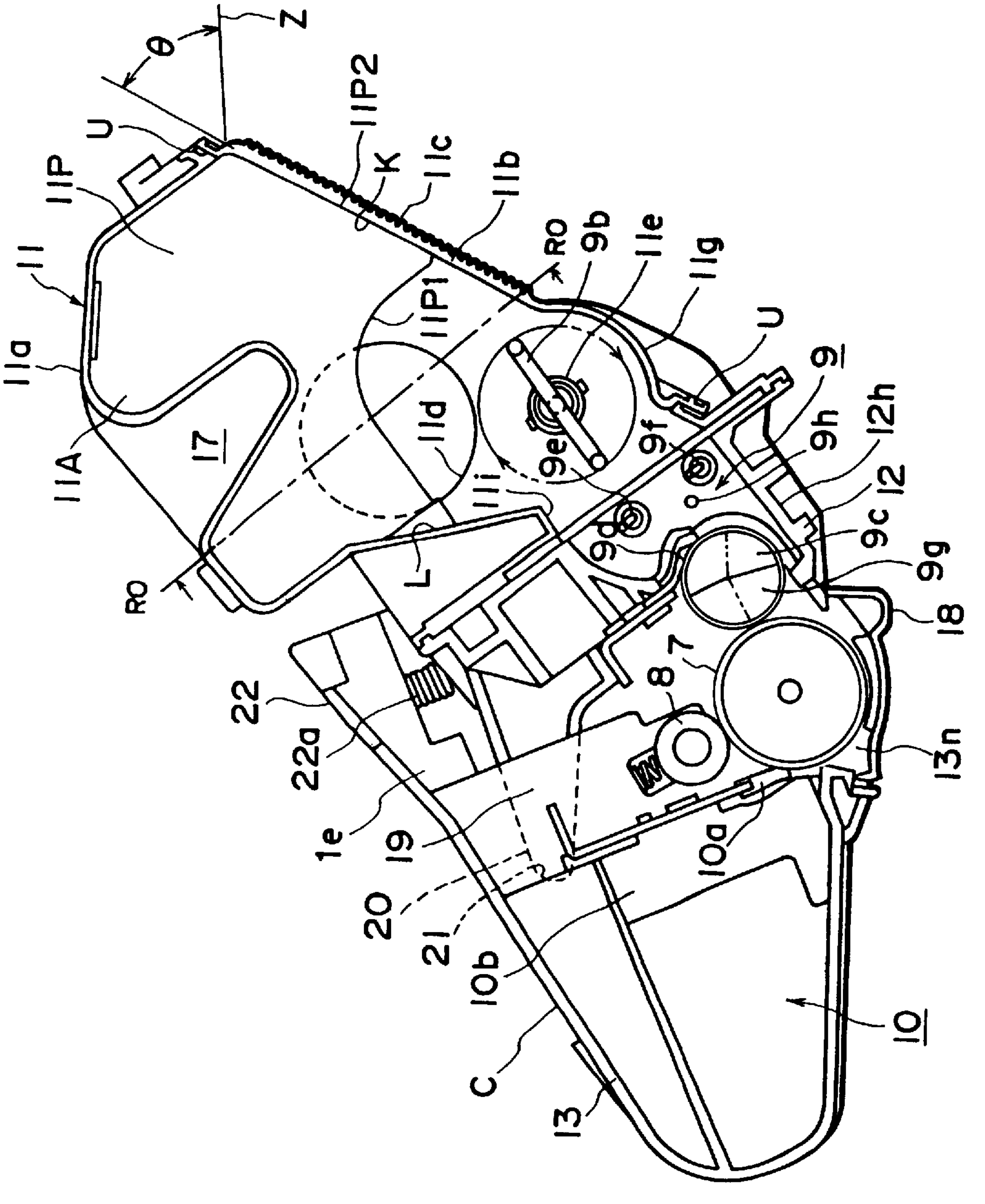
FIG. 3 is a side sectional view of a process cartridge according to an embodiment of the present invention.
Figure 4:
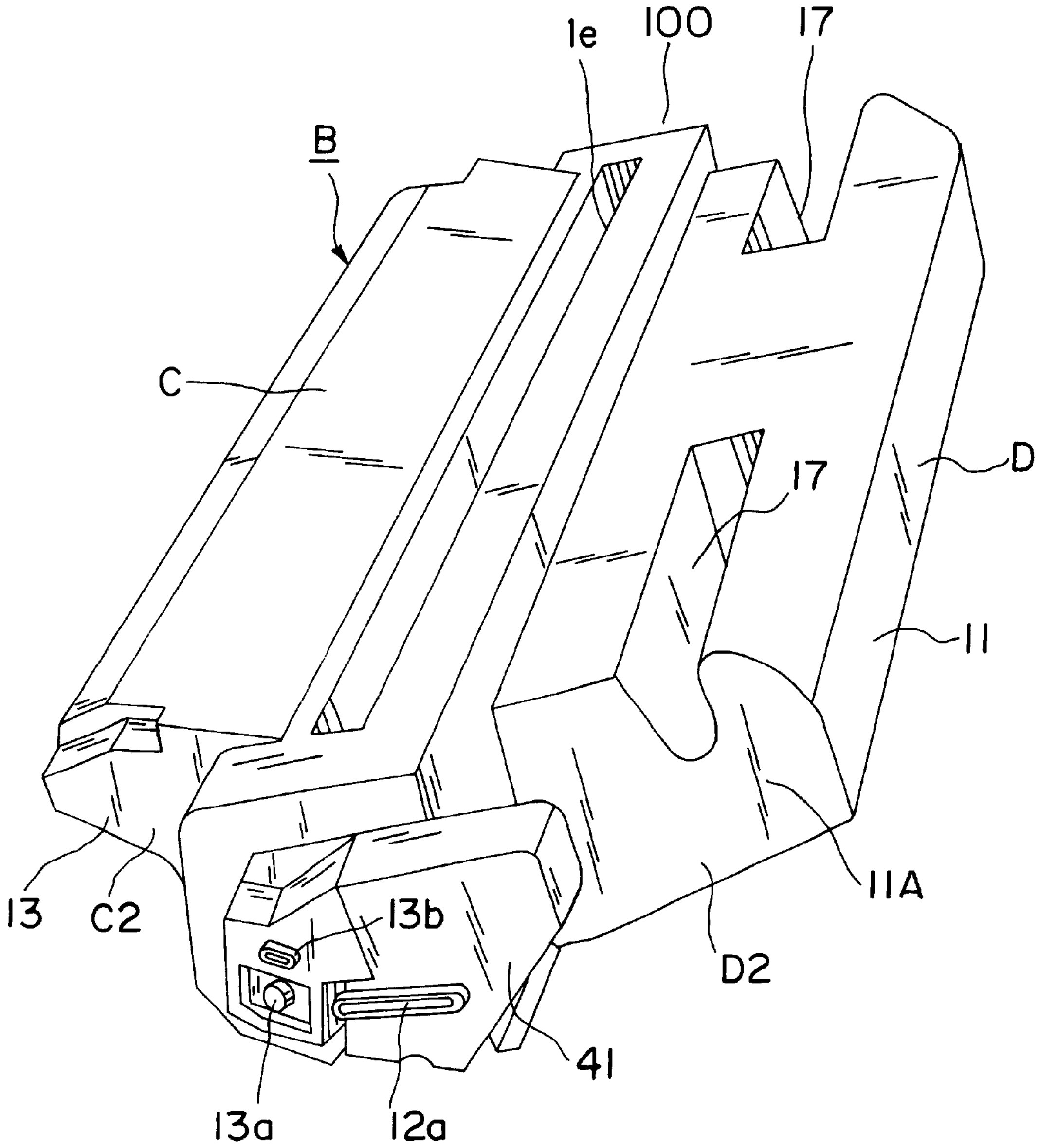
FIG. 4 shows a schematic outer appearance of the process cartridge of FIG. 3.
Figure 5:
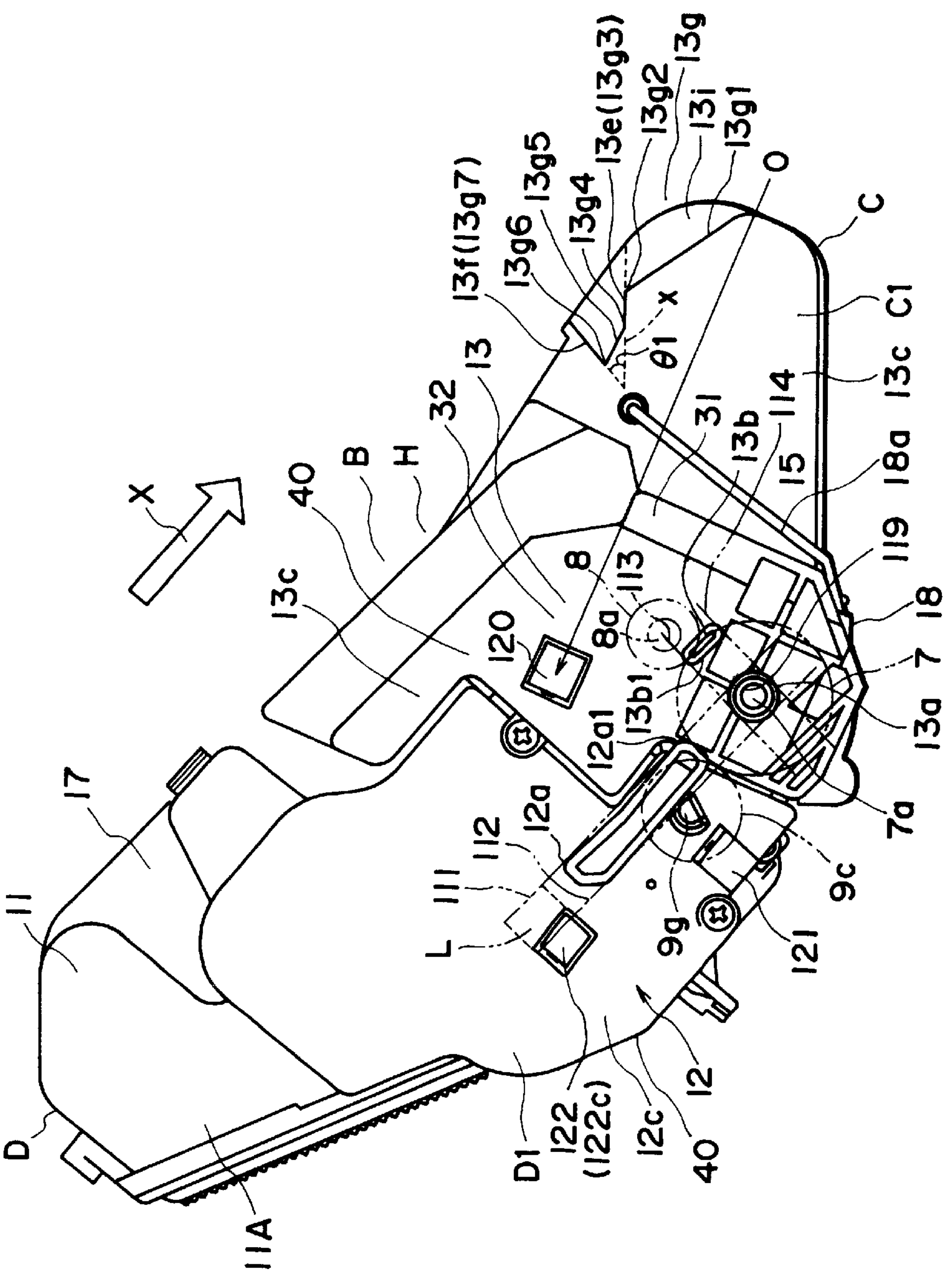
FIG. 5 is a right side view of the process cartridge of FIG. 3.
Figure 6:
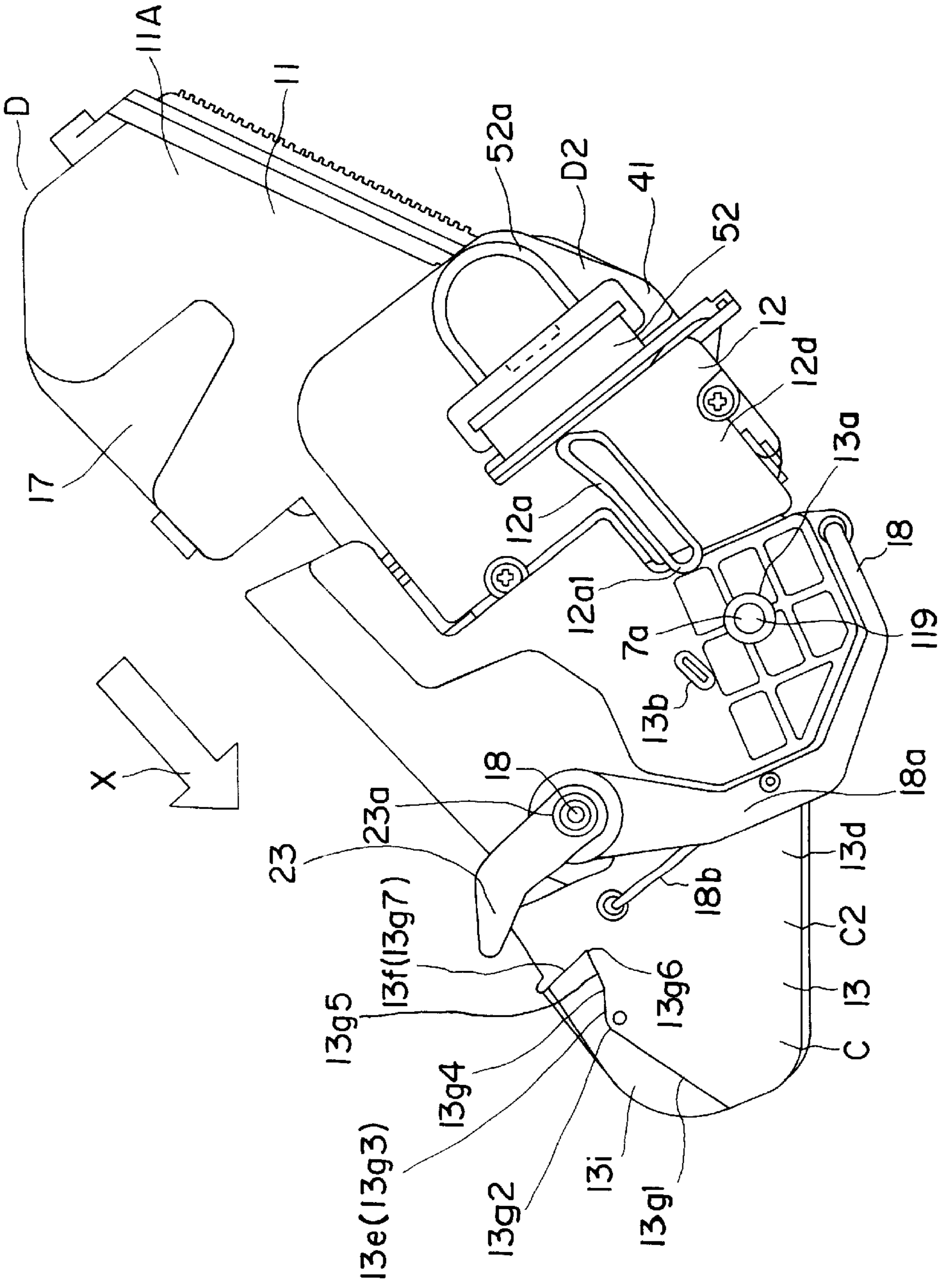
FIG. 6 is a left side view of the process cartridge of FIG. 3.
Figure 7:
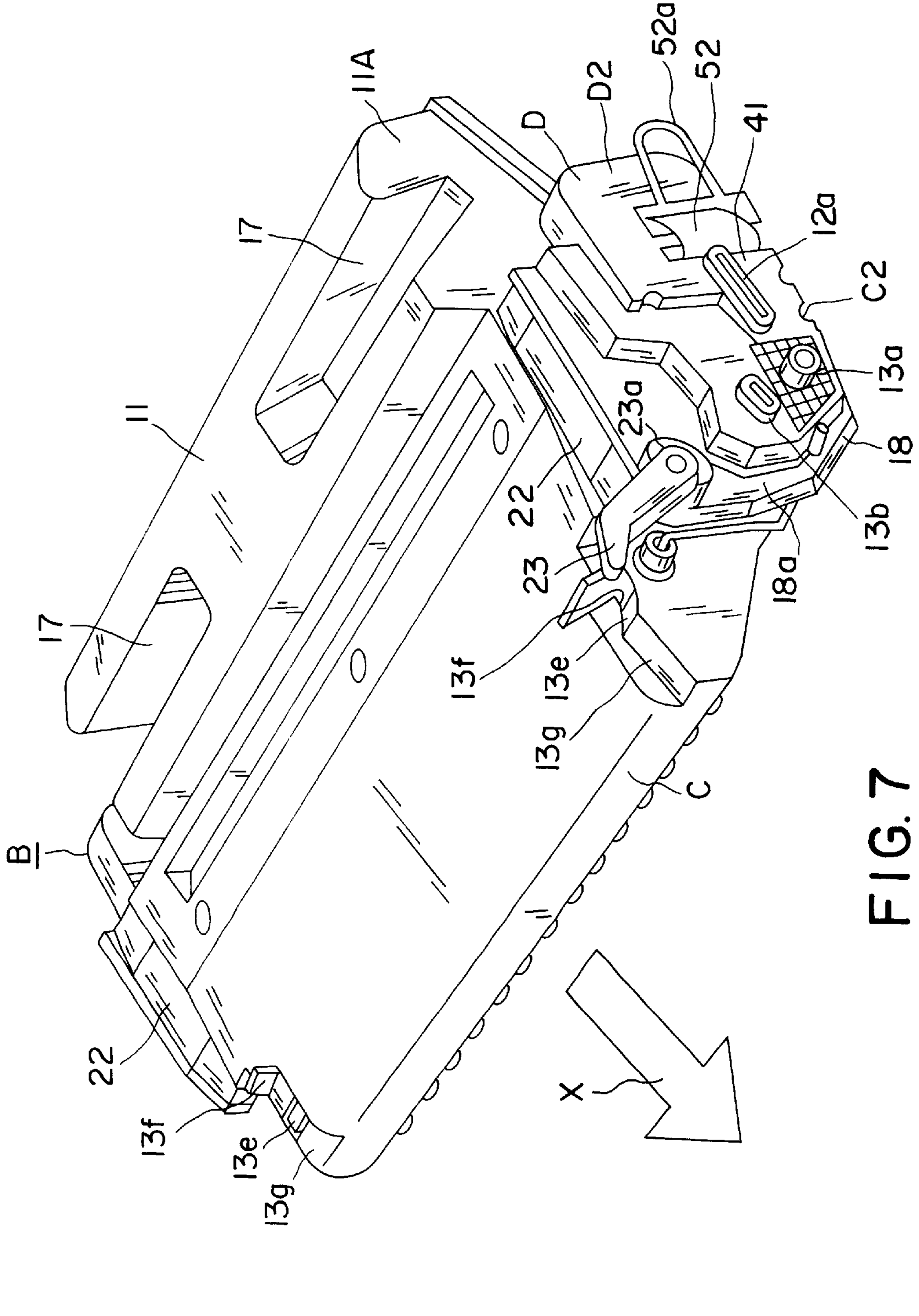
FIG. 7 shows an outer appearance of the process cartridge of FIG. 3.
Figure 8:
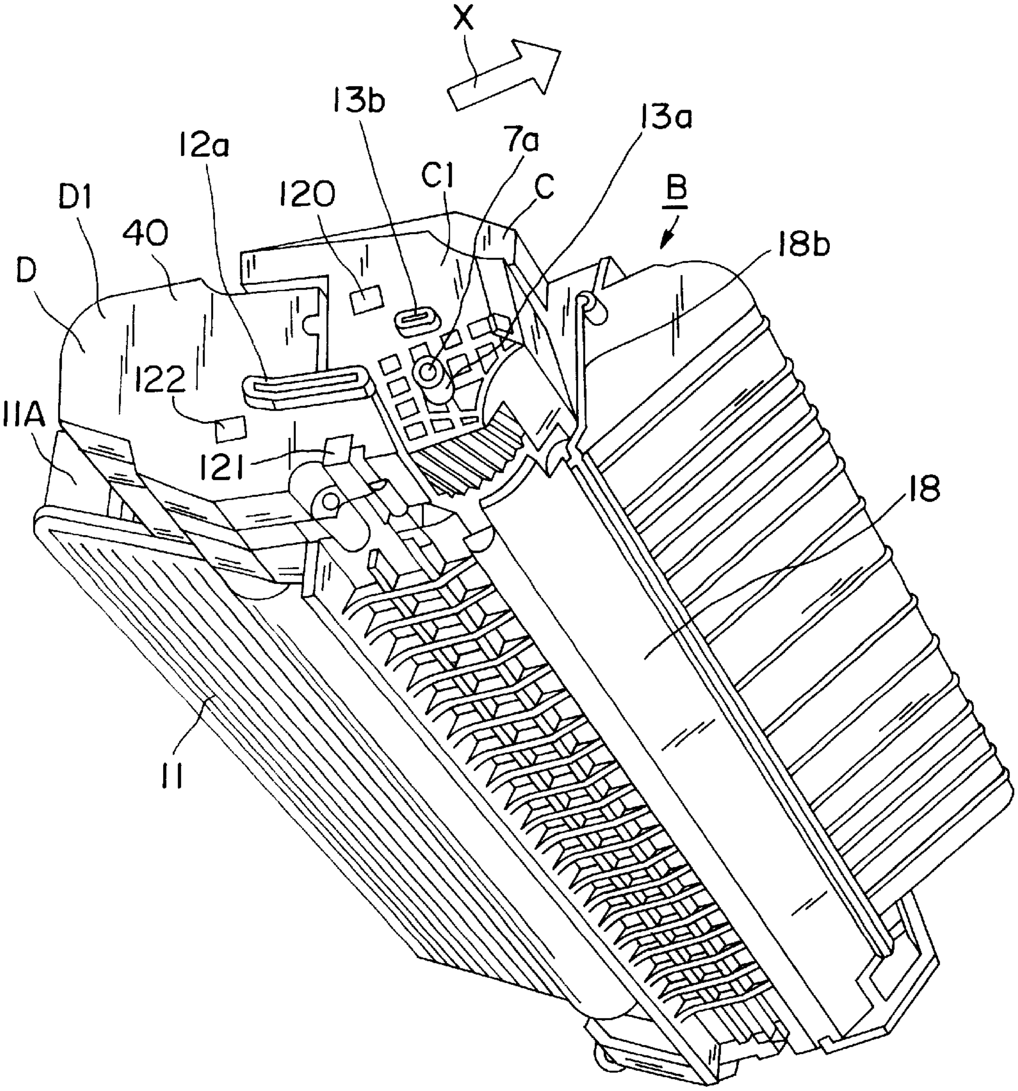
FIG. 8 shows an outer appearance of the process cartridge of FIG. 3, as seen from the bottom.

Hereinafter, the preferable embodiments of the present invention will be described. In the following descriptions, the widthwise direction of a process cartridge B means the direction in which the process cartridge B is inserted or removed from the main assembly 14 of an image forming apparatus (hereinafter, apparatus main assembly). This direction coincides with the direction in which the recording medium is conveyed. The longitudinal direction of the process cartridge B means the direction perpendicular (substantially) to the direction in which the process cartridge B is inserted or removed from the apparatus main assembly 14. This direction intersects with (is substantially perpendicular to) the direction in which the recording medium is conveyed. FIG. 1 is a schematic view of an embodiment of the electrophotographic image forming apparatus (laser beam printer) in accordance with the present invention, and FIG. 2 is an external perspective view thereof. FIGS. 3–8 are drawings depicting an embodiment of the process cartridge in accordance with the present invention. FIG. 3 is a sectional side view of the process cartridge; FIG. 4, an external perspective view thereof; FIG. 5, a right side view thereof; FIG. 6, a left side view thereof; FIG. 7, a perspective view as seen from above; and FIG. 8 is a perspective view as seen from below. Also in the following description, the top surface of the process cartridge B means the surface which faces upward when the process cartridge B is in the apparatus main assembly 14, and the bottom surface means the surface which faces downward when the process cartridge B is in the main assembly 14.

[Electrophotographic Image Forming Apparatus A and Process Cartridge B]

To begin with, referring to FIGS. 1 and 2, a laser beam printer as an electrophotographic image forming apparatus, to which the embodiment of the present invention has been applied, will be described. FIG. 3 is a side view of a process cartridge B.

Referring to FIG. 1, this laser beam printer A is of a type which forms an image on recording medium, for example, recording paper, OHP sheet, or fabric, through the electrophotographic image forming process. First, a toner image is formed on a drum-shaped electrophotographically sensitive member (hereinafter, photosensitive drum) as an image bearing member. More specifically, the photosensitive drum is charged by charging means, and then, a laser beam is projected onto the charged photosensitive member from optical means in response to imaging data, to form a latent image on the photosensitive member in response to the imaging data. Next, this latent image is developed into a toner image by developing means. Meanwhile, a sheet of recording medium 2 placed in a cassette 3*a* is conveyed, being thereby fed out, by a conveying means 3 comprising a pair of pickup rollers 3*b* and 3*c*, and a pair of registration rollers 3*d* and 3*e*, and the like, in synchronism with the toner image formation. Next, a voltage is applied to a transfer roller 4 as transferring means, whereby the toner image formed on the photosensitive drum, which a process cartridge B comprises, is transferred onto the recording medium 2. Then, the recording medium having received the toner image is delivered to a fixing means 5. This fixing means 5 comprises a driving roller 5*c* and a fixing roller 5*b* containing a heater 5*a*, and applies heat and pressure to the recording medium 2, which is passed through the fixing means 5, whereby the transferred toner image is fixed. Next, the recording medium 2 now be ring the fixed toner image conveyed and discharged into a discharge tray 6, through a sheet-reversing path 3*j*, by a group of discharging roller pairs 3*g*, 3*h* and 3*i*. This discharge tray 6 is provided on the top surface of the apparatus main assembly 14 of the image forming apparatus A. The apparatus A comprises also a pivotable flapper 3*k* and a discharge roller pair 3*m*, and when this flapper 3*k* is operated, the recording medium 2 can be discharged without being flipped over through the discharge roller pair 3*m*, without going through the sheet-reversing path 3*j*. In this embodiment, the aforementioned pickup roller 3*b*, conveyer roller pairs 3*c* and 3*d*, register roller 3*e*, conveyer guide 3*f*, discharge roller pairs 3*g*, 3*h* and 3*i*, and discharge roller pair 3*m* constitute conveying means.

Referring to FIGS. 3–8, in the process cartridge B, the surface of a photosensitive drum 7 as the image bearing member with a photosensitive layer 7*e* (FIG. 20) is uniformly charged by applying a voltage to a charging roller 8, which is a charging means, while the photosensitive drum 7 is rotated. Next, a laser beam carrying the image data is projected by an optical system 1 onto the photosensitive drum 7 through an exposure opening 9, whereby a latent image is formed on the photosensitive drum 7. This latent image is developed with toner by a developing means 9.

The charging roller 8 is placed in contact with the photosensitive drum 7 to charge the photosensitive drum 7, wherein this charging roller 8 is rotated by the rotation on the photosensitive drum 7. The developing means 9 develops the latent image formed on the photosensitive drum 7, by supplying the toner to the photosensitive drum 7, on the regions to be developed. The optical system 1 comprises a laser diode 1*a*, a polygon mirror 1*b*, a lens 1*c*, and a full reflection mirror 1*d*.

As the toner stirring member 9*b* of the aforementioned developing means 9 is rotated, the developing means 9 stirs the toner within the toner container 11A, and sends it toward the developing roller 9*c*, and as a developing roller 9*c*, in which a magnet is fixed, is rotated, a layer of toner triboelectrically charged by a developing blade 9*d* is formed on the surface of the developing roller 9*c*. The toner is supplied from this toner layer to the photosensitive drum 7, on the region to be developed. As the toner is transferred onto the photosensitive drum 7 in correspondence with the latent image, the latent image is visualized. This developing blade 9*d* regulates the amount of the toner coated on the peripheral surface of the developing roller 9*c*. Also, stirring members 9*e* and 9*f* for stirring and circulating the toner are rotatively mounted adjacent to the developing roller 9*c*.

Next, a voltage with a polarity opposite to that of the toner image is applied to the transfer roller 4, whereby the toner image on the photosensitive drum 7 is transferred onto the recording medium 2. Then, the residual toner on the photosensitive drum 7 is removed by a cleaning means 10. The cleaning means 10 comprises an elastic cleaning blade 10*a*, which is disposed in contact with the photosensitive drum 7. The toner remaining on the photosensitive drum 7 is scraped off by the elastic cleaning blade 10*a* to be collected in a waste toner collector 10*b*.

The process cartridge B is formed by combining: a toner chamber portion 11 of the cartridge frame (hereinafter toner chamber frame), which constitutes a portion of the toner container 11A (toner containing portion) for storing the toner; a developing chamber portion 12 of the frame (hereinafter, developing chamber frame), which contains the developing means such as the developing roller 9*c*; and a cleaning means portion 13 of the frame (hereinafter, cleaning means frame), which comprises the photosensitive drum 7, cleaning means such as the cleaning blade 10*a*, charging roller 8, and the like. This process cartridge B is removably installed in the apparatus main assembly 14 by an operator.

The process cartridge B is provided with an exposure opening 1*e*, which allows the light beam carrying the image data to be irradiated onto the photosensitive drum 7, and a transfer opening 13*n*, which allows the photosensitive drum 7 to face directly the recording medium 2. More specifically, the exposure opening 1*e* is provided in the cleaning means portion 13, and the transfer opening 13*n* is formed between the developing chamber portion 12 and cleaning means portion 13.

Next, the structure of the housing of an embodiment of the process cartridge B according to the present invention will be described.

This process cartridge B in accordance with the present invention is assembled in the following manner. First, the toner chamber frame 11 and developing chamber frame 12 are joined. Then, the cleaning means frame 13 is rotatively attached to the structure formed by joining the preceding two frame portions, completing thereby a cartridge housing. Next, the aforementioned photosensitive drum 7, charging roller 8, developing means 9, cleaning means 10 and the like are disposed within the housing to complete the process cartridge B. The process cartridge B is removably installed in a cartridge installing means provided within the apparatus main assembly 14.

[Structure of Housing of Process Cartridge B]

The housing of the process cartridge B according to the present invention is constructed by joining the toner chamber frame 11, developing chamber frame 12, and cleaning means frame 13, and its structure will be described below.

Figure 9A:
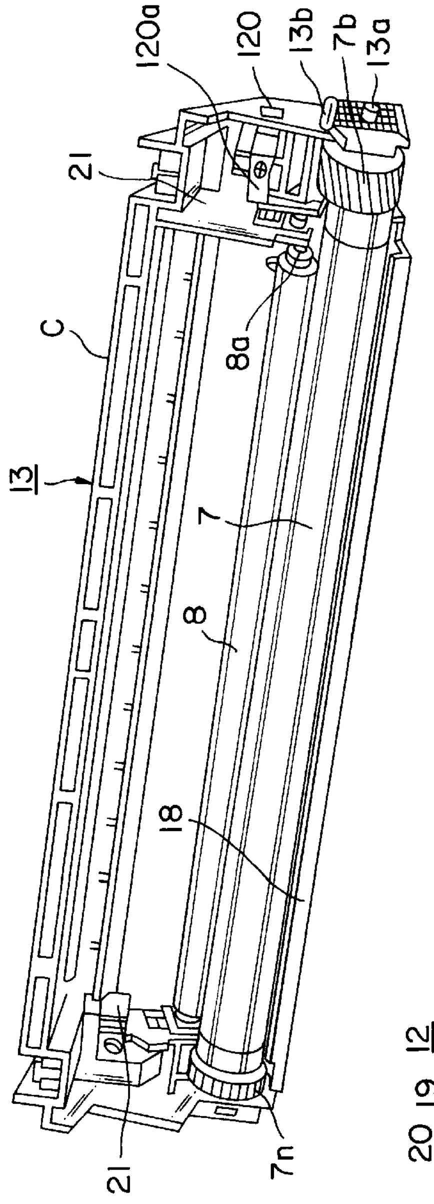
FIG. 9*a* shows an outer appearance of a cleaning unit of the process cartridge of FIG. 3.
Figure 9B:
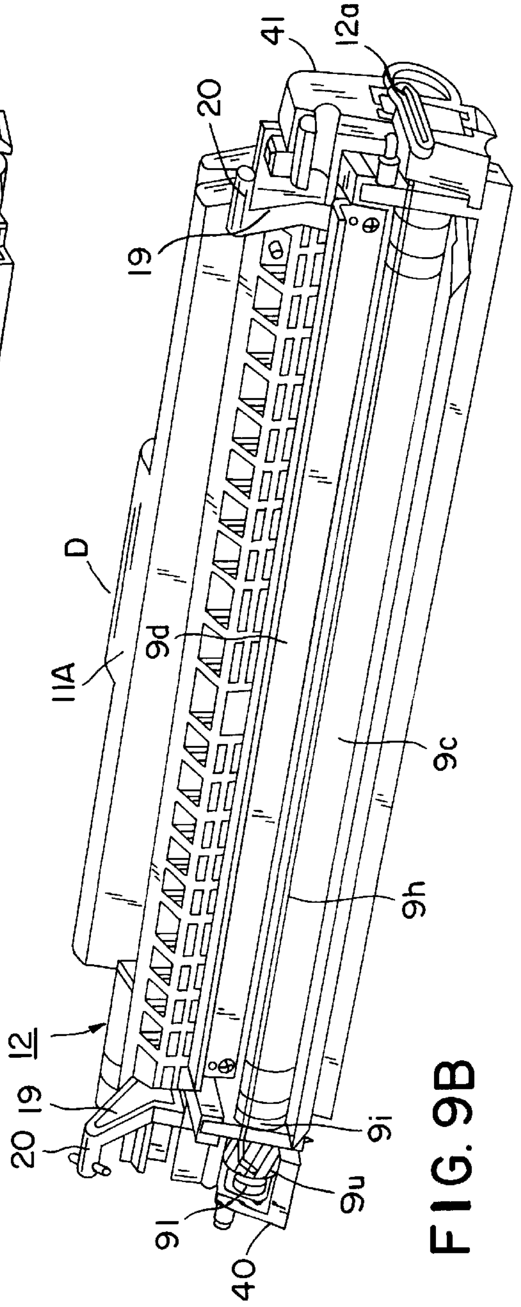
FIG. 9*b* shows an outer appearance of a developing unit of the process cartridge of FIG. 3.

Referring to FIGS. 3, 9A, and 9B, the toner chamber frame 11 comprises a toner storing container portion 11A, in which the toner stirring member 9*b* for stirring and sending out the contained toner is mounted. The developing roller 9*c* and developing blade 9*d* are mounted on the developing chamber frame 12, and the stirring members 9*e* and 9*f*, which circulate the toner within the developing chamber, are rotatively mounted adjacent to the developing roller 9*c*. Further, an antenna rod 9*h* is disposed adjacent to the developing roller 9*c*, substantially in parallel thereto. The aforementioned toner chamber frame 11 and developing chamber frame 12 are melt-welded (by the ultrasonic welding in this embodiment) to form a developing unit D as an integral second frame member (refer to FIG. 9B).

The photosensitive drum 7, charging roller 8, and cleaning means 10 are mounted on the cleaning means frame 13. Further, a drum shutter member 18, which covers and protects the photosensitive drum 7 when the process cartridge B is out of the apparatus main assembly 14, is attached to the cleaning means portion 13 of the frame to form a cleaning unit C as the first frame member (refer to FIG. 9A).

Then, the developing unit D and cleaning unit C are joined with a joining member 22, in such a manner as to be pivotable relative to each other, to complete the process cartridge B. More specifically, referring to FIGS. 9A and 9B an axis 20 is provided at the end of an arm portion 19 formed at each of the longitudinal ends (in the axial direction of the developing roller 2*c*) of the developing chamber portion 12 of the frame (refer to FIG. 9B). On the other hand, a recessed portion 21, in which the axis 20 is fitted to fix the positional relationship between the developing D and cleaning unit C, is provided at each of the longitudinal ends of the cleaning means portion 13 of the frame (refer to FIG. 9A). The joining member 22 is mounted on the cleaning means portion 13 of the frame by inserting the axis 20 into the recessed portion 21, whereby the developing and cleaning units D and C are joined in a manner so as to pivot relative to each other about the axis 20. The joining member 22 is provided with a compression spring 22*a*, so that the developing chamber frame 12 is pressed downward to reliably press the developing roller 9 toward the photosensitive drum 7. Further, a spacer ring 9*i* having a larger diameter than the developing roller 9 is provided at each of the longitudinal end portions of the developing roller 9, wherein this ring 9*i* is pressed on the photosensitive drum 7 to keep a predetermined distance (approximately 300 μm) between the photosensitive drum 7 and developing roller 9*c*. Thus, the positional relationship between the peripheral surface of the photosensitive drum 7 and the peripheral surface of the developing roller 9*c* can be precisely maintained by the elastic force of the compression spring 22*a*.

[Structure of Guiding Means of Process Cartridge B]

Next, guiding means, which guides the cartridge B when the cartridge B is installed into the apparatus main assembly 14 or removed therefrom, will be described referring to FIGS. 4–9B, wherein FIG. 5 is a right-hand side view of the cartridge B relative to the direction of an arrow mark X, in which the cartridge B is inserted into the apparatus main assembly 14 (right-hand side as seen from the developing unit D side), and FIG. 6 is a left-hand side view of the same.

As is evident from the drawings, the guiding means, which serves as a guide when the process cartridge B is inserted into the apparatus main assembly 14 or removed therefrom, is provided on each of the longitudinal end surfaces of the housing 100. This guiding means comprises a cylindrical guide 13*a* as a first guiding member, a long guide 12*a* as a second guiding member, and a short guide 13*b* as a third guiding member.

The cylindrical guide 13*a*, that is, a cylindrical member, projects outward from the lateral surface of the cleaning means frame 13, in line with the axis of the photosensitive drum 7. It supports the drum shaft 7*a*, which supports the photosensitive drum 7, in such a manner as not to rotate it. The long guide 12*a* is provided on each of the longitudinal end surfaces of the developing chamber frame 12, and bridges the surfaces of the developing chamber frame 12 and cleaning means frame 13. The short guide 13*b* is provided on each of the longitudinal end surfaces of the cleaning means frame 13, above the cylindrical guide 13*a*. More specifically, the long guide 12*a* is integrally formed on developing roller holders 40 and 41 (refer to FIG. 23), which will be described later. Further, the cylindrical guide 13*a* and short guide 13*b* are integrally formed on the cleaning means frame 13.

The long guide 12*a* extends in the direction (arrow X direction), in which the cartridge B is inserted, and its angle is set to be substantially equal to an angle at which the process cartridge B is inserted. The cylindrical guide 13*a* is disposed so as to fall in the path of the imaginary extension of the long guide 12*a* in the cartridge inserting direction, and the short guide 13*b* is substantially parallel to the long guide 13*a*. Referring to FIG. 6, the cylindrical guide 13*a*, second guide member 12*a*, third guide member 13*b* are also provided on the longitudinal side surface opposite to the one illustrated in FIG. 10, and their configuration and positions are the same as those shown in FIG. 5. These three guiding members project substantially the same distance from the external surface of the cleaning means frame 13 and developing chamber frame 12, which are in the same plane.

Hereinafter, more detailed description will be given.

The cylindrical guide 13 as the first guiding member is provided on each of the lateral surfaces C1 (right-hand side 13*c*) and C2 (left-hand side 13*d*) of the cleaning unit C, wherein the side C1 is the right-hand side portion 13*c* of the cleaning means frame 13, relative to the axial direction of the photosensitive drum 7, as the cartridge B is seen from the developing unit D side (as the cartridge B is seen from the downstream side of the cartridge B inserting direction). The other side C2 is the left-hand side portion of the cleaning means frame 13, relative to the axial direction of the photosensitive drum 7. This cylindrical guide 13*a* is a cylindrical member, which projects from each of both longitudinal end surfaces 13*c* and 13*d* of the cleaning means frame 13 in the axial direction of the photosensitive drum 7. The drum shaft 7*a* is supported by this cylindrical member 13*a*, which fits around the drum shaft 7*a*. In other words, the drum shaft 7*a* is guided by the guiding member 16*a*, which will be described later, with the cylindrical member 13*a* being interposed, and then, the position of the drum shaft 7*a* is fixed by a groove 16*a*5 (refer to FIGS. 10–17).

The long guide 12*a* as the second guide member is provided on each of the longitudinal end surfaces D1 (right-hand portion 12*c*) and D2 (left-hand side 12*d*) of the developing unit D, wherein one surface, D1, of the lateral portion is the right-hand portion 12*c*, relative to the axial direction of the photosensitive drum 7, of the developing chamber frame portion 12, and the other surface, D2, is the left-hand side portion 12*d*, relative to the axial direction of the photosensitive drum 7, of the developing chamber frame portion 12. The long guide 12*a* is disposed away from the cylindrical guide 13*a*, being on the upstream side of the cylindrical guide 13*a*, relative to the cartridge inserting direction (arrow X direction). More precisely, the long guide 12*a* is disposed within a region L formed between the top and bottom imaginary lines 111 and 112 (FIG. 5) extended parallel in the inserting direction and tangentially from the peripheral surface of the cylindrical guide 13*a*, and this long guide 12*a* bridges between the developing chamber frame portion 12 and cleaning means frame portion 13, with its inserting end portion 12*a*1 extending over the lateral surface area of the cleaning frame portion 13 (by an approximate distance of 1 mm to 3 mm).

The short guide 13*b* as the third guiding member is provided on the lateral surfaces 13*c* and 13*d* of the cleaning unit C, above the cylindrical guide 13*a*. More specifically, the short guide 13*b* is substantially directly above the cylindrical guide 13*a* as seen from the cartridge inserting direction. In other words, the short guide 13*b* is disposed within the region 15 formed between two parallel lines 113 and 114, which are drawn in such a manner as to be tangent to the peripheral surface of the cylindrical guide 13*a* and substantially perpendicular to the cartridge inserting direction (arrow X direction). In addition, the short guide 13*b* is substantially parallel to the long guide 13*a*.

Here, typical measurements of the guiding members will be listed. Hereinafter, a tolerable range means the measurement range adopted in this embodiment of the process cartridge.

The cylindrical guide 13*a* is approximately 10.0 mm in diameter (tolerable range of 7.5 mm to 10.0 mm); the long guide 12*a*, approximately 36.0 mm in length (tolerable range of 15.0 mm to 41.0 mm) and approximately 8.0 mm in width (tolerable range of 1.5 mm to 10.0 mm); and short guide 13*b* is approximately 10.0 mm in length (tolerable range of 3.0 mm to 17.0 mm) and approximately 4.0 mm (tolerable range of 1.5 mm to 7.0 mm) in width. Further, the distance between the peripheral surface of the cylindrical guide 13*a* and the inserting end portion 12*a*1 of the long guide 12*a* is approximately 9.0 mm.

The distance between the peripheral surface of the cylindrical guide 13*a* and the bottom end tip 13*b*1 of the short guide 13*b* is approximately 7.5 mm (tolerable range of 5.5 mm to 9.5 mm).

Next, a regulatory contact portion 13*e* and a disengagement contact portion 13*f*, which are provided on the top surface 13*d* of the cleaning unit C, will be described. Here, the top surface means such a portion of the leaning unit C surface that is going to face upward when the process cartridge B is installed into the apparatus main assembly 14. In this embodiment, it is the top surface 13*i* of the cleaning unit C.

The regulatory contact portion 13*e* and disengagement contact portion 13*f* are provided on each of the right lateral end portion 13*c* and left lateral end portion 13*d* of this surface 13*i*. This regulatory contact 13*e* fixes the position of the process cartridge B in the apparatus main assembly 14. More specifically, when the process cartridge B is inserted into the apparatus main assembly 14, the contact 13*e* comes in contact with a fixing member 25 provided on the apparatus main assembly 14 (FIGS. 10–17), whereby the position of the process cartridge B is regulated. The disengagement contact portion 13*f* displays its function when the process cartridge B is removed from the apparatus main assembly 14. More specifically, when the process cartridge B is taken out of the apparatus main assembly 14, it comes in contact with the fixing member 25 to permit a moment to function to smoothly remove the cartridge B. The steps for installing or removing the process cartridge B will be described later with reference to FIGS. 10–17.

Describing in more detail, a recessed portion 13*g* is provided on the cleaning unit C, on the top surface 13*i* of the cleaning unit C, at each of the lateral edges relative to the cartridge inserting direction. This recess portion 13*g* is provided with: the first slanted surface 13*g*1, which extends upward toward the rear from the leading end of the cartridge B relative to the inserting direction (arrow X direction); the second slanted surface 13*g*3, which extends downward toward the rear from the top end 13*g*2 of the slanted surface 13*g*3; and the fourth slanted surface 13*g*5, which extends further downward toward the rear from the bottom end 13*g*4 of the slanted surface 13*g*3. At the bottom end 13*g*6 of the slanted surface 13*g*5, a wall (slanted or inclined surface) 13*g*7 is provided. The second slanted surface 13*g*3 corresponds to the regulatory contact portion 13*e*, and the wall 13*g*7 corresponds to the disengagement contact portion 13*f*.

Here, the typical measurements of the portions described above will be listed.

The regulatory contact portion 13*e* is angled by 0 degree relative to the horizontal direction X (FIG. 5) of the cartridge B in the apparatus main assembly 14, and is approximately 6.0 mm in length (tolerable range of 4.5 mm to 8.0 mm). The disengagement contact portion 13*f* is slanted by θ1 (approximately 45 degrees) relative to the horizontal direction 1, and is approximately 10.0 mm in length (tolerable range of 8.5 mm to 15.0 mm).

[Steps for Installing or Removing Process Cartridge]

Next, the steps for installing the process cartridge B into the apparatus main assembly 14, or removing it therefrom, will be described with reference to FIGS. 10–19B.

Let it be assumed that the process cartridge B structured as described above can be installed into the cartridge accommodating means provided within the apparatus main assembly 14, and can be removed therefrom.

Figure 17:
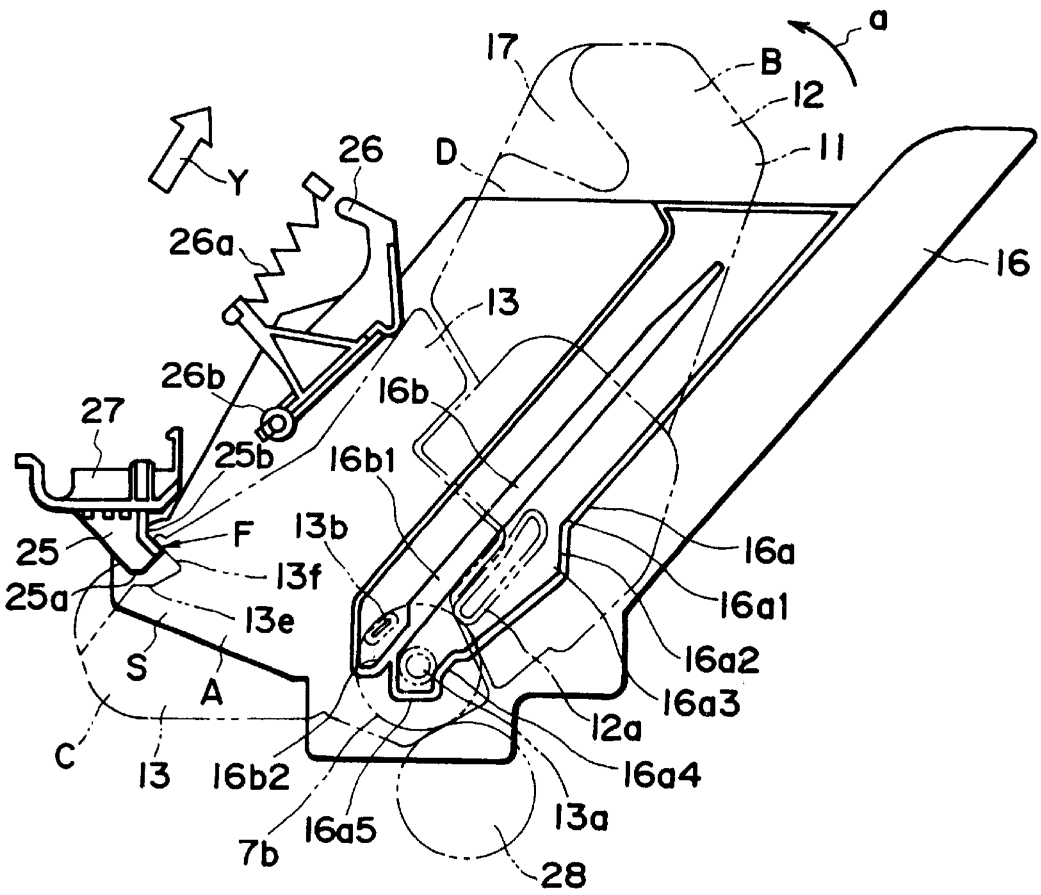
FIG. 17 is a side view illustrating mounting and demounting operation of the process cartridge of FIG. 3 relative to the main assembly of the image forming apparatus.
Figure 18:
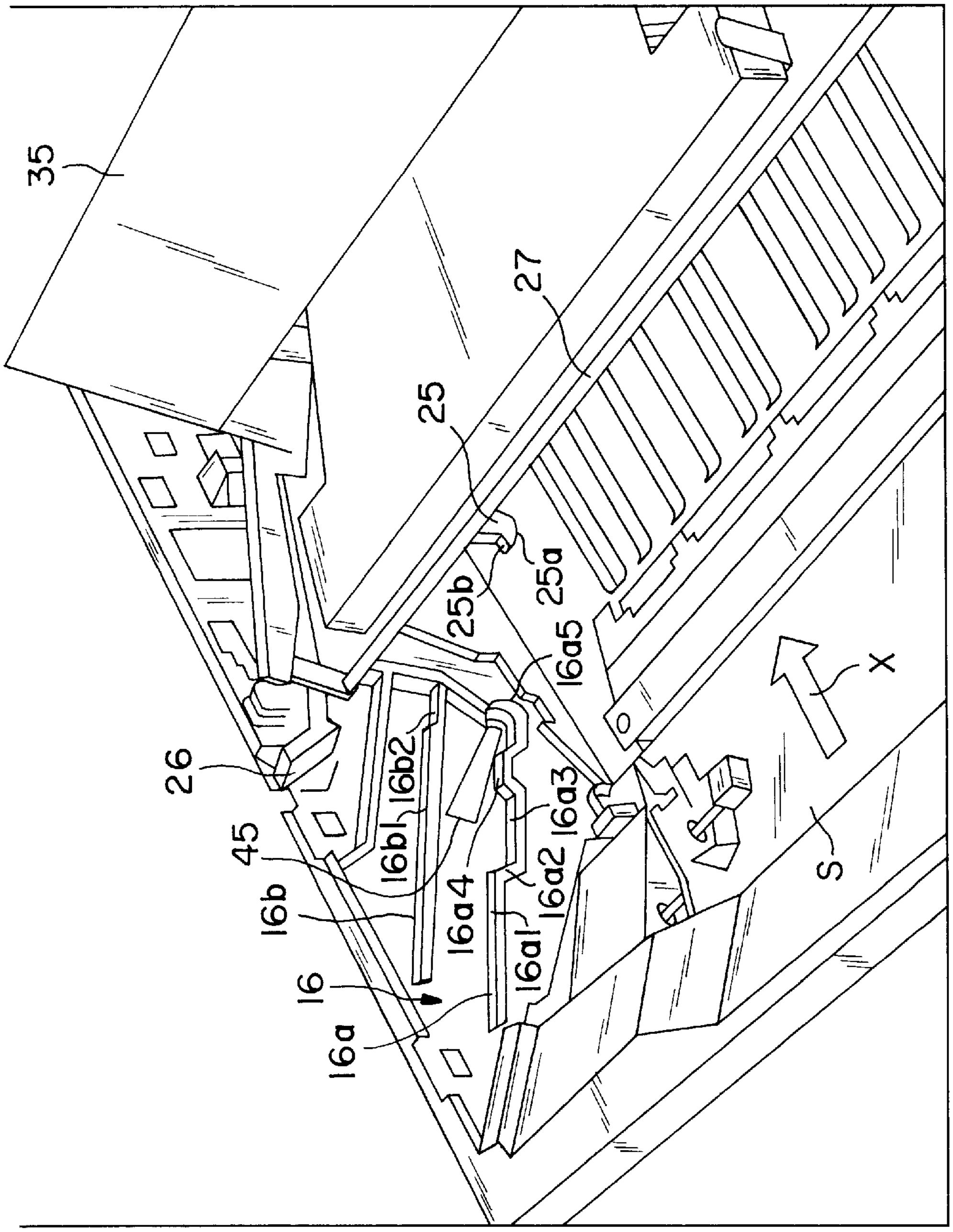
FIG. 18 is a perspective view of an inside of the main assembly of the apparatus.
Figure 19A:
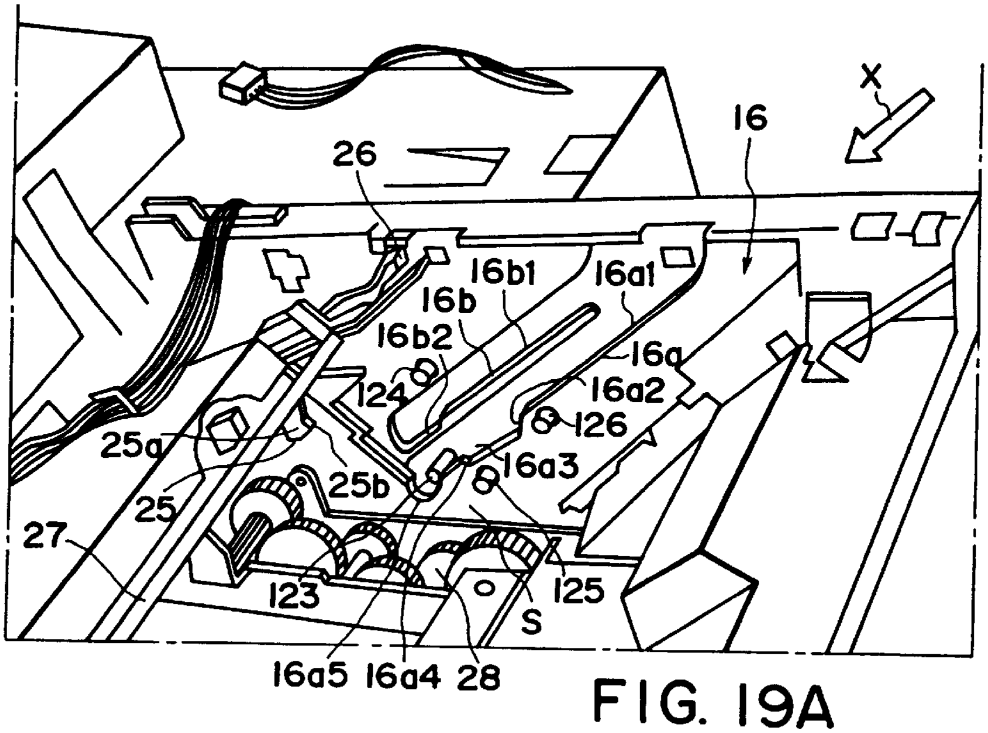
FIG. 19*a* is a perspective view of an inside of the main assembly of the apparatus.
Figure 19B:
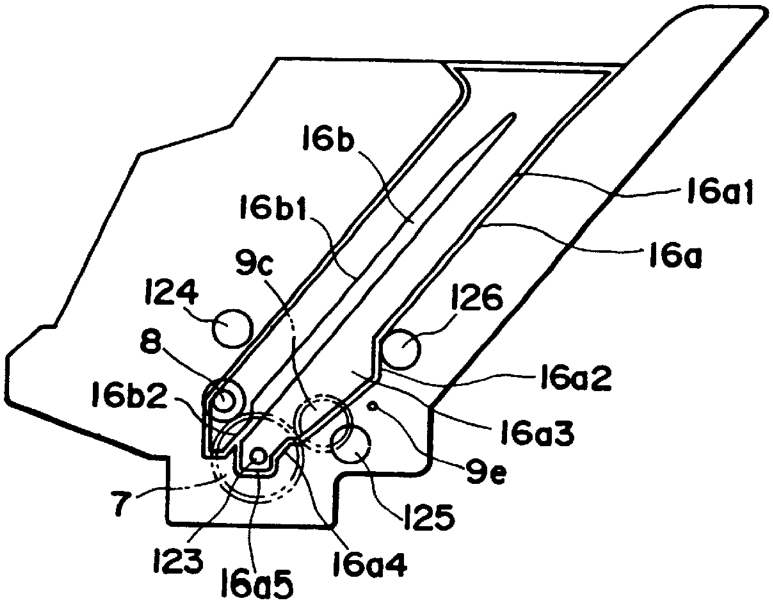
FIG. 19*b* is a side view of an inside of the main assembly of the apparatus.

Referring to FIGS. 18, 19A, and 19B, as an operator opens a pivotal cover 35 by pivoting it about a supporting point 35*a*, a cartridge accommodating space S, and left and right cartridge installation guides 16, which are mounted on the corresponding sides of the apparatus main assembly 14, are exposed. Each of the cartridge installation guides 16 comprises a pair of guide portions of its own, that is, a first guide portion 16*a* and a second guide portion 16*b*, which correspond to the same on the opposite side. The installation of the process cartridge B into the apparatus main assembly 14 is accomplished by inserting the process cartridge B along the guide portions 16*a* and 16*b* and closing the cover 15. As for the inserting direction of the cartridge B, it is a direction which intersects with the axial line of the photosensitive drum 7; more specifically, such a direction that is substantially perpendicular to the axial line of the photosensitive drum 7 as illustrated in FIGS. 10–17. In this case, the cleaning unit C side is the leading side and the developing unit D side is the tailing side.

A recessed portion 17 is provided on the cartridge B, at each of the longitudinal ends, which makes it easier for an operator to hold it during its installation or removal (see FIG. 3); the operator uses both hands to hang onto the recessed portions, as handholds, of the process cartridge when installing or removing it.

Further, the process cartridge B comprises a drum shutter 18 (see FIG. 3), the movement of which is linked to the movement of the cartridge B during its installation or removal. When the cartridge B is removed from the laser beam printer assembly, the shutter 18 is closed to protect the portion of the photosensitive drum 7 which faces the transfer opening. This shutter member 18 is connected to each of the tips of an arm 18*a* and a link member 18*b*, being thereby supported, both of which are rotatively supported on the cleaning means frame 13 as illustrated in FIG. 6. Also referring to FIG. 6, as the process cartridge B is inserted in the apparatus main assembly 14 in the arrow X direction, the leading end of the lever 23, which is fixed to the arm 18*a* by its base portion, strikes a stopper (unillustrated) fixed on the apparatus main assembly 14, whereby the lever 23 is rotated about a supporting point 18*c* where the shutter arm 18*a* is supported, opening thereby the shutter member 18. As the process cartridge B is taken out of the apparatus main assembly 14, the shutter member 18 is closed due to the elastic force of a torsion spring 23*a*.

The first guide portion 16*a* is the bottom portion of the guide member 16, and guides the long guide 12*a* and cylindrical guide 13*a* provided on the process cartridge B side. This first guide portion 16*a* comprises a main guide portion 16*a*1, a stepped portion 16*a*2, a recessed portion 16*a*3, an auxiliary guide portion 16*a*4, and a positioning groove 16*a*5, which are disposed in this order from the upstream side toward the downstream relative to the inserting direction. The main guide portion 16*a*1 guides the long guide 12*a* and cylindrical guide 13*a*. The auxiliary guide portion 16*a*4 guides the cylindrical guide 13*a* into the positioning groove 16*a*5. The positioning groove 16*a*5 is where the cylindrical guide 13*a* is fitted to regulate the position of the cartridge B in the apparatus main assembly 14. The second guide portion 16*b* is the upper portion of the guide member 16, and comprises a slanted surface 16*b*1 and a recess 16*b*2, which are disposed in this order from the upstream side toward the downstream relative to the inserting direction.

Figure 15:
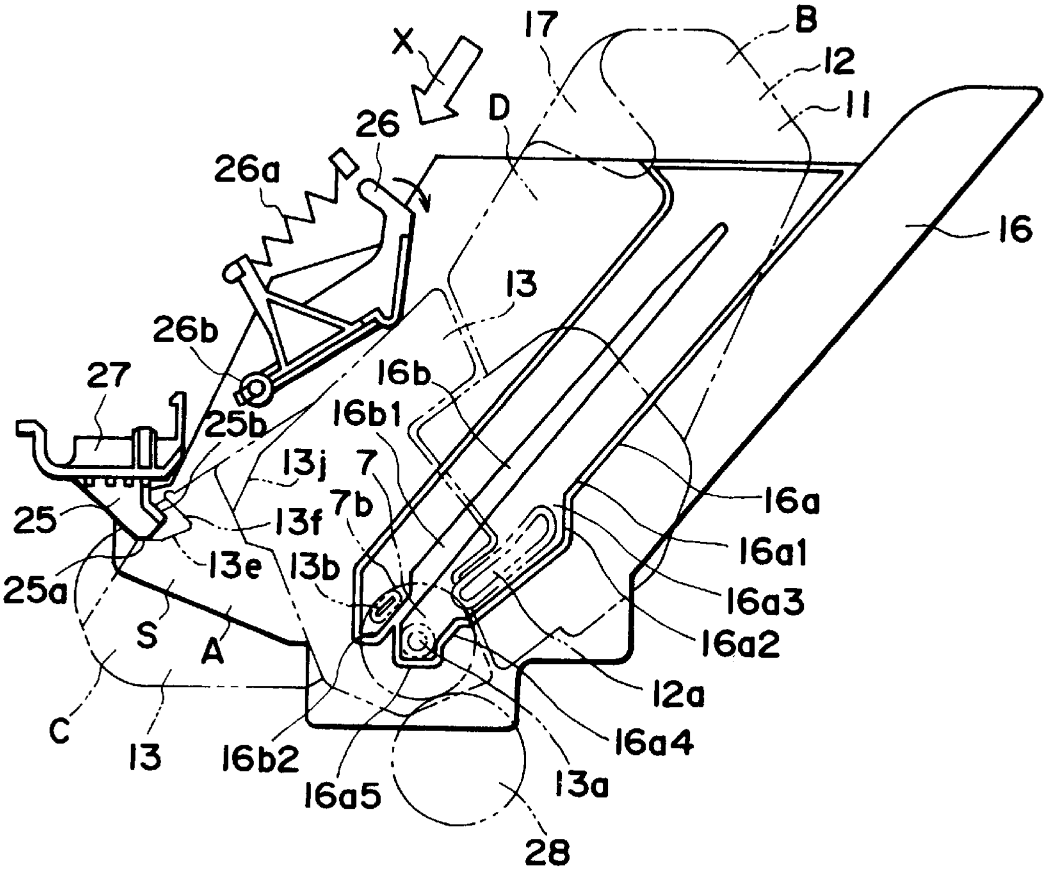
FIG. 15 is a side view illustrating mounting and demounting operation of the process cartridge of FIG. 3 relative to the main assembly of the image forming apparatus.

Further, in the cartridge accommodating space S of the apparatus main assembly 14, a fixed member 25 (member for regulating the rotation) is provided on the left and right sides. It is fixed to a stay 27. This fixed member 25 comes in contact with the aforementioned regulatory contact portion 13*e* to regulate the clockwise rotation of the cartridge B (FIG. 15). More specifically, the cartridge B is accurately positioned in the apparatus main assembly 14 as the cylindrical guide 13*a* fits into the groove 16*a*5 and the regulatory contact 13*e* comes in contact with the fixed member 25. Further, when the cartridge B is taken out, the fixed member 25 comes in contact with the disengagement contact portion 13*f* to facilitate the smooth removal of the cartridge B.

Further, in the cartridge accommodating space S, a pressing member 26 is disposed on the left and right sides (refer to FIGS. 10–19B). This pressing member 26 pressed in the clockwise direction (FIGS. 10–17) by the elastic force of a coil spring 26*a* is rotatable about a fulcrum 26*b*, and elastically presses the top surface of the cartridge B, whereby the cartridge B is prevented from being vibrated when the apparatus A is subjected to vibration or the like.

Figure 10:
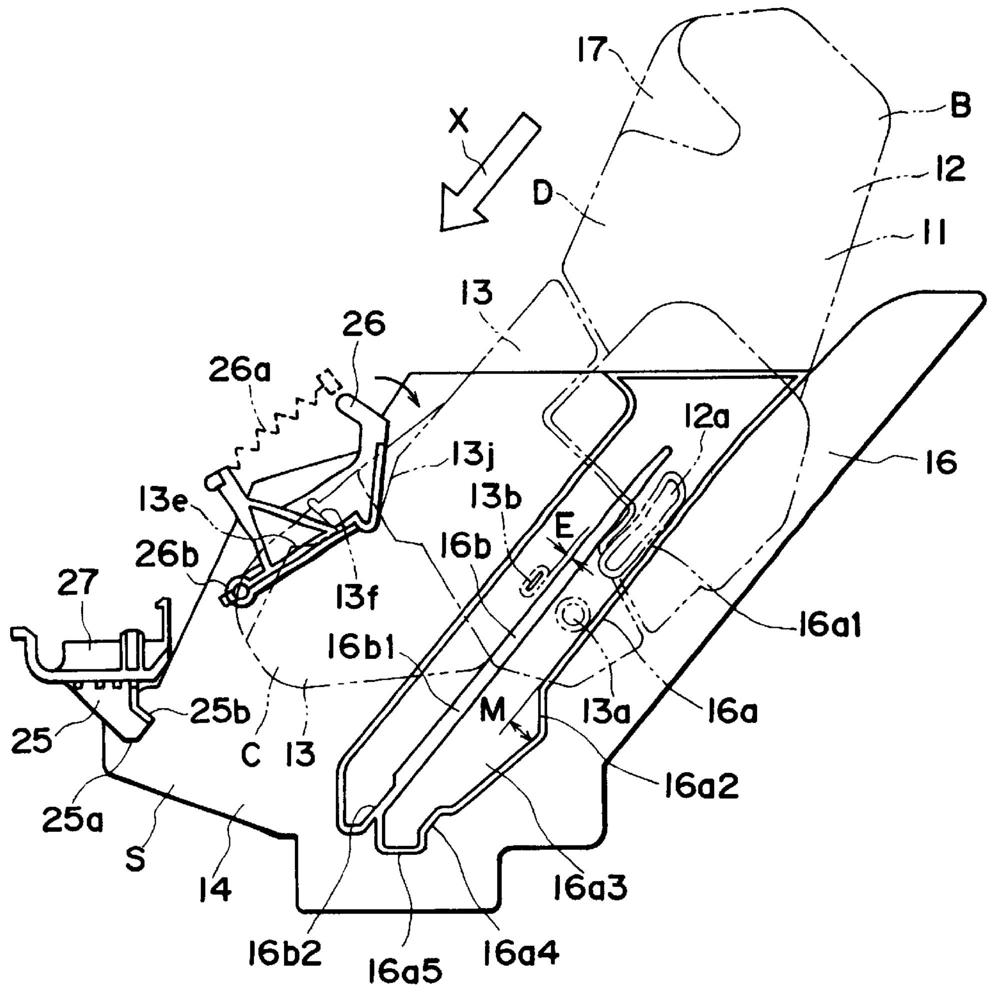
FIG. 10 is a side view illustrating mounting and demounting operation of the process cartridge of FIG. 3 relative to the main assembly of the image forming apparatus.

Next, the relationship between the installation guide 16 provided on the apparatus main assembly 14 and the guide members 12*a*, 13*a* and 13*b* provided on the cartridge B, during the installation or removal of the cartridge B, will be described with reference to the drawings. FIGS. 10–15 are schematic drawings, which depict the steps for installing the process cartridge B from the beginning of the cartridge installation to the moment when the process cartridge B is finally positioned in a predetermined location. In FIGS. 10 and 15, the full side view of the process cartridge B is depicted with a solid line, and the installation guide member of the apparatus main assembly 14 is depicted with a double dot chain line (imaginary line). In FIGS. 11–14, which depict intermediary steps of the cartridge installation, only the guide members of the process cartridge B are depicted with the solid line, and the other portions are depicted with the double dot chain lines.

First, referring to FIG. 10, at the beginning of the cartridge B installation into the apparatus main assembly 14 by an operator, the cylindrical guide 13*a* and long guide 12*a* of the cartridge B are guided by the guide portion 16*a* in such a manner as to slide thereon. At this moment, the short guide 13*b* is not guided by the guide portion 16*b*, being away from it by a predetermined distance E (in this embodiment, approximately 2.0 mm to 4.0 mm).

Also at this moment, the pressing member 26 rotates upward following the slanted surface 13*i* provided on the top surface of the cartridge B, so that it does not interfere with the cartridge installation. As the cartridge B is being further inserted, the pressing member 26 keeps on sliding on the top surface of the cartridge B, checking thereby the upward movement of the cartridge B. Even after the cartridge B has been installed in the apparatus A, the pressing member 26 keeps on pressing on the top surface of the cartridge B as long as the cartridge B is in the apparatus A.

Figure 11:
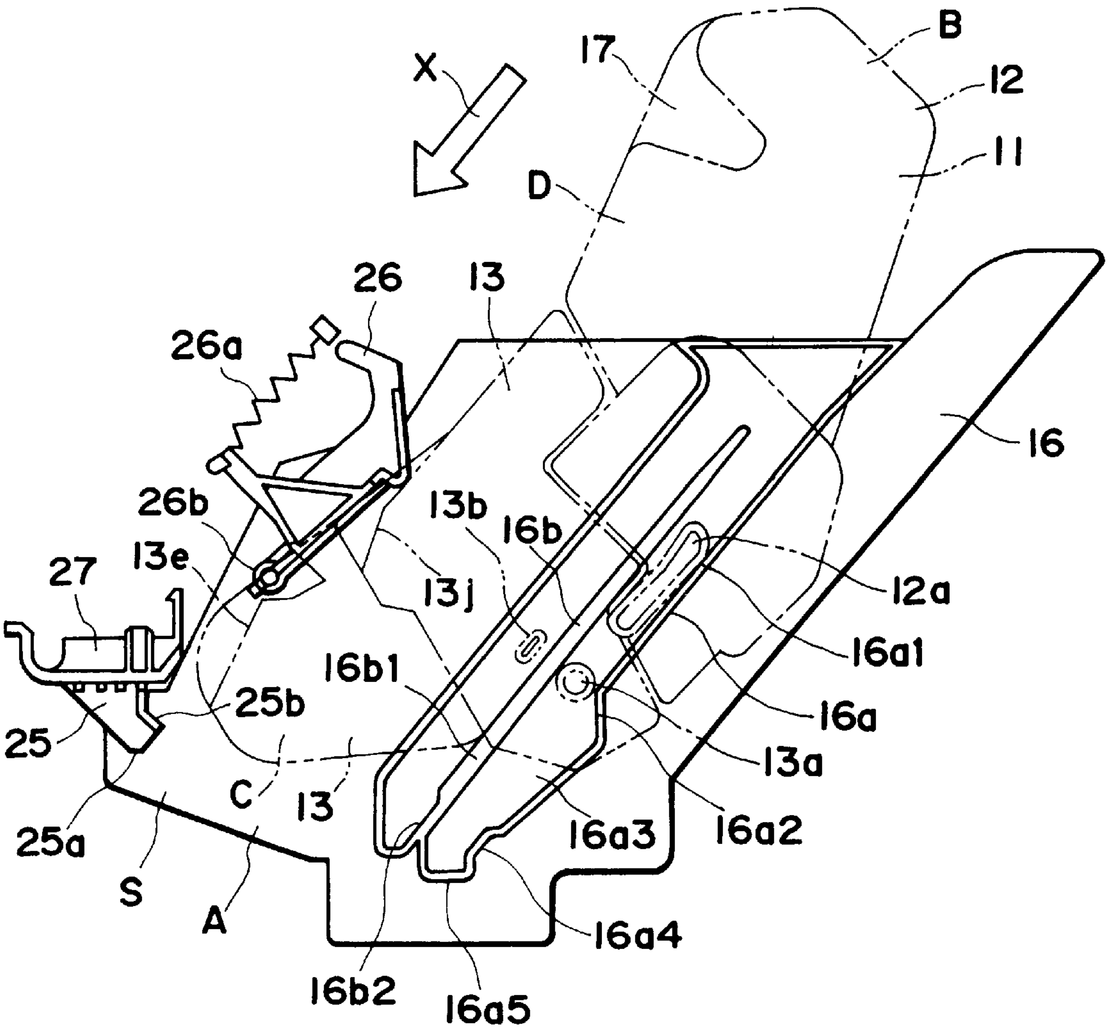
FIG. 11 is a side view illustrating mounting and demounting operation of the process cartridge of FIG. 3 relative to the main assembly of the image forming apparatus.

Next, when the process cartridge B has been further inserted and is in the state depicted in FIG. 11, the cylindrical guide 13*a* is ready to pass the stepped portion 16*a*2 provided on the first installation guide portion 16*a* and to move onto the recess portion 16*a*3 provided also on the first installation guide portion 16*a*. This recessed portion 16*a*3 of the guide portion 16*a* is to let go the long guide 12*a* when the process cartridge B is inserted to a predetermined point (FIG. 15), and its depth m (in this embodiment, approximately 4.0 mm to 8.0 mm) is set to be larger than the aforementioned distance E (E<M). It should be noted that at this moment, the short guide 13*b* is not in contact with the second guide portion 16*b* (upwardly slanted surface 16*b*1).

Figure 12:
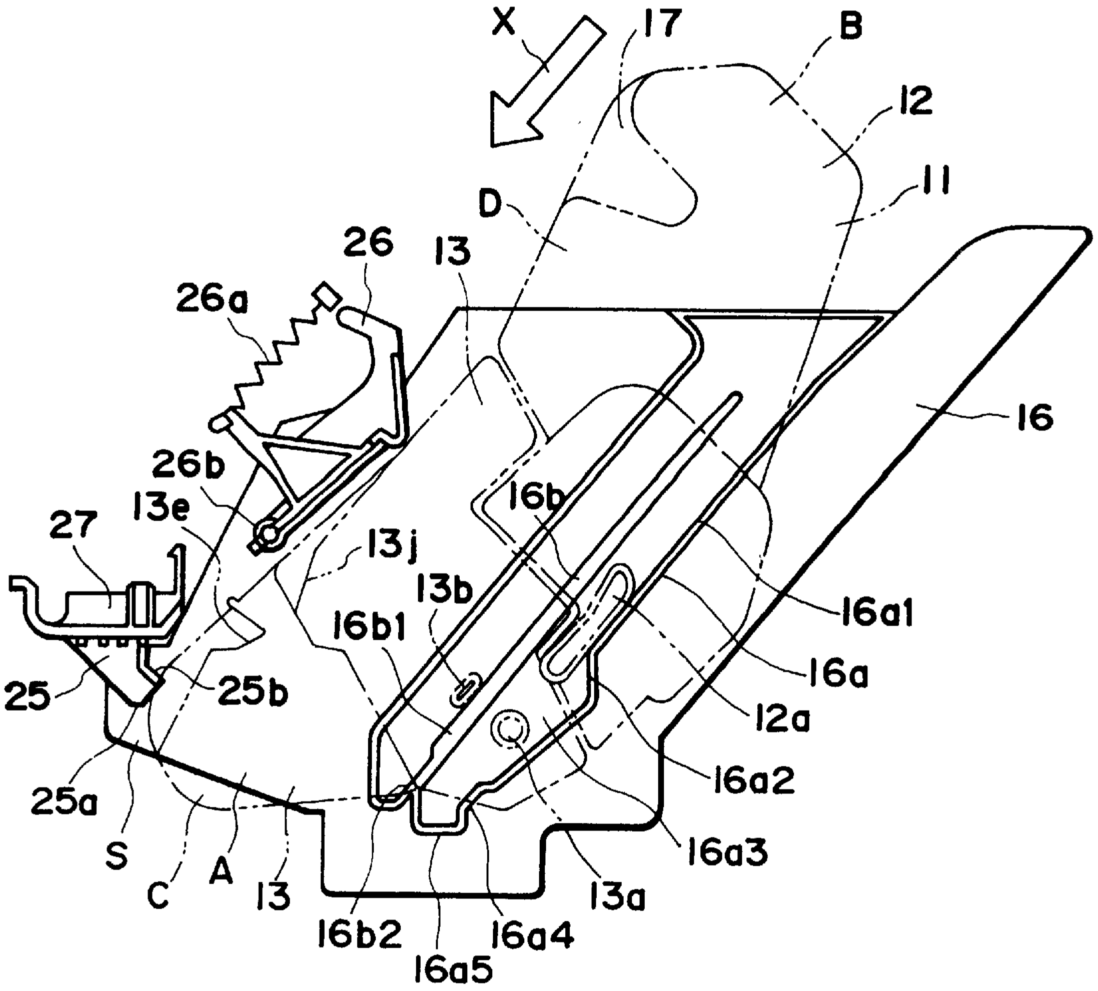
FIG. 12 is a side view illustrating mounting and demounting operation of the process cartridge of FIG. 3 relative to the main assembly of the image forming apparatus.

Next, as the process cartridge B is further inserted till the state depicted in FIG. 12 is realized, the short guide 13*b* makes contact with the guide portion 16*b* before the cylindrical guide 13*a* of the cartridge B reaches the bottom of the recessed portion 16*a*3.

In other words, at this time, both the long and short guides 12*a* and 13*b* serve as the insertion guide, whereby the shock, which might be imparted on the cartridge B by the stepped portion or the like, is reduced.

Figure 13:
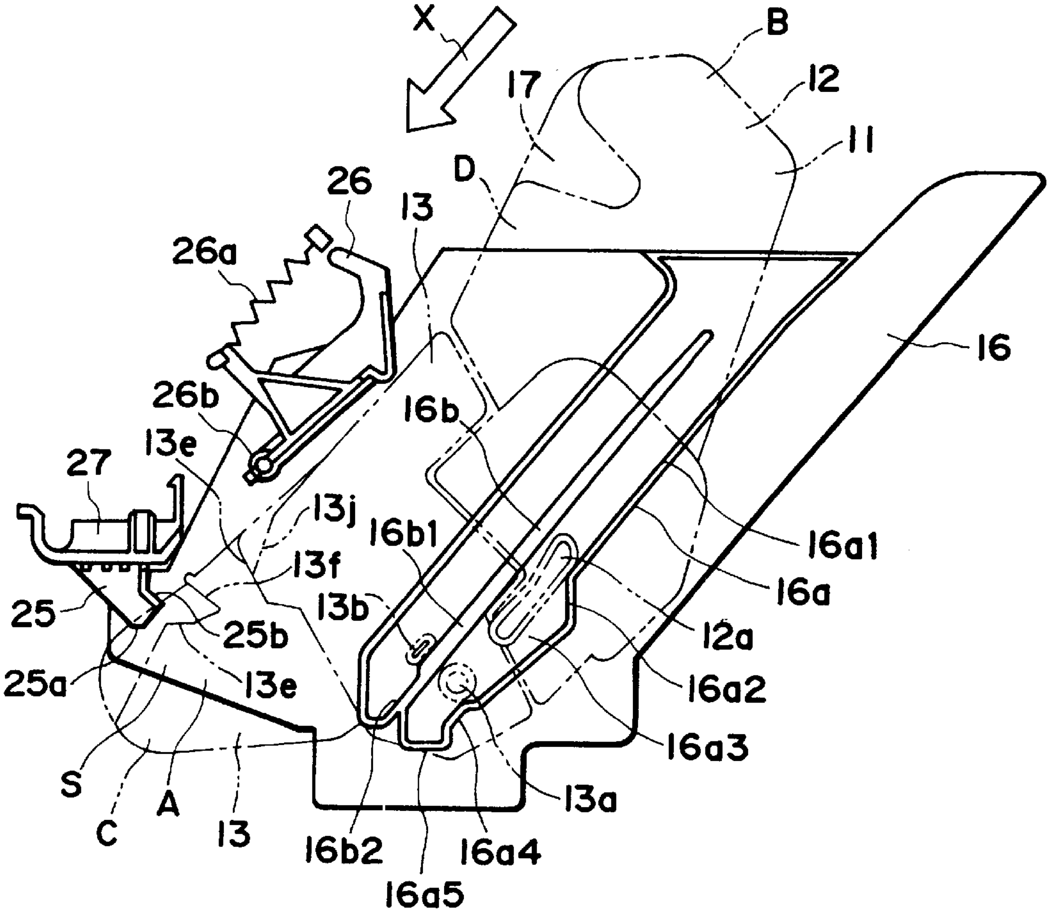
FIG. 13 is a side view illustrating mounting and demounting operation of the process cartridge of FIG. 3 relative to the main assembly of the image forming apparatus.

As the process cartridge B is further inserted, the state illustrated in FIG. 13 is realized. In this state, the trailing end of the long guide 12*a* of the process cartridge B is at the edge of the recessed portion 16*a*3 of the first guide portion 16*a*, and the cylindrical guide 13*a* of the process cartridge B is in contact with the auxiliary guide portion 16*a*4, being ready to follow the guide portion 16*a*4. Next, the cylindrical guide 13*a* and short guide 13*b* of the process cartridge B are guided by the first guide portion 16*a* and second guide portion 16*b*, respectively (FIG. 14).

Figure 14:
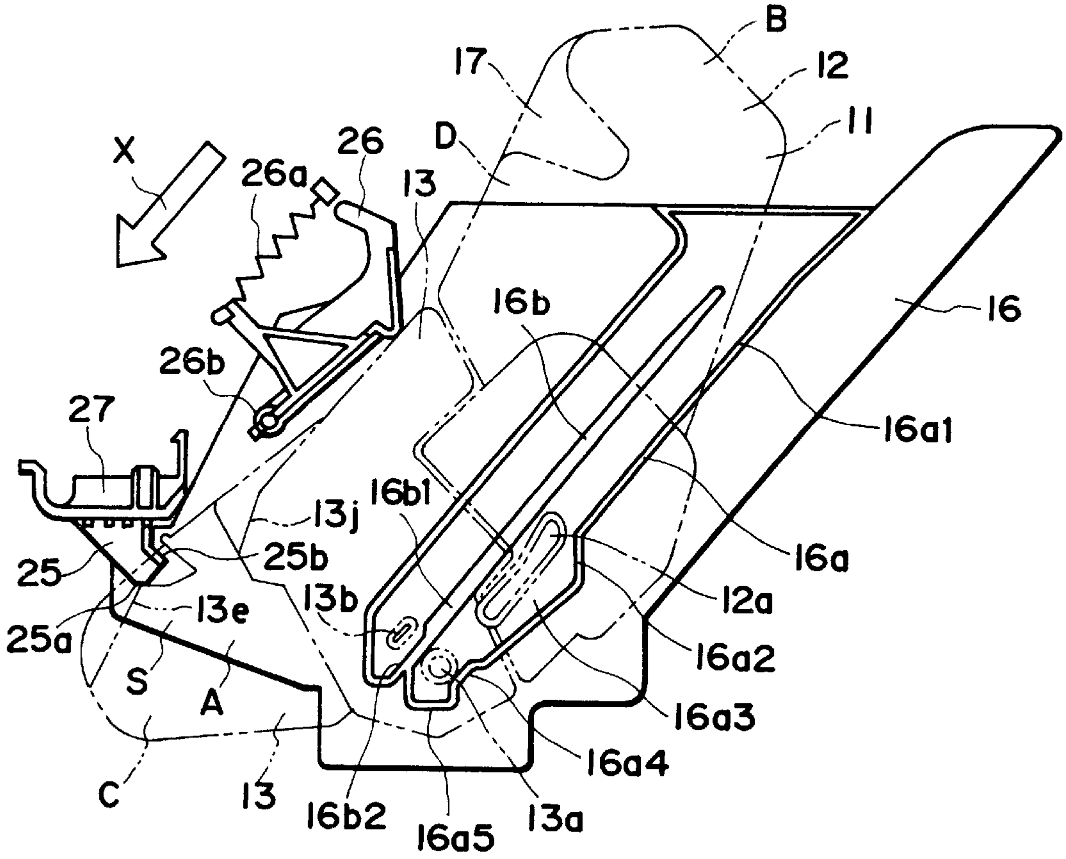
FIG. 14 is a side view illustrating mounting and demounting operation of the process cartridge of FIG. 3 relative to the main assembly of the image forming apparatus.

Next , as the cartridge B is further inserted and the state illustrated in FIG. 14 is realized, the short guide 13*b* comes to the recessed portion 16*b*2 of the second guide portion 16*b*. For a short period in which this short guide 13*b* drops into the recessed portion 16*b*2, only the cylindrical guide 13*a* is in contact with the apparatus main assembly 14, at the auxiliary guide portion 16*a*4; therefore, the process cartridge B slightly rotates in the counterclockwise direction, and lastly, the cylindrical guide 13*a* drops into the groove 16*a*5 of the guide portion 16*a* (FIG. 15). At substantially the same time, the regulatory contact portion 13*c* provided on the cleaning means frame portion 13 comes in contact with the rotation regulating portion 25*a* (FIG. 15) of the fixed member 25 fixed to the apparatus main assembly 14. As a result, the overall position and orientation of the process cartridge B within the apparatus A is fixed. In this state, the position of the process cartridge B is fixed by the cylindrical guide 13*a* alone, and the other guides (long and short guides 12*a* and 13*b*) are not in contact with any portion of the installation guide member 16 of the apparatus main assembly 14; therefore, the position of the cartridge B is accurately fixed.

The positional relationship between the regulatory contact portion 13*e* and rotation regulating portion 25*a*, which will be described later in detail, is such that the moment, which is generated on the process cartridge B as the process cartridge B is driven, is received by the contact between regulatory contact portion 13*e* and rotation regulating portion 25*a*. The distance from the contact point between the regulatory contact portion 13*e* and rotation regulating portion 25 to the center of the cylindrical guide 13*a* is longer than the distance between the long guide 12*a* and the center of the cylindrical guide 13*a*, and the distance between the short guide 13*b* and center of the cylindrical guide 13*a*. Therefore, the orientation of the process cartridge B remains more stable when the process cartridge B is driven.

In a state shown in FIG. 15, a helical drum gear 7*b* provided on the photosensitive drum 7, at one of the axial ends, engages with a driving helical gear 28 provided on the apparatus main assembly 14. Thus, the driving force is transmitted from the apparatus main assembly 14 to the photosensitive drum by way of the gears 28 and 7*b*, wherein as the driving force is transmitted from the helical gear 28 to helical gear 7*b*, the cartridge B is subjected to a force that works in the clockwise direction (FIG. 17). However, the movement generated on the cartridge B is regulated by the contact portion 13*e*.

The pressing member 26 presses down the process cartridge B from above. Therefore, even if the cylindrical guide 13*a* fails to drop into the groove 16*a*5 of the apparatus main assembly 14, a moment is generated about the contact point between the rotation regulating portion 25*a* and contact portion 13*e*, whereby the cylindrical guide 13*a* is caused to drop into the groove 16*a*5.

Next, referring to FIGS. 16 and 17, the steps for taking the process cartridge B out of the apparatus main assembly 14 will be described. In the drawing, the direction indicated by an arrow Y is the direction in which the process cartridge B is removed.

Figure 16:
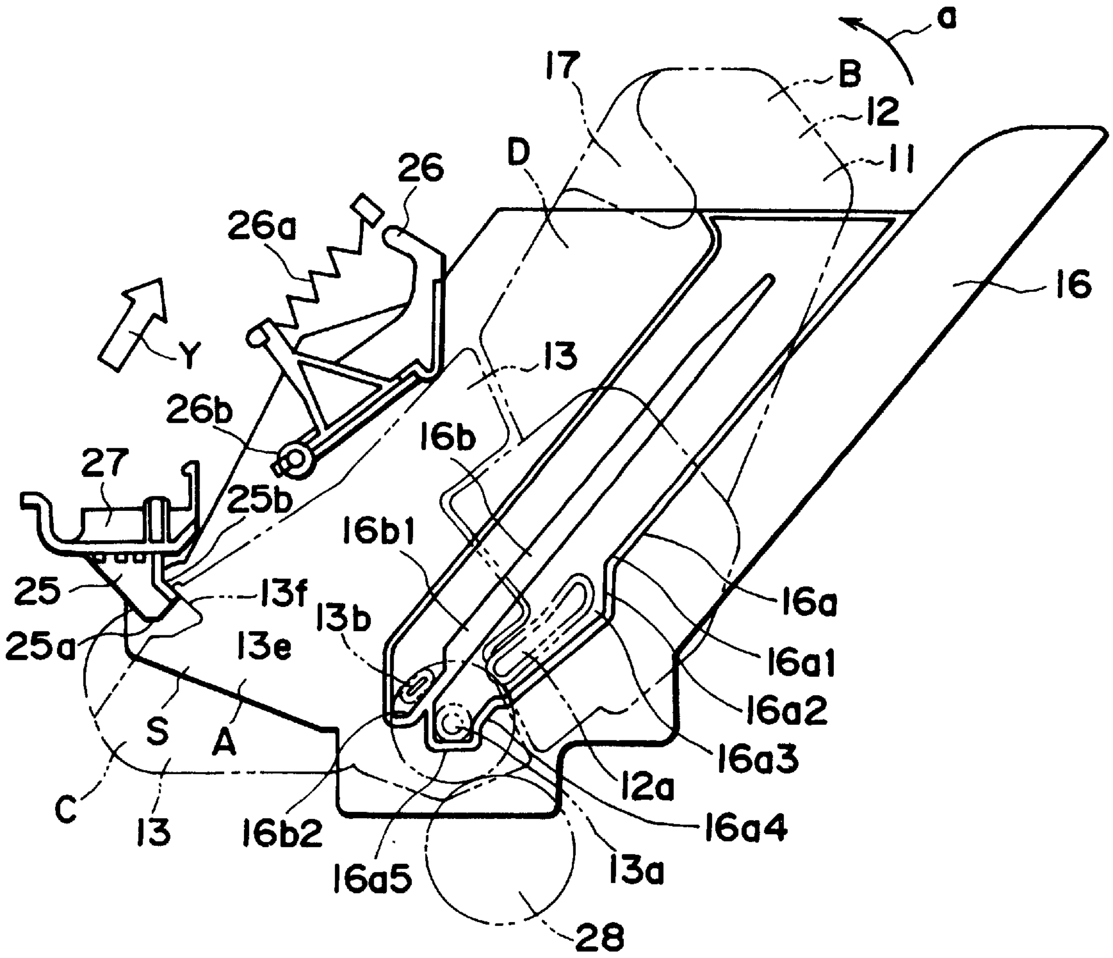
FIG. 16 is a side view illustrating mounting and demounting operation of the process cartridge of FIG. 3 relative to the main assembly of the image forming apparatus.

Referring to FIG. 16, when the process cartridge B is to be removed from the apparatus main assembly 14, the operator grabs a handle portion 17 (to provide the handle, recessed portions, are formed on the cartridge B) and lifts the cartridge B by the handle portion 17 (direction of an arrow a), whereby the process cartridge B is rotated counterclockwise about the cylindrical guide 13*a*. As a result, the disengagement contact portion 13*f* of the process cartridge B makes contact with the disengagement contact portion 25*b* of the fixed member 25 provided on the apparatus main assembly 14. As the process cartridge B is further lifted, it is rotated about the contact point F between the disengagement contact portion 13*f* and disengagement contact portion 25*b* of the fixed member 25. As a result, the cylindrical guide 13*a* is lifted out of the groove 16*a*5. At this moment, the engagement between the drum gear 7*b* and driving gear 28 is smoothly broken. In this state, the process cartridge B can be pulled straight out of the apparatus A, following the steps depicted in FIGS. 14, 13, 12, 11 and 10 in that order.

As described above, according to this embodiment, the long guide as the second guide member is extended in the cartridge inserting direction in such a manner as to bridge the lateral surfaces of the developing unit D and cleaning unit C; therefore, the process cartridge is prevented from wobbling during the installation or removal. As a result, the cartridge installation becomes more reliable, which improves the operational efficiency.

The guiding means, which serves as the guide when the process cartridge is inserted into the apparatus main assembly 14 or removed therefrom, is constituted of three guide members: cylindrical guide 13*a*, long guide 12*a*, and short guide 13*b*, and the process cartridge B is guided by at least two guides during its installation or removal; therefore, even if there is a stepped portion or the like on the installation guide members of the apparatus main assembly 14, the shock, to which the process cartridge B might be subjected, is cushioned.

The position of the process cartridge B is fixed by the rotation regulating portion 25*a* oriented to control the moment, which is generated on the cartridge B as the cartridge is driven, and the cylindrical guide 13*a*, whereas the other guides (long and short guides 12*a* and 13*b*) remain in non-contact with the guide members of the apparatus main assembly 14; therefore, the orientation of the process cartridge B remains more stable while the image forming apparatus is driven (during the image formation).

As for the guiding means for installing or removing the cartridge B, the embodiment described above exemplifies a guiding means comprising three guide members positioned at different locations. However, the embodiment described above is not limited to this example, but instead, it may be a guiding means comprising at least a cylindrical guide as the first guide member, and a long guide as the second guide member, or a guiding means comprising an additional guide member or guide members besides the three mentioned above. Such an arrangement can also stabilize the cartridge B during the installation or removal, and improves the operational efficiency.

Referring to FIGS. 9A and 9B a spur gear 7*n* is disposed on the photosensitive drum 7, at the end opposite, relative to the axial direction, to the end where the drum gear 7*b* is disposed. When the process cartridge B is mounted in the apparatus main assembly 14, this spur gear 7*n* engages with a gear (unillustrated), which is disposed in the apparatus main assembly 14 on the same axis as the transfer roller 4. As it engages with the unillustrated gear, the driving force is transmitted from the process cartridge to rotate the transfer roller 4.

A reference numeral 9*u* designates a helical gear, which is disposed at one of the axial ends of the developing roller 9*c*. It engages with the aforementioned spur gear 7*b*, whereby the driving force for rotating the developing roller 9*c* is transmitted by way of the helical drum gear 7*b*.

[Toner Container Frame (Toner Container)]

Figure 29:
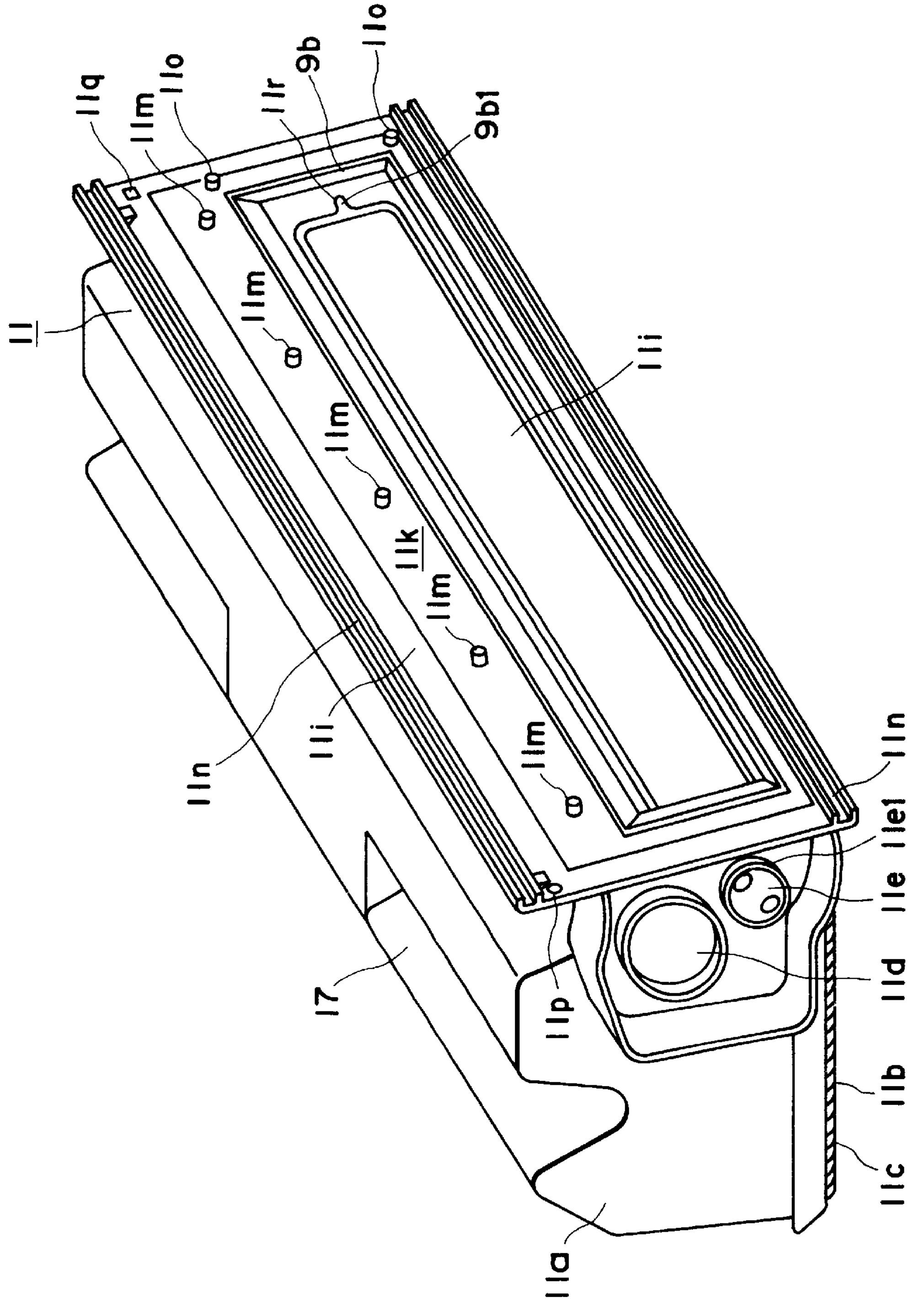
FIG. 29 is a perspective view of a toner frame.
Figure 30:
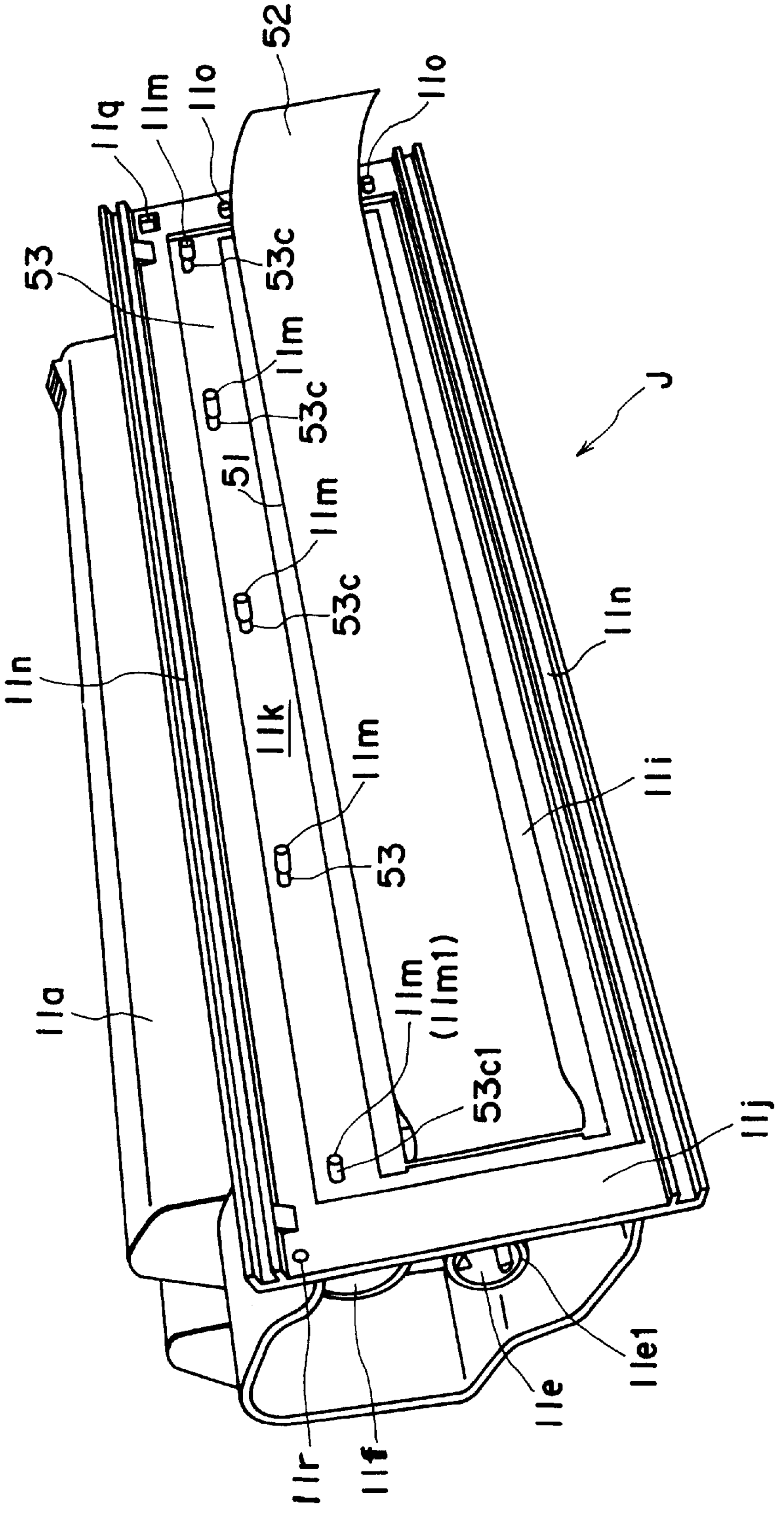
FIG. 30 is a perspective view of the toner frame after a toner seal is mounted.
Figure 32:
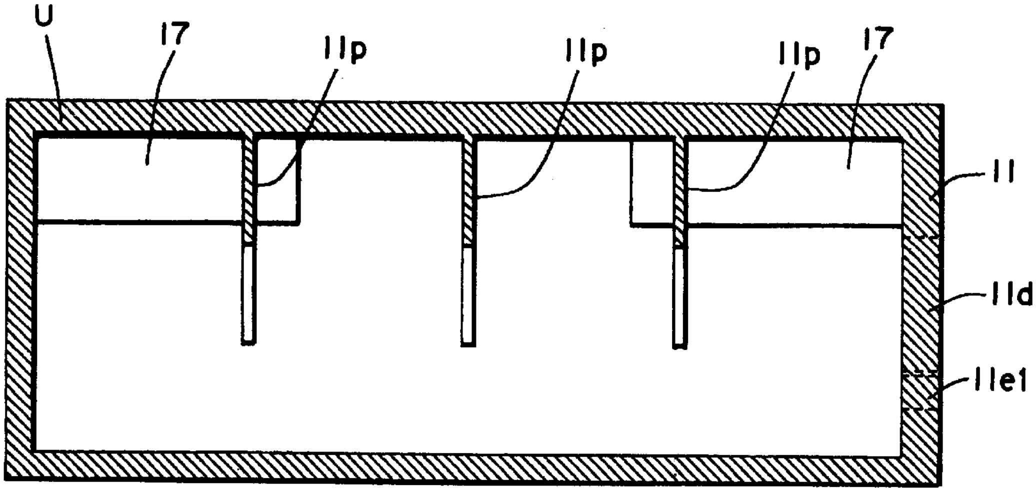
FIG. 32 is a sectional view taken along a line RO—RO of FIG. 3.
Figure 33:
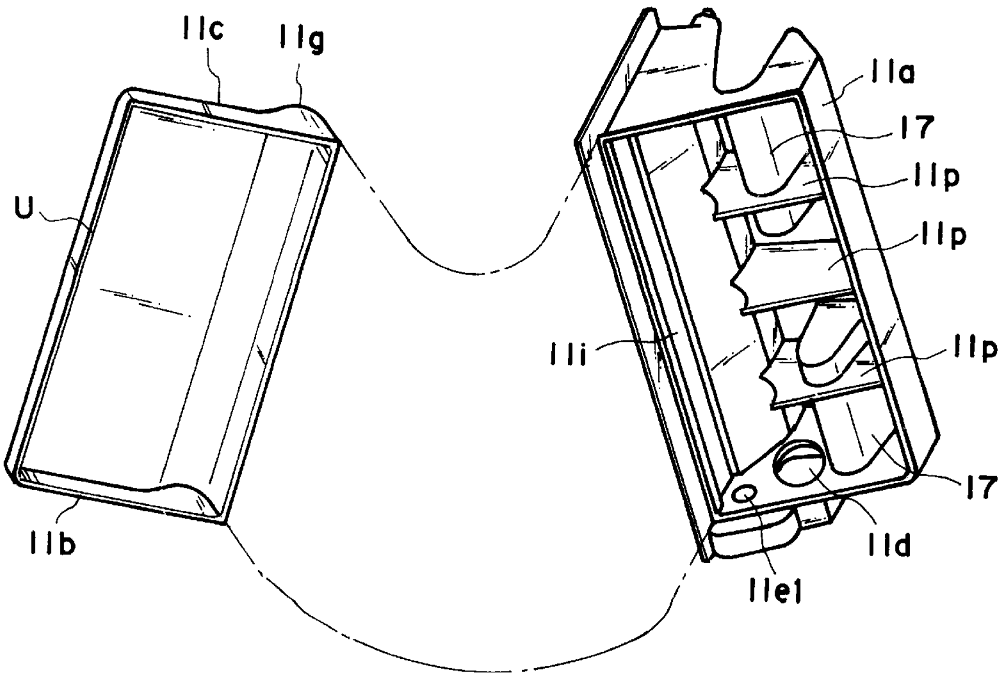
FIG. 33 is an exploded perspective view of a toner frame.

Referring to FIGS. 3, 29, 30, 32 and 33, a toner container frame (toner container) will be described in detail. FIG. 29 is a perspective view before a toner seal is welded; FIG. 30, a perspective view after the toner is filled; FIG. 32, a plan view a top frame 11*a*; and FIG. 33 is a perspective view of the disassembled toner container frame.

A toner container frame 11 is constituted of two components: a top frame 11*a* (first frame) and a bottom frame 11*b* (second frame). On each of the longitudinal end surfaces of the top frame 11*a*, a recessed portion 17 is provided. It is disposed close to the top surface of the top frame, and serves as the handhold described above. The bottom frame 11*b* is provided with a number of ribs 11*c*. They are disposed in parallel to the longitudinal direction of the process cartridge B, with intervals of approximately 5 mm, on the exterior surface, which becomes the bottom portion when the process cartridge B is assembled. When grasping the process cartridge B, the operator uses both hands, holding onto the recessed portion 17 and ribs 11*c*. In this case, the ribs 11*c* prevent the hands from slipping when grasping the process cartridge B. The top and bottom frames 11*a* and 11*b* are joined at a welding surface U, and the welding rib is melted by forced vibration, welding the frames 11*a* and 11*b* together. The methods for joining two frames are not limited to the forced vibration method. For example, they may be welded using heat welding, ultrasonic welding, or the like, or may be simply glued. Before joining two frames 11*a* and 11*b*, the stirring member 9*b* is assembled into the top frame 11*a*, and then a coupling member 11*e* is put through a hole 11*e*1, and engaged to the end portion of the stirring member 9*b* (state illustrated in FIG. 29). The hole 11*e*1 is located at one of the longitudinal ends of the top frame 11*a*. On the same side as this hole 11*e*1, a toner filling opening 11*d* for filling the toner is located. The diameter of this toner filling opening 11*d* is approximately 30 mm. In other words, the hole 11*e*1 and toner filling opening 11*d* are located next to each other. The toner frame 11 is provided with an opening 11*i* for feeding the toner from the toner frame 11 to the developing frame 12, and a seal, which will be described later, is welded to cover this opening 11*i*. After the seal is welded, the toner is filled through the toner filling opening 11*d*, and then the toner filling opening 11*d* is covered with a toner cap 11*f*, completing a toner unit J. The toner cap 11*f* is formed of soft material such as polyethylene or polypropylene, and is pressed into the toner filling opening 11*d* of the toner frame 11 so that it does not come off. Next, the toner unit 3 is joined with the developing frame 12, which will be described later, using ultrasonic welding, constituting a part of a completed developing unit D. The joining methods are not limited to ultrasonic welding. They may be glued together, or may be snap-fitted using the elasticity of their materials.

Referring to FIG. 3, the angle θ of a slanted surface K, constituting a part of the bottom frame 11*b* of the toner frame 11, must be such an angle that the toner located in the deeper end of the toner chamber slides down, naturally and continuously, in response to toner consumption. More specifically, the angle θ is the angle formed between the slanted surface K of the process cartridge B and the horizontal surface Z, with the apparatus main assembly 14 being leveled. The preferable value for the angle θ is approximately 60 degrees. When rotating, the stirring member 9*b* reaches beyond the plane of the slanted surface K. Therefore, the bottom frame 11*b* is provided with a recessed portion 11*g* to afford a clearance for the rotating stirring member 9*b*; it bulges outward. The rotational diameter of the stirring member 9*b* is approximately 30 mm. (According to this embodiment, the bottom surface of the bottom frame 11*b* dips approximately 3.6 mm. The depth of this recessed portion has only to be approximately 2.0 mm to 10 mm.) The reason for this arrangement is as follows. If the sweeping area of the stirring member 9*b* is above the slanted surface K, it is possible that the toner settling between the tip of the toner feeding (stirring) member 9*b* and the slanted surface K is not fed into the developing frame 12, being left unused. However, in this embodiment, the toner is reliably fed from the toner frame 11 into the developing frame 12.

Referring to FIG. 29, the stirring member 9*b* is formed of a rod of steel or the like material, having a diameter of approximately 3 mm and being in the form of a rectangular frame to improve toner stirring/feeding performance. Each of the opposing longitudinal ends of the stirring member 9*b* is provided with a supporting axis 9*b*1. The supporting axis 9*b*1 on one end is fitted in a hole 11*r*, which is located on the internal surface of the top frame 11*a*, adjacent to the opening 11*i* of the top frame 11*a*, and the supporting member 9*b*1 on the other end is fixed to the coupling member 11*e*.

As described above, the toner frame 11 is constituted of two members, that is, the top and bottom frames 11*a* and 11*b*, and the bottom wall of the bottom frame 11*b* is provided with the recessed portion 11*g* to afford a clearance for the toner feeding member 9*b*; therefore, it is possible to provide even a large capacity process cartridge with reliable toner feeding performance, without increasing cost.

The foregoing can be summarized as follows.

Figure 36:
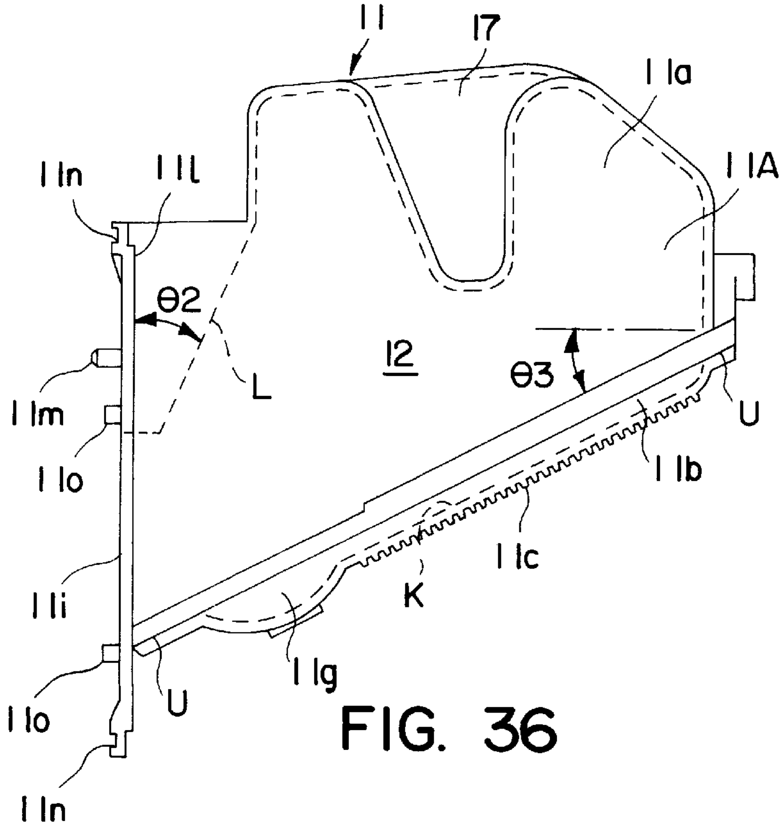
FIG. 36 is a side view of a toner frame.

The toner frame (toner container) 11 constitutes a part of a replaceable process cartridge for an electrophotographic image forming apparatus, which comprises an electrophotographic photosensitive member (7, 7*e*), and developing means 9 for developing the latent image formed on the electrophotographic photosensitive member. It stores the toner used in the developing means 9 for developing the latent image, and comprises the top frame 11*a*, and the bottom frame 11*b* which is joined with the top frame 11*a*. The top frame 11*a* comprises the opening 11*i* for supplying the stored toner to the developing means 9, and a stirring member mount 9*b*1 (FIG. 29) where the stirring member 9*b* for stirring the stored toner is rotatively mounted. The bottom frame 11*b* is provided with the recessed portion 11*g* (as seen from within), that is, a bulge (as seen from outside), to afford the clearance for the sweeping area of the stirring member 9*b*. Further, the top frame 11*a* is provided with the welding surface U (joining surface) where the bottom frame 11*b* is welded (FIGS. 29, 33 and 36). The angle of this welding surface, that is, the angle which is formed between this welding surface and the horizontal line 12 when the shorter edge of the rectangular opening 11*i* (FIG. 29) is vertically oriented, is approximately 20 to 40 degrees. Further, the top frame 11*a* is provided with the hole 11*e*1 (transmission opening), through which the coupling member 11*e* (transmission member) for transmitting the driving force from the apparatus main assembly to the stirring member 9*b*, when the process cartridge is in the image forming apparatus, is put. One end of the coupling member 11*e* is engaged with the stirring member 9*b*, and the other end is engaged with the toner feeding gear 9*s* to receive the driving force. The stirring member 9*b* is formed of a metallic rod, and is in the form of a rectangular frame. Further, the top frame 11*a* is provided with the toner filling opening 11*d* (filling opening), which is disposed next to the hole 11*e*1 (FIG. 29). It is to this toner filling opening 11*d* that the toner cap 11*f* for sealing the toner filling opening 11*d* is attached. Further, the top frame 11*a* is provided with a groove 11*n* which extends in parallel to the plane of the opening 11*i*. This groove 11*n* is where the developing frame 12, in which the developing roller 9*c* of the developing means 9 is mounted, is joined. Further, the top frame 11*a* is provided with a cover film plate 53 (seal mount) where a cover film 51 for sealing the opening 11*i* and a tear tape 52 (toner seal) for unsealing the opening 11*i* are attached. The cover film plate 53 is also in parallel to the plane of the opening 11*i*. Further, the top frame 11*a* is provided with the handhold (recessed portion) 17, which is where the longitudinal end surfaces of the process cartridge are indented to offer the handhold. The recessed portion 11*g* (bulge) of the bottom frame 11*b* is in the form of a longitudinally sliced cylinder, having an arc shaped cross section. It is disposed close to the opening 11*i*, relative to the widthwise direction of the bottom frame 11*b*, and extends in the longitudinal direction of the opening 11*i*, along substantially the entire length the opening 11*i*. Further,the top frame 11*a* is provided with a slanted surface L. The angle of the slanted surface L, that is, the angle which is formed between this slanted surface L and the vertical line when the shorter edge of the opening 11*i* is vertically oriented, is approximately 10 to 40 degrees (FIG. 36). This slanted surface L is located above the opening 11*i*, sloping down toward the opening 11*i* and extending in parallel to the longitudinal direction of the opening 11*i*, along substantially the entire length of the opening 11*i*.

The toner frame (toner container) 11 is assembled in the following manner. First, the top frame 11*a*, which is provided with the opening 11*i* for supplying the stored toner into the developing means 9, and the stirring member mount 9*b*1 where the stirring member 9*b* is mounted, is prepared. Next, the bottom frame 11, which is provided with the recessed portion 11*g* bulging outward to afford the clearance to the sweeping area of the stirring member 9*b*, is prepared. Finally, the two frames, 11*a* and 11*b*, are joined to complete the toner frame (toner container) 11.

It is predictable that the toner within the toner frame 11 will move suddenly due to vibration, impact, or the like, during the shipment of the process cartridge B from factory to user.

Therefore, according to the present invention, plural partitioning plates 11*p* are provided within the top frame 11*a* of the toner frame 11.

They are arranged in the longitudinal direction of the top frame 11*a* (FIGS. 3, 32 and 33). In this embodiment, three partitioning plates 11*p* are disposed at three different locations. As for the configuration of the partitioning plate 11*p*, the edge 11*p*1 facing the toner feeding member 9*b* forms a substantial quadrant in such a manner as to surround the toner feeding member 9*b*, and the edge 11*p*2 facing the bottom frame 11*b* holds a slight gap therefrom. Further, as seen from the longitudinal direction of the top frame 11*a*, the edge 11*p*1 is positioned so that the partitioning plate 11*p* partially blocks the toner filling opening 11*d*.

In order to prevent the toner from shifting within the toner container 11A, the partitioning plate 11*p* should be as large as possible. However, when the toner filling opening 11*d* is faced upward to fill the toner, the partitioning plate 11*p* is situated directly below the toner filling opening 11*d*, and if the partitioning plate 11*p* blocks the toner filling opening 11*d* entirely, it is difficult to fill the toner into the deepest corner of the toner container 11A. Therefore, the partitioning plate 11*p* should be formed as it is in this embodiment, so that the toner can be filled all the way into the deepest corner through the space which is not blocked by the partitioning plate 11*d*. Further, according to the present invention, the partitioning plate 11*p* occupies a substantial part of the cross-sectional area perpendicular to the longitudinal direction of the toner frame 11; therefore, even when the process cartridge B is subjected to vibration, impact, or the like, the partitioning plate 11*p* can prevent the toner from shifting and becoming compacted.

[Toner Frame Structure Facing Developing Frame]

Figure 31B:
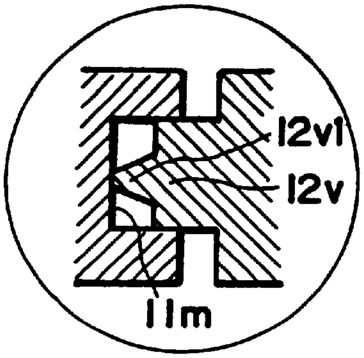
FIGS. 31A and 31B are longitudinal sectional views of the toner seal of FIG. 30.
Figure 31A:
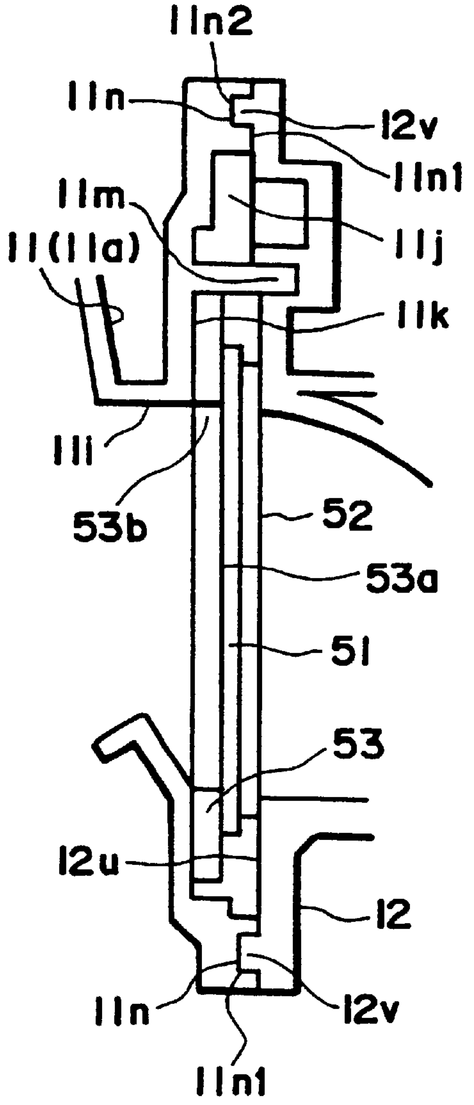

Referring to FIGS. 3, 29, 31A and 31B at the joint between the toner frame 11 and developing frame 12, the opening 11*i* for feeding the toner from the toner frame 11 into the developing frame 12 is provided. The opening 11*i* is surrounded by a recessed surface 11*k*, on which the cover film plate 53 is thermally welded. The depth of this recessed surface 11*k* is such that after the cover film plate 53 is welded to the recessed surface 11, the outward facing surface of the cover film plate 53 becomes substantilly level with the surface 11*j* of the toner frame 11 (top frame 11*a*). On the recessed surface 11*k*, plural dowels 11*m* are disposed in a straight line along one of the longitudinal edges of the opening 11*i* (in this embodiment, five dowels 11*m* are disposed at five different locations). Also, two dowels 11*o* are disposed on the surface 11*j* along one of the widthwise edges of opening 11*i*; these two dowels 11*o* are not on the recessed surface 11*k*. Further, along each of the longitudinal external edges of the surface 11*j*, a groove 11*n* is disposed in parallel to the one on the opposing side. The bottom surface 11*n*2 of this groove 11*n* is above the level of the surface 11*j* (closer to the developing frame 11 than the surface 11*i*) (FIGS. 31A and 31B).

The surface of the developing frame 12, which comes directly in contact with the surface of the toner frame 11, is a surface 12*u*. Along each of the longitudinal edges of this surface 12*u*, a tongue 12*v*, which fits into the groove 11*n* of the toner frame 11, is provided. At the end surface of this tongue 12*v*, an angular ridge 12*v*1, used for ultrasonic welding, is provided (FIGS. 31A and 31B); the angular ridge 12 is melted by ultrasonic welding to weld the toner frame 11 and developing frame 12, along their longitudinal external edges.

Figure 27:
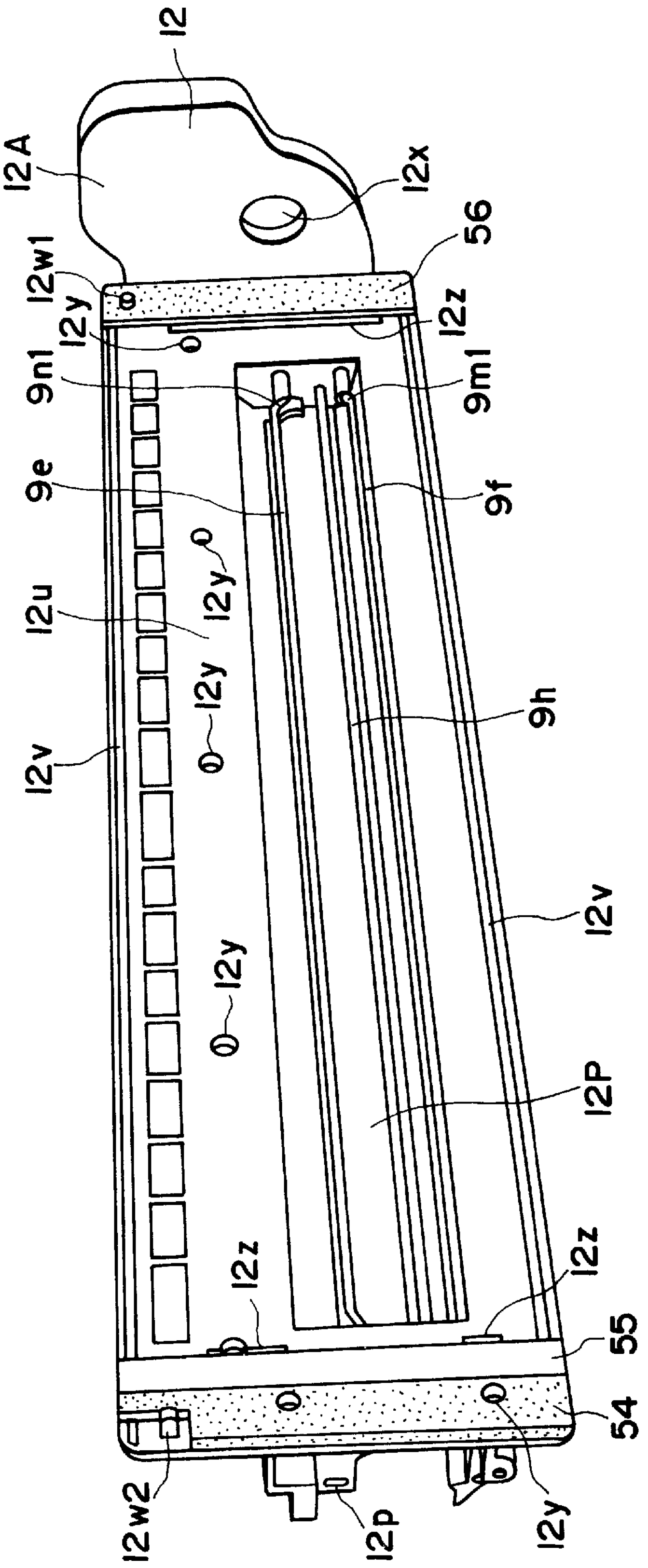
FIG. 27 is a perspective view of a developing device frame or developing frame.

Referring to FIG. 30, the cover film plate 53, which is loosely fitted onto the recessed surface 11*k* of the toner frame 11, is provided with holes 53*c*, which correspond to the plural dowels 11*m*. The holes 53*c*1, which exactly fit to the corresponding end dowels 11*m*1, are round, and the holes 53*c* other than the round holes 53*c*1 are elongated so as to be loosely fitted to the corresponding dowels 11*m* other than the end dowels 11*m*1. More specifically, the positional relationship between the dowels 11*m* and hole 53*c* is such that when the dowels 11*m*1 and 11*m* are fitted in the corresponding holes 53*c*1 and 53*c*, the dowel 11*m* is positioned at the middle of the elongated holes 53*c* in the longitudinal direction of the elongated holes 53*c*. Further, the cover film plate 53 is provided with an opening 53*b* (having approximately the same size as the opening 11*i*), which corresponds to the opening 11*i*. In order to seal this opening 53*b*, a cover film 51, which can be easily torn in the longitudinal direction, is pasted on the cover film plate 53; the four peripheral areas of the cover film 51 are pasted on corresponding four peripheral areas of the opening 53*b*. On the cover film 51, the tear tape 52 for tearing the cover film 51 to unseal the opening 53*b* is welded. The tear tape 52 is extended from one of the longitudinal ends of the opening 53*b* to the other end, where it is doubled back and put through the starting end, between the toner frame 11 and an elastic seal member 54 (FIG. 27), such as a piece of felt, which is pasted on the flat developing frame surface 12*u*, directly facing the toner frame 11, at the starting end. The doubled back end of the tear tape 52 is exposed from between the toner frame 11 and developing frame 12 (FIGS. 6 and 30). On the inward side surface of the seal member 54, a synthetic resin film tape 55 with a small friction coefficient is pasted. Also on the flat surface 12*u*, an elastic seal member 56 is pasted at the longitudinal end opposite from where the seal member 54 is pasted (FIG. 27).

In order to make it easier to align the toner frame 11 and developing frame 12 when joining two frames 11 and 12, the surface 11*j* of the toner frame 11 is provided with a round hole 11*r* and a square hole 11*q*, which engage with a cylindrical dowel 12*w*1 and square column dowel 12*w*2, respectively, provided on the developing frame 12; the round hole 11*r* engages with the dowel 12*w*1, and the square hole 11*q* loosely engages with the dowel 12*w*2. The seal member 56 is fitted around the cylindrical dowel 12*w*1, and also is glued to the flat surface 12*u*. Further, in the flat surface 12*u* of the developing frame 12, which directly comes in contact with the toner frame 11, recessed portions 12*y* are provided, in which the dowels 11*m* and 11*o* of the toner frame 11 loosely fit.

Before the toner frame 11 and developing frame 12 are joined, each frame is independently assembled as a subcomponent. Thereafter, the cylindrical positioning dowel 12*w*1 and square column positioning dowel 12*w*2 of the developing frame 12 are fitted into the round positioning hole 11*r* and square positioning hole 11*q* of the toner frame 11, respectively. Also, the tongue 12*v* of the developing frame 12 is fitted into the groove 11*n* of the toner frame 11. Then, as the toner frame and developing frame 12 are pressed together, the seal members 54 and 56 are compressed, and ridges 12*z*, which are integrally formed as spacers with the developing frame, at each of the longitudinal ends, approach the surface of the toner frame 11. The ridges 12*z* are aligned in the widthwise direction of the developing frame 12, with an interval substantially equal to the width of the tear tape 52, to allow the tear tape 52 to be put through with the toner frame 11 and developing frame 12 being pressed together as described above, ultrasonic vibration is applied between the tongue 12*v* and groove 11*n*, whereby the angular ridge 12*v*1 is melted and welded to the bottom of the groove 11*n* by the frictional heat. As a result, the edges 11*n*1 of the grooves 11*n* of the toner frame 11, and the ridges 12*z*, as the spacers, of the developing frame 12, firmly contact their counterparts, sealing the entire joint between the toner frame 11 and developing frame 12, except for the gap left between the surface 11*j* of the toner frame 11 and the flat surface 12*u* of the developing frame 12. The cover film 51 and tear tape 52 are confined in this gap.

In order to feed the toner stored in the toner frame 11 into the developing frame 12, the operator has only to pull the end portion 52*a* (FIG. 6) of the tear tape 52, which is exposed from the process cartridge B, by hand. As the tear tape 52 is pulled, the cover film 51 is torn open to unseal the opening 53*b* (11*i*), allowing the toner to be fed from the toner frame 11 into the developing frame 12.

Since the joining portions of the toner frame 11 and developing frame 12 are structured as described in the foregoing, that is since the surface of the cover film plate 53 and the surface 11*j* of the toner frame 11 are substantially at the same level, the tear tape 52 can be smoothly pulled out from between the two frames 11 and 12 by applying to the tear tape 52 a sufficient amount of force for tearing the cover film 51 as described above. The cover film plate 53 is located by the dowel 11*m*1 at one of its longitudinal ends, that is, the end opposite to where the tear tape 52 is pulled out, and in addition, it is disposed on the recessed surface 11*k* of the toner frame 11; therefore, it is not liable to be dislocated. Further, the dowels 11*m* are aligned in a straight line in the longitudinal direction, and the cover film plate 53 is fitted to these dowels 11*m*; therefore, even the easily deformable cover film 51 can be precisely located to allow it to remain flat. Further, even if the assembly process moves on to the subsequent steps before the welded joint between the cover film plate 53 and toner frame 11 is solidified and stabilized, the cover film plate 53 is not dislocated.

When the toner frame 11 and developing frame 12 are joined using ultrasonic welding method, frictional heat is generated to melt the angular ridge 12*v*1. This frictional heat is liable to cause thermal stress in the toner frame 11 and developing frame 12, which might result in the thermal deformation of the toner frame 11 and developing frame 12. However, according to this embodiment, the groove 11*n* of the toner frame 11 and the tongue 12*v* of the developing frame 12 are engaged across substantially the full length in the longitudinal direction. In other words, the joint portions between the toner frame 11 and developing frame 12 are reinforced as to frames 11 and 12 are joined; therefore, the thermal deformation due to the thermal stress is not likely to occur.

As described above, the grooves 11*n*, handholds (recessed portions) 17, partitioning plates 11*p*, toner filling opening 11*d*, hole 11*e*1, round hole 11*r*, square hole 11*q*, and cover film plate mount (recessed surface 11*k*, dowels 11*m* and opening 11*i*), of the top frame 11*a* are integrally formed with the top frame 11*a*. Also, the ribs 11*c* and recessed portion 11*g*, of the bottom frame 11*b* are integrally formed with the bottom frame 11*b*. The material for the top and bottom frames 11*a* and 11*b* is a plastic material, for example, polyethylene, ABS resin (acrylonitrile-butadiene-styrene copolymer), polycarbonate, polyethylene, and polypropylene.

FIG. 36 is a side view of the toner frame 11 used in this embodiment; the surface 11*j* of the toner frame 11, which is joined with the developing frame 12, is vertically oriented.

The toner frame 11 employed in this embodiment is provided with two slanted surfaces K and L, which allow the toner (single component toner) stored in the storage portion 11A to efficiently descend toward the opening 11*i*. Both slanted surfaces K and L extend across the entire longitudinal length of the toner frame 11. The slanted surface L is located above the opening 11*i*, and the slanted surface K is located immediately behind the opening 11*i* (being slanted in the widthwise direction of the toner frame 11). The slanted surface L belongs to the top frame 11*a*, and the slanted surface K is formed as a part of the structure of the bottom frame 11*b*. The angle θ2 of the slanted surface L relative to a vertical line 11 (joining surface 11*j*) is approximately 10 degrees to 40 degrees (in this embodiment, θ2 is set at 24 degrees). The angle θ3 of the slanted surface K, relative to the horizontal plane 12, perpendicular to the vertical line 11, is approximately 20 to 40 degrees (in this embodiment, θ3 is set at approximately 27 degrees). In other words, the configuration of the top frame 11*a* in this embodiment is regulated so that when the bottom frame 11*b* is joined with the top frame 11*a*, the joined bottom frame 11*b* holds the aforementioned angle. Therefore, even if the toner storage portion 11A is such a toner storage portion that contains a large amount (for example, no less than 800 g), the toner can be efficiently fed toward the opening 11*i*.

Next, the developing frame will be further described in detail.

[Developing Frame]

Figure 26:
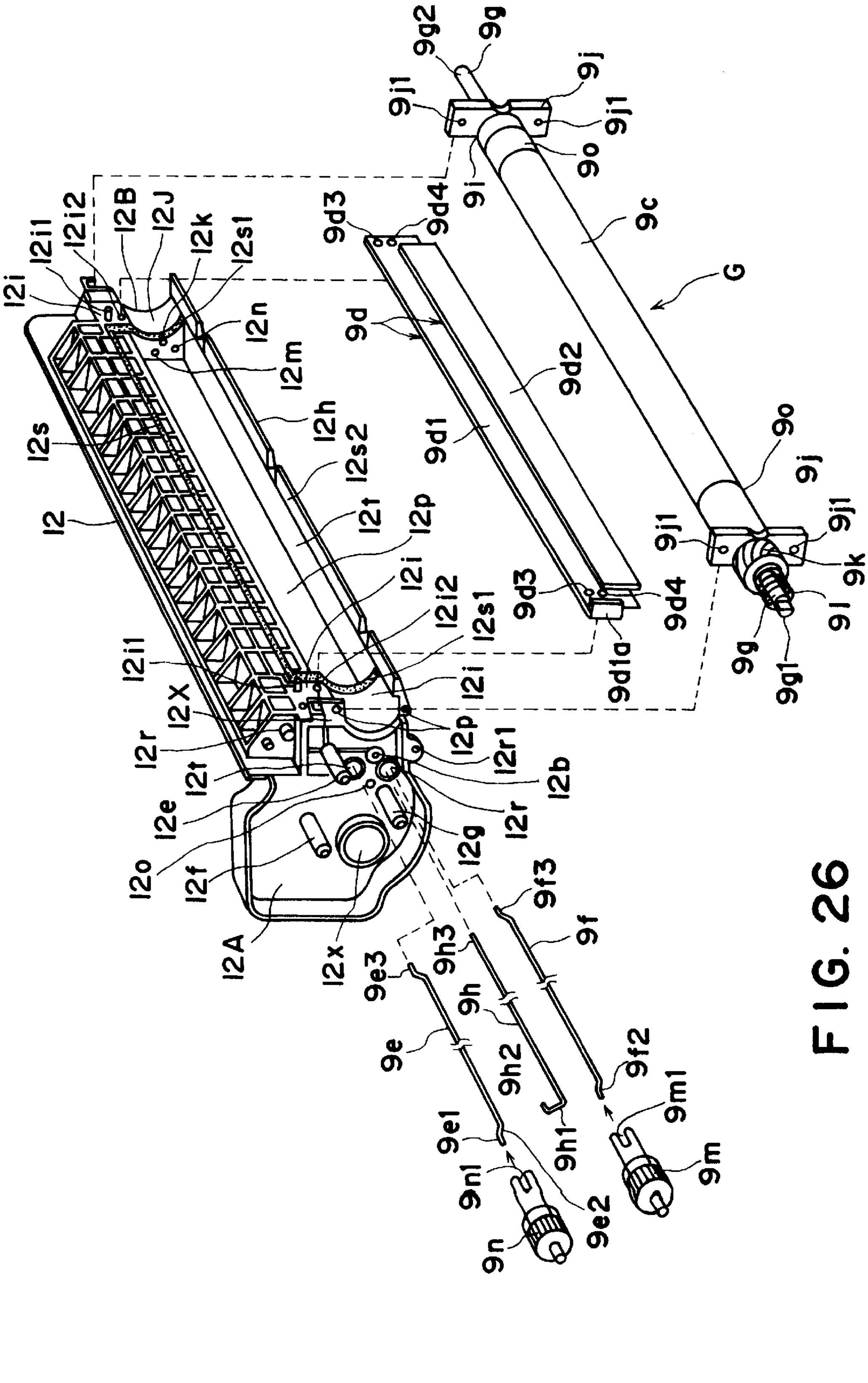
FIG. 26 is an exploded perspective view of a developing unit.
Figure 28:
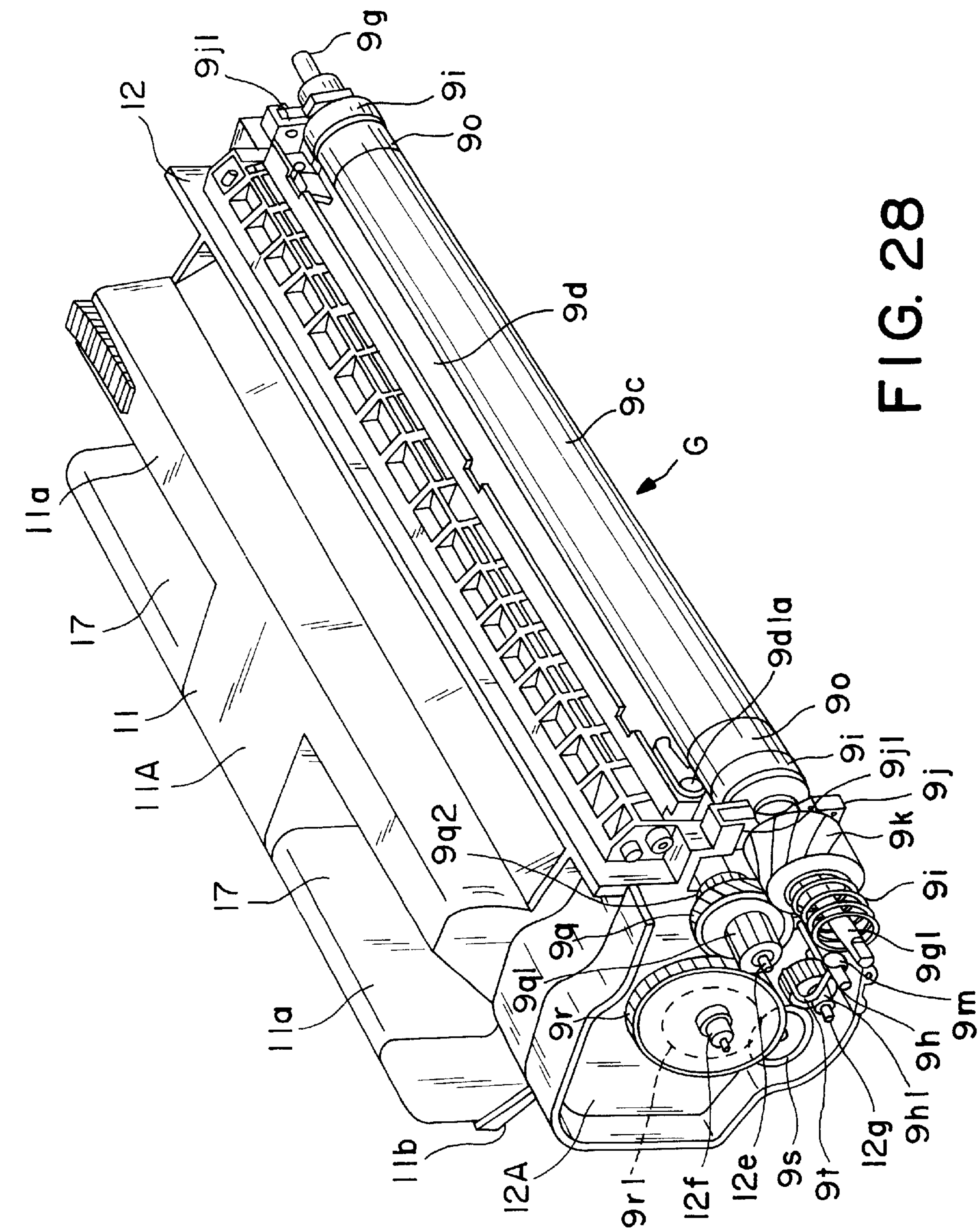
FIG. 28 is a perspective view of a developing unit without the developing holder.

The developing frame will be described with reference to FIGS. 3, 26, 27 and 28. FIG. 26 is an exploded perspective view of the developing frame 12, illustrating how the components are assembled; FIG. 27, a perspective view of the developing frame 12 and toner stirring member 9*e* and 9*f*, as seen from the direction of the surface to be welded, illustrating how the stirring members 9*e* and 9*f* are assembled into the frame 12; and FIG. 28 is a perspective view of the developing unit without the developing frame holder.

As described above, the developing roller 9*c*, developing blade 9*d*, toner stirring members 9*e* and 9*f*, and antenna rod 9*h* for detecting the amount of the remaining toner, are assembled into the developing frame 12.

The developing blade 9*d* comprises a 1–2 mm thick metallic plate 9*d*1, and a urethane rubber blade 9*d*2 fixed to the metallic plate 9*d*2 by means of hot melting, double-side adhesive tape, or the like. It regulates the amount of toner coated on the peripheral surface of the developing roller 9*c*. The flatness of a blade accommodating flat surface 12*i*, as a blade mount, provided on the developing frame 12 is regulated; it is approximately 0.05 mm. This flat surface 12*i* is provided with dowels 12*i*1 and screw holes 12*i*2 . The dowels 12*i*1 are fitted into the holes 9*d*3 provided on the metallic plate 9*d*1. Thereafter, the metallic plate 9*d*1 is screwed onto the flat surface 12*i*, using the screw holes 9*dr* provided on the metallic plate 9*d*1, and the screw holes 12*i*2 . Also on the developing frame 12, an elastic seal member 12*s* formed of MOLTPLANE or the like is pasted to prevent toner invasion. It is disposed above the metallic plate 9*d*1, extending in the longitudinal direction thereof. In addition, an elastic seal member 12*s*1 is pasted on the developing member, at each of the longitudinal ends, covering from both ends of the elastic seal member 12*s* to a round surface 12*j*, which follows the contour developing roller 9*c*. Further, on the mandible-like portion 12*h*, a thin elastic seal member 12*s*2 is pasted. This elastic seal member 12*s*2 contracts the generatrix of the developing roller 9*c*.

One 9*d*1*a* of the longitudinal ends of the developing blade 9*d* is bent by approximately 90 degrees. This bent portion 9*d*1*a* equalizes the voltages of the metallic plate 9*d*1 and developing roller 9*c* by contacting a development bias contact point 121 (FIGS. 23A and 23B), supported on a developing frame holder 40 which will be described later. This arrangement is made because the amount of the toner is detected on the basis of the change in the capacitance between the antenna rod 9*h* for detecting the amount of the remaining toner, and the developing roller 9*c*, and this capacitance must be prevented from irregularly changing due to the influence of the metallic plate 9*d*1.

Next, a developing roller unit G will be described. The developing roller unit G comprises: (1) developing roller 9*c*; (2) spacer roller 9*i* for keeping constant the distance between the peripheral surface of the developing roller 9*c* and the peripheral surface of the photosensitive drum 7; (3) developing roller bearing 9*j* for locating the developing roller 9*c* on the developing frame 12; (4) sleeve cap 9*o* which is placed on both ends of the developing roller 9*c* so that leakage does not occur between the aluminum cylindrical portion of the photosensitive drum 7 and the aluminum cylindrical portion of the developing roller 9*c*; (5) developing roller gear 9*k* (helical gear) which rotates the developing roller 9*c* as it receives the driving force from the helical gear 7*b* mounted on the photosensitive drum 7; (6) coil spring contact point 91, one end of which is in engagement with the developing roller gear 9*k* mounted at one end of the developing roller gear 9*k*; and (7) magnet 9*g* which is contained in the developing roller 9*c* to adhere the toner to the peripheral surface of the developing roller 9*c*. This developing unit G is attached to the developing roller mount 12X of the developing frame 12 in the following manner. First, a hole 9*j*1 provided on each of the developing roller bearings 9*j* is aligned with the hole 12*p* provided at each of the longitudinal ends of the developing frame 12, and a pin provided on the development holder 40, which will be described later, is inserted through the holes 9*j*1 and 12*d*. Then, the developing frame holder 40 is fixed to the developing frame 12 using screws.

As described above, in this embodiment, when the developing roller 9*c* is mounted on the developing frame 12, the developing roller unit G is assembled first. Then, the assembled developing roller unit G is mounted on the developing frame 12 with the use of developing frame holder 40. By going through these steps, assembly efficiency is improved compared to the case in which the developing roller 9*c* alone is directly mounted on the developing frame 12.

The developing roller unit G is assembled through the following steps. To begin with, each end of the developing roller 9*c* is covered with the sleeve cap 9*o*. Next, the spacer roller 9*i* is mounted at each end of the developing roller 9*c*; the spacer roller 9*i* is placed on the outward side of the sleeve cap 9*o*. Then, the developing roller bearing 9*j* is mounted on the outward side of the spacer roller 9*i*. Next, the developing roller gear 9*k* is mounted at one of the longitudinal ends of the developing roller 9*c*, on the outward side of the bearing 9*j*, and the coil spring contact point 91 is mounted on the further outward side. At this point in the assembly, one end 9*g*1 of magnet 9*g*, which has a D-shaped cross section, projects from one end of the developing roller 9*c*, that is, the end where the developing roller gear 9*k* is mounted, and the other end of the magnet 9*g*, which is cylindrical, projects from the other end of the developing roller 9*c*. This is the way developing roller unit G is assembled.

Next, the antenna rod 9*h* for detecting the amount of the remaining toner will be described. One end of the antenna rod 9*h* is U-shaped. This U-shaped portion 9*h*1 is placed in contact with, being thereby electrically connected to, the toner detection contact point 122 mounted on the developing frame holder 40 which will be described later. This antenna rod 9*h* is attached to the developing frame 12 in the following manner. First, the end portion 9*h*3 of the antenna rod 9*h* is inserted into the developing frame 12 through a through hole 12*b*, provided on the side plate 12A of the developing frame 12. Then, the inserted end portion 9*h*3 is put through a through hole 12*k* provided on the other side plate of the developing frame 12, being supported thereby. In other words, the antenna rod 9*h* is located and supported by the through holes 12*b* and 12*k*. In the through hole 12*b*, a seal member (unillustrated) formed of felt, sponge, or the like, is inserted to prevent toner invasion.

Further, the tip portion 9*h*2 of the U-shaped portion 9*h*1 is inserted into an approximately 5 mm deep hole 12*o* of the developing frame 12 to locate the antenna rod 9*h* in the axial direction. Also, this arrangement improves the rigidity of the U-shaped portion 9*h*1 as the contact point which contacts the toner detection contact point 122 which will be described later. The through hole 12*k*, into which the end portion 9*h*3 of the antenna rod 9*h* has been inserted, is plugged from outside using thermal welding or the like method, so that toner invasion can be prevented. Next, the toner stirring members 9*e* and 9*f* will be described. The toner stirring members 9*e* and 9*f* are shaped like a crank, and stir the toner as they rotate. They are disposed near the developing roller 9*c* and antenna rod 9*h*, across the toner path which the toner having been stored in the toner container 11A passes as it is fed toward the developing roller 9*c*. The toner stirring members 9*e* and 9*f* are fixed perpendicular to each other.

In assembling the toner stirring members 9*e* and 9*f* onto the developing frame 12, to begin with, the end portions 9*e*3 and 9*f*3 of the toner stirring members 9*e* and 9*f*, respectively, are inserted through corresponding through holes 12*t* and 12*r* provided on the side plate 12A of the developing frame 12, which is on the same side as the one through which the antenna rod 9*h* is inserted. Then, the end portions 9*e*3 and 9*f*3 are inserted into corresponding through holes 12*m* and 12*n*, provided on the side plate 12B, which is the opposite side plate of the side plate 12A. Thereafter, each of the through holes 12*m* and 12*n* are plugged from outside by the thermal welding method, as are the through holes 12*k* for the antenna rod 9*h*. After the stirring members 9*e* and 9*f* are inserted into the developing frame 12 as described above, stirring gears 9*m* and 9*n* are fitted into the through holes 12*t* and 12*r*. At this time, notches 9*m*1 and 9*n*1, which are cut in the axial direction at the end portions of the gears 9*m* and 9*n*, respectively, are engaged with the crank arms 9*e*2 and 9*f*2 of the toner stirring members 9*e* and 9*f*, respectively. Further, the journals 9*e*1 and 9*f*1 of the stirring members 9*e* and 9*f* are fitted into center holes (unillustrated) provided at the deeper ends of the notches 9*m*1 and 9*n*1 of the gear 9*m* and 9*n*, respectively, supporting thereby the toner stirring members 9*e* and 9*f* *on the developing frame 12.*

When the toner frame 11 and developing frame 12 are joined, the side plate 12A of the developing frame 12, which is located on the side from which the antenna rod 9*h* and toner stirring members 9*e* and 9*f* are inserted, overlaps the side plate of the toner frame 11, covering the toner cap 11*f* provided on the top frame 11*a* of the toner frame 11. Also, on the side plate 12A, a hole 12*x* is provided, in which a toner feeding gear 9*s* (FIG. 28) for transmitting the driving force to the toner feeding member 9*b* is rotatively fitted. The toner feeding gear 9*s* is linked with the coupling member 11*e* (FIGS. 29 and 30), which is rotatively supported by the toner frame 11*a* and is engaged with the end portion of the toner feeding member 9*b*, whereby the driving force is transmitted to the toner feeding member 9*b*.

Next, how the driving force is transmitted will be described.

Figure 35:
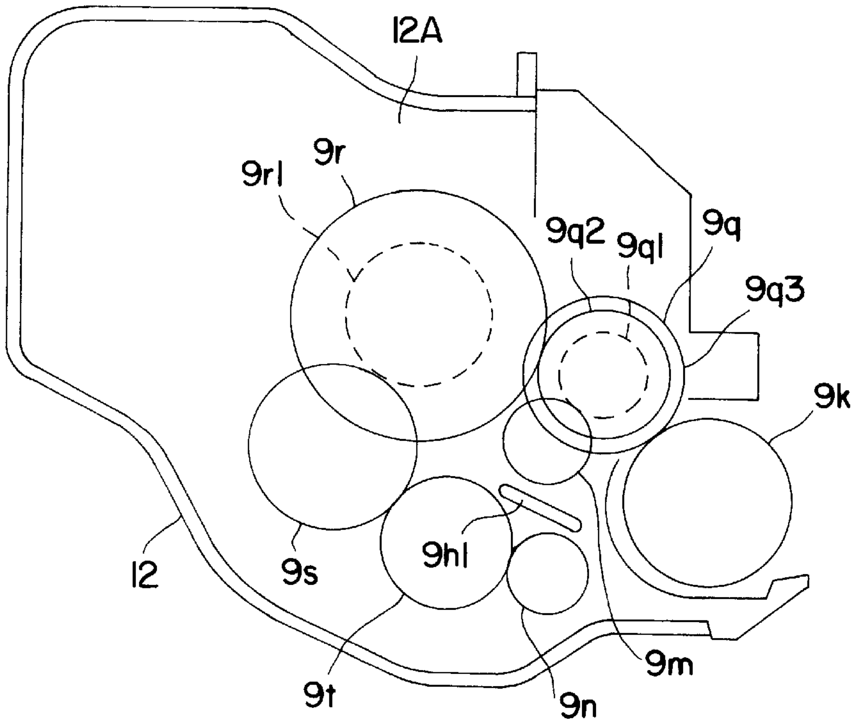
FIG. 35 is a side view illustrating a gear train of FIG. 28.

Referring to FIGS. 28 and 35, the stirring gears 9*m* and 9*n*, and the toner feeding gear 9*s*, receive the driving force from the developing roller gear 9*k*. More specifically, to begin with the stirring gear 9*m* receives the driving force through a small gear 9*g*1 of an idler gear 9*q* as a stepped gear. Receiving this driving force, the stirring member 9*e* rotates. The idler gear 9*g* receives the driving force from the developing roller gear 9*k* since the large gear 9*g*3 of the idler gear 9*g* meshes with the developing roller gear 9*k*. The received driving force is transmitted from the middle gear 9*g*2 of the idler gear 9*g* to an idler gear 9*r* as a stepped gear. Then, the driving force is further transmitted from the small gear 9*r*1 of the idler gear 9*r* to the toner feeding gear 9*s*, rotating thereby the stirring member 9*b* (through the coupling member 11*e*). Further, the driving force is transmitted from the toner feeding gear 9*s* to the stirring gear 9*n* by way of an idler gear 9*t* to rotate the stirring member 9*f*. It should be noted here that all the idler gears, 9*q*, 9*r* and 9*t*, are rotatively mounted on corresponding dowels, 12*e* 12*f* and 12*g*, which are integrally formed with the developing frame 12. These dowels 12*e*, 12*f* and 12*g* are approximately 2 mm to 3 mm in diameter, and their end portions are supported by the developing frame holder 40 which will be described later; therefore, the dowels 12*e*, 12*f* and 12*g* do not deform due to load. Further, the rigidity of dowels 12*e*, 12*f* or 12*g* is increased by padding or stepping their base portions, or the like means.

The gear train described above is disposed on the same side surface as the previously described U-shaped portion 9*h*1 of the anttena 9*h*.

With the adoption of the above structure, a single member (in this embodiment, the developing frame holder 40) can support the gears constituting the gear train, and establish electrical connection for the toner remaining detecting contact point. In addition, all of the toner stirring members 9*e* and 9*f*, antenna rod 9*h*, gears 9*o*, 9*r*, 9*s* and 9*t* constituting the gear train, and stirring gears 9*m* and 9*n*, can be assembled into the developing frame 12 from the same side relative to the longitudinal direction of the developing frame 12. Therefore, assembly effeciency can be greatly improved.

The mandible-like portion 12*h* of the developing frame 12 doubles as a conveying guide for the recording medium 2, such as recording paper. In order to increase the rigidity, the developing frame 12 may be formed using the blow molding method.

Referring to FIG. 27, a reference numeral 12P designates an opening which extends in the longitudinal direction of the developing frame 12. As the toner frame 11 and developing frame 12 are joined, this opening 12P aligns with the opening 11*i* of the toner frame 11, allowing the toner stored in the toner frame 11 to be supplied to the developing roller 9*c*. The aforementioned stirring members 9*e* and 9*f*, and antenna rod 9*h*, are mounted across the entire longitudinal length of this opening 12P.

Further, according to this embodiment, the developing frame 12 comprising the developing roller mount 12X, side plate 12A, developing blade mount (blade accommodating flat surface 12*i*), antenna rod 9*h* mount (through holes 12*b*, 12*k* and 12*o*), stirring member mount (through holes 12*t*, 12*r*, 12*m* and 121*n*), gear mount (dowels 12*e*, 12*f* and 12*g*), and the like, is integrally formed with these portions. The material for the developing frame 12 is the same as the aforementioned material for the toner frame 11.

[Developing Frame Holder 40]

Next, the developing frame holder 40 will be described.

Figure 23A:
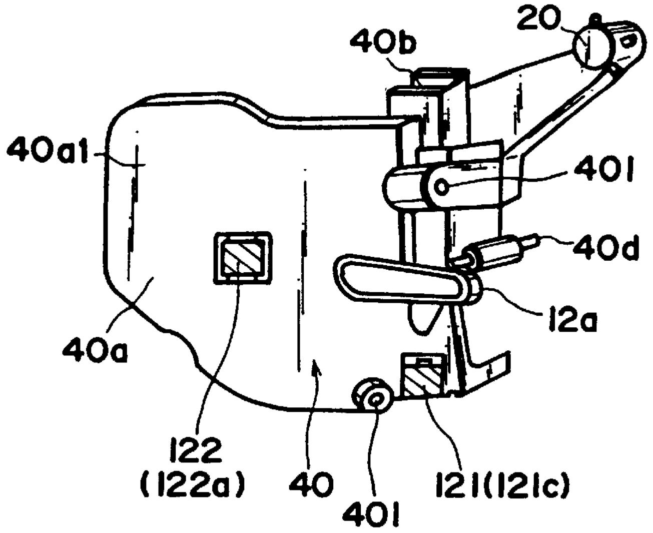
FIG. 23*a* shows an outer appearance of a developing holder.
Figure 23B:
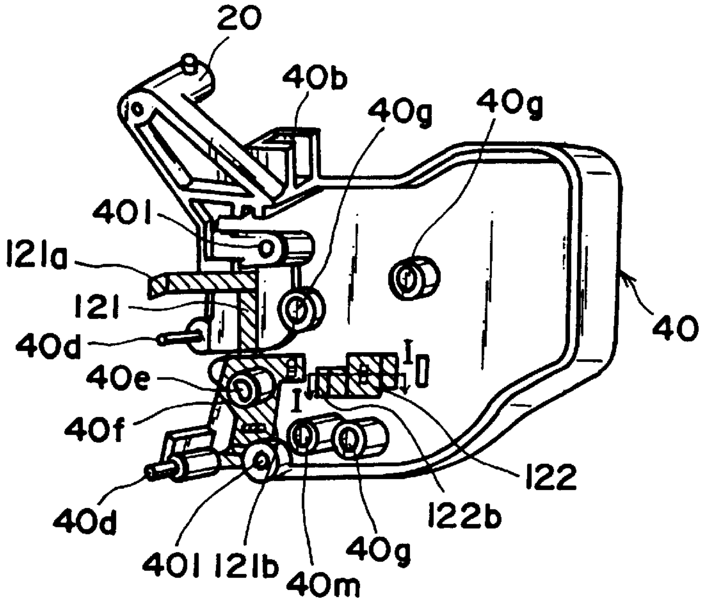
FIG. 23*b* is a perspective view of an inside of a developing device holder.
Figure 24:
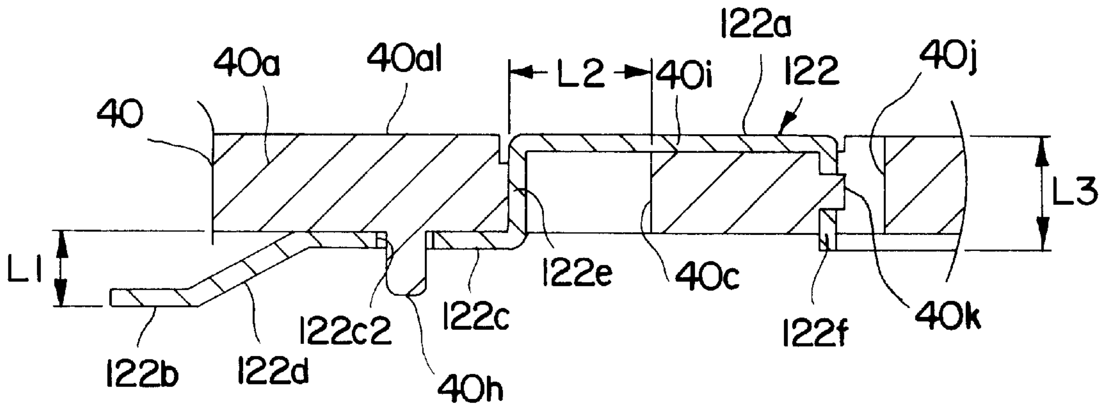
FIG. 24 is a sectional view taken along a line I—I in FIG. 23B.
Figure 25:
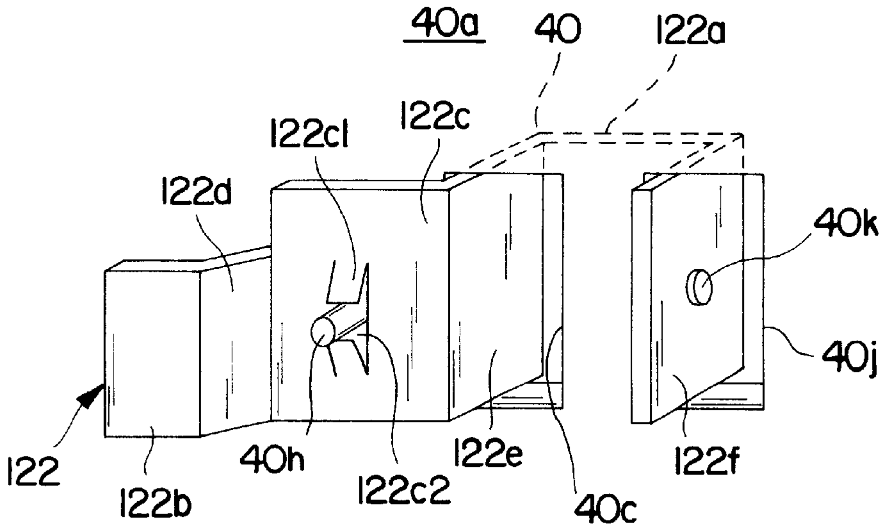
FIG. 25 is an enlarged view of a toner detection point in FIG. 23B.

Referring to FIGS. 4–9 and FIGS. 23A–25, description will be given as to the developing frame holder 40. FIG. 23A is a perspective view of the developing frame holder, which is mounted on the driving side, as seen from the outside of the developing frame 12; FIG. 23B a perspective view of the same as seen from inside; FIG. 24, an enlarged sectional view of the FIG. 23B at (I)—(I) line; and FIG. 25 is an enlarged perspective view of the toner detecting contact point.

The developing unit D is completed by attaching the development holders 40 and 41 at the corresponding lateral ends of the developing frame assembly, having been finished up to the stage illustrated in FIG. 28. In this case, the developing roller unit G is mounted in the following manner. First, one of two pins 40*d* provided at different locations of the developing frame holder is engaged with the hole 9*j*1 of the aforementioned developing roller bearing, and the other pin 40*d* is engaged with the hole 12*p* of the developing frame 12. Next, the developing frame holders 40 and 41 are fixed to the developing frame 12 with screws, in such a manner that the developing roller bearings 9*j* are sandwiched between the corresponding developing frame holders 40 and 41, and the developing frame 12. At this time, the screws are put through the corresponding holes 401 of the holders 40 and 41. Next, one end 9*g*1 of the magnet 9*g* (FIGS. 3 and 28) contained in the developing roller 9*c* is engaged with a D-shaped hole 40*e* provided on the developing frame holder 40, and the other end 9*g*2 is engaged with a hole (unillustrated) provided on the developing frame holder 41, whereby the position of the magnet 9*g* in the longitudinal direction is fixed. The angles of the magnetic poles of the magnet 9*g* are determined as the end portion 9*g*1, having the aforementioned D-shaped section, is engaged with the D-shaped hole 40*e* of the developing frame holder 40.

Next, rotational shafts 20, which are integrally formed with the developing frame holders 40 and 41 and project therefrom, are placed into recessed portions 21 (FIG. 9B) of the cleaning frame, and covered with connector members 22 (FIG. 7), whereby the developing unit D is rotatively supported on the cleaning frame 13 which supports the photosensitive drum 7, and in addition, the compression spring 22*a* attached to the connector members 22 is compressed against the spring seats 40*h* of the developing frame holders 40 and 41, stabilizing the distance between the photosensitive drum 7 and developing roller 9*c* (preventing the distance from widening).

As already described, the long guide 12*a* is disposed on the external surfaces of the developing frame holders 40 and 41. In addition, the metallic plate toner detecting contact point 122 for detecting the amount of the remaining toner, and the developing bias contact point 121, are fitted on the developing frame holder 40; these contact points 121 and 122 are fixed to the developing frame holder 40 as the dowels provided on the internal surface of the developing frame holder 40 are forced into the locking hole of the contact points.

To begin with, how the toner detection contact point 122 is attached will be described with reference to the drawings.

FIG. 24 is a sectional view of FIG. 23B, at the (I)—(I) line, and FIG. 25 is an enlarged view of the toner detection contact point illustrated in FIG. 23B and the adjacencies thereof. The toner detection contact point 122 has an external contact point portion 122*a* and an internal contact portion 122*b*. The external contact point portion 122*a* is disposed on the external surface of the holder 40, and when the process cartridge B is in the apparatus main assembly 14, it contacts a toner detection contact point member 126 provided on the apparatus main assembly 14. The internal contact point portion 122*b* presses on the U-shaped portion 9*h*1 of the antenna rod 9*h*. Referring to FIG. 24, the external contact point portion 122*a* is at substantially the same level as the side plate 40*a* of developing frame holder 40. The internal contact point portion 122*b* is disposed within the developing frame holder 40, opposing the antenna rod 9*h*.

Referring to FIG. 25, the toner detection contact point 122 is mounted on the developing frame holder 40, with its locking flap 122*c*1 cut out of the mounting base 122*c* being fitted around the dowel 40*h* which projects inwardly from the side plate 40*a*, and the mounting base 122*c* being in contact with the side plate 40*a*. Further, from the mounting base 122*c*, an angled portion 122*d* is extended at an angle, and from the angled portion 122*d*, the internal contact point 122*b* is extended at an angle, so that the internal contact point 122*b* becomes parallel to the side plate 40*a*. Further, a connective portion 122*e*, which is bent outward at 90 degrees from the mounting base 122*c*, projects outward along one of the edges of the first rectangular hole 40*c* formed in the side plate 40*a*. Then, the connective portion 122*e* is bent at 90 degrees in the direction opposite to the direction in which the connective portion 122*e* is already bent, constituting the external contact point portion 122*a*. The external contact point portion 122*a* is in contact with the bottom surface of a recessed portion 40*i* formed in the side plate 40*a*. The depth of this recessed portion 40*i* is substantially the same as the thickness of the external contact point portion 122*a* (FIG. 24). Therefore, the outward facing surface of the external contact point portion 122*a*, and the outward facing surface 40*a*1 of the side plate 40, are at substantially the same level. Further, the end portion of the external contact point portion 122*a* is put through the second rectangular hole 40*j* formed in the side plate 40*a*, reaching the interior of the side wall 40*a*, with an end fixing portion 122*f* being engaged with a dowel 40*k* projecting from one of the walls of the second rectangular hole 40*j*. This is the way that toner detection contact point is mounted on the developing frame holder 40.

Referring to FIG. 24, a width L2 of the first hole 40*c*, of the side plate 40*a*, is greater than a distance L1 between the side wall facing surface of the mounting base 122*c* of the toner detection contact point 122 and the outwardly facing surface of the external contact point portion 122*a*, and is also greater than the height of the end fixing portion 122*f*. Further, a gap large enough to allow the end fixing portion 122*f* of the toner detection contact point 122 to be passed through is provided between the end surface of the dowel 40*k* within the second hole 40*j* and the opposing surface of the second hole.

The toner detection contact point 122 is mounted in the following manner. First, the end fixing portion 122*f* is inserted into the first hole 40*c*, from the inside of the developing frame holder 40. Then, the end fixing portion 122*f* is inserted into the second hole 40*j* by rotating the toner detection contact point 122 in the clockwise direction of FIG. 24. Subsequently, the hole 122*c* of the mounting base 122*c* is engaged with the dowel 40*k*. On the other hand, the end fixing portion 122*f* rides over the dowel 40*k* due to its own elasticity, and the hole of the end fixing portion 122*f* engages with the dowel 40*k*.

The developing bias contact point 121 will be described.

The developing bias contact point 121 comprises a plate spring portion 121*a* located within the developing frame holder 40; an internal contact point portion 121*b*; and an external contact point portion 121*c* located on the outwardly facing surface 40*a*1. As the developing frame holder 40 is attached to the developing frame 12, the plate spring portion 121*a* elastically contacts the bent portion 9*d*1*a* of the metal plate substantially equal to the potential of the developing roller 9*c*. The internal contact point portion 121*b* is fitted around a boss 40*f* provided with th aforementioned hole 40*e*, being elastically in contact with the coil spring contact point 91 which is fitted around the 40*f* (contact pressure is approx. 100 g to 300 g). The frictional area of the internal contact point portion 121*b* may be coated with electrically conductive grease if desired. The external contact point portion 121*c* is disposed in the recessed portion of the side plate 40*a*, and its external surface outwardly facing surface 40*a*1 of the developing frame holder 40. When the process cartridge B is in the apparatus main assembly 14, external contact point portion 121*c* is in contact with a developing frame contact point member 125 provided in the apparatus main assembly 14, and receives the developing bias to be applied from the apparatus main assembly 14 to the developing roller 9*c*. The developing bias received from the apparatus main assembly 14 is applied to the developing roller 9*c* through the developing bias contact point 121 and coil spring contact point 91.

As the developing frame holder 40 is attached to the developing frame 12, the internal contact point portion 122*b* in the form of a plate spring comes in contact with the U-shaped portion 9*h*1 of the antenna rod 9*h* illustrated in FIG. 28; therefore, the toner detection contact point 122 is electrically connected to the antenna rod 9*h*. The contact pressure between the antenna rod 9*h* and internal contact point portion 122*b* is approx. 100 g. When the process cartridge B is in the apparatus main assembly 14, the external contact point portion 122*a* provided on the outwardly facing surface 40*a*1 of the developing frame holder 40 is electrically connected to the contact point member 126 provided in the apparatus main assembly 14. Therefore, an electrical signal, correspondent to the capacitance which changes in response to the change in the amount of toner between the developing roller 9*c* and antenna rod 9*h* is transmitted to the developing frame 12 through the antenna rod 9*h*, and toner detection contact point 122. As the control section (not shown) detects that the electric signal transmitted to the contact point member 126 has reached a predetermined value, it signals a need for process cartridge exchange. Three engagement holes 40*g* provided in the internal surface of the developing frame holder 40 are engaged with the corresponding end portions of the dowels 12*e*, 12*f* and 12*g* which serve as the gear shafts for the gears 9*q*, 9*r* and 9 the illustrated in FIG. 35. In other words, the dowels 12*e*, 12*f* and 12*g* are supported by the developing frame holder 40 and the developing frame 12, coming between the two. The engagement hole 40*m* provided in the internal surface of the developing frame holder 40, rotatably supports the stirring gear 9*m*.

As is evident from the foregoing description, the fact that various functions are assigned to a single component (developing frame holder) leads to improvement in assembling efficiency, and also, cost reduction.

Further, according to this embodiment, developing frame holder 40 comprises the rotatable shaft 20, spring seat 40*b*, long guide 12*a*, engagement hole (hole 40*a*) for magnet 9*g*, mount (boss 40*f* and the like) for the developing bias contact point 121, mount (dowel 40*h*, first hole 40*c*), developing frame holder 40 (dowel 40*k* and the like) for the toner detection contact point 122, engagement hole 40*m*, pin 40*d*, screw hole 401, and the like, and these portions are integral formed with the developing frame holder 40. The developing frame holder 41 comprises the rotatable shaft 20, spring seat 40*b*, long guide 12*a*, and the like, and these portions are integrally formed with the developing frame holder 41. Each of the developing frame holders 40 and 41 is formed, as a single piece component of acrylonitrile-styrene copolymer resin (containing glass filler by 20%).

The positions of the developing frame holders 40 and 41 are fixed as the pins 40*d* of the developing frame holders 40 and 40 are inserted into the corresponding holes 12*p* of the developing frame 12. Then, the developing frame holders 40 and 41 are fixed to the developing frame 12 with the use of screws put through the screw holes 401 (developing frame holders 40 and 41), and screw holders 12*r*1 (developing frame 12).

[Structure of Bottom Surface of Cleaning Frame]

Figure 34:
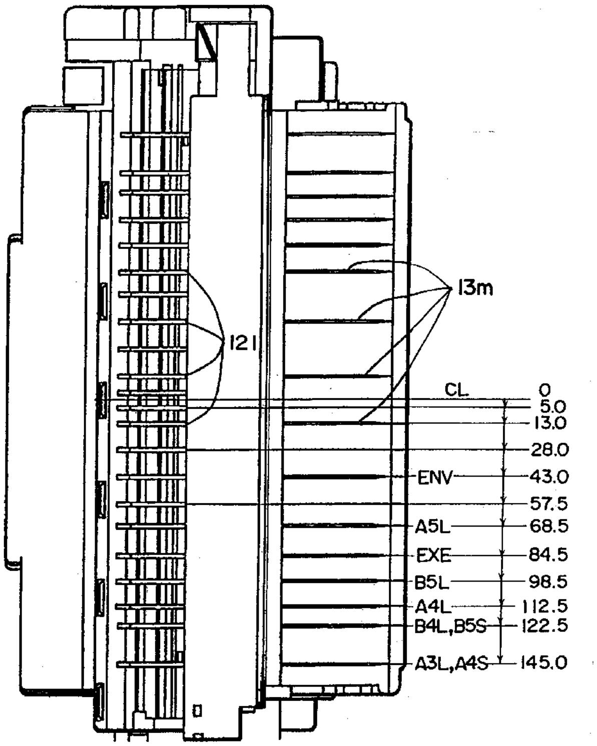
FIG. 34 is a bottom view of a process cartridge.

The developing frame 12 and cleaning frame 13 are provided with guide ribs 121 and 13*m*, which project from the bottom surfaces thereof, respectively, extending in parallel in the moving direction of the recording medium or material 2. Both guide ribs 121 and 13*m* are arranged in such a manner that the outermost ribs 121 and 13*m* fall within the path of the widest piece of recording medium 2 by a small margin. In this embodiment, the outermost ribs are located approx. 5 mm inwardly from the edges of the path of the widest piece of recording medium 2. The remainder of the ribs are spread between the outermost ribs to facilitate conveyance of the recording medium 2. The image forming apparatus in this embodiment is of a type that can accommodate recording medium 2 of different sizes, and the recording medium 2 is centered regardless of size (center line CL coincides with the center line of the recording medium 2). Therefore, the arrangement of the ribs provided on the bottom surface of the developing frame 12 and cleaning frame 13 is symmetrical relative to the (center line CL). The rib height is set at predetermined values for the developing frame 12 and cleaning frame 13, respectively, to facilitate conveyance of the recording medium 2. By adopting the above structure, the image disturbance due to the contact between the pre-fixation toner image and the bottom surface of the cleaning frame 13 can be prevented, while improving conveyance efficiency. FIG. 34 shows an example of measurement in millimeters between the center line CL and various ribs, along with the symbols correspondent to the standard sizes (Japan Industrial Standard) for the recording medium 2. For example, a symbol A3L stands for an A3 size recording medium fed in the longitudinal direction; a symbol A4s stands for an A4 size recording medium fed in the widthwise direction. A symbol ENV stands for a recording medium of envelope size, and EXE corresponds to a recording medium of an EXE size. The guide ribs 121 and/or 13*m*, located 5.0 mm, 13.0 mm and 28 mm away from the center line CL, are the ribs which make contact with the center line of the recording medium 2.

FIG. 34 is a schematic view of the bottom portion of the cleaning frame 13 as seen from the sheet conveyance direction. This embodiment is different in that the height of guide ribs 13*m* is symmetrically increased in relation to the distance from the center line; both ribs of each rib pair correspondent to one of the various sheet sizes of the recording medium 2 have the same height. This rib arrangement can reliably prevent the ribs located toward the center line CL from coming in contact with the image bearing surface of the recording medium 2, reliably preventing the image disturbance. The horizontal rib arrangement in this embodiment is the same as the embodiment in which the rib height is the same for all ribs.

[Structure of Electrical Contact Points]

Hereinafter referring to FIGS. 5, 8, 9A, 9B, 19A, and 19B, the connection and placement of the contact points, which establishes electrical connections between the process cartridge B and the laser beam printer main assembly 14 when the former is installed into the latter, will be described.

The process cartridge B is provided with a plurality of electrical contact points: (1) Electrically conductive grounding contact point 119 electrically connected to the photosensitive drum 7 to ground the drum 7 through the apparatus main assembly 14; (2) Electrically conductive charging bias contact point 120 electrically connected to the charging roller shaft 8*a* in order to apply a charge bias from the apparatus main assembly 14 to the charging roller 8; (3) Electrically conductive developing bias contact point 121 electrically connected to the developing roller 9*c* in order to apply a developing bias from the apparatus main assembly 14; and (4) Electrically conductive toner remaining detecting contact point 122 electrically connected to an antenna rod 9*h* in order to detect the amount of the remaining toner. All of these four contact points 119–122 are exposed on the lateral surface (right-hand side) of the cartridge frame, with intervals large enough to prevent electrical leakage among them. As described before, the ground contact point 119 and charge bias contact point 120 are disposed on the cleaning means frame 13, and development bias contact 121 and toner remainder detecting contact point 122 are disposed on the development chamber frame 12 (developer holder 40). It should be noted here that the toner remaining detecting contact point 122 doubles as a cartridge detecting contact point for detecting the presence (or absence) of the process cartridge within the apparatus main assembly 14.

The grounding contact point 119 is constituted of the electrically conductive axial shaft 7*a* of the photosensitive drum 7, or an electrically conductive insert molded in the shaft 7 of resin material. In this embodiment, it is constituted of a metallic shaft 7*a* of iron or the like. The other contact points 120, 121 and 122 are approximately 0.1 mm to 0.3 mm thick electrically conductive metallic pieces, for example, stainless steel piece, phosphor bronze piece, or the like, which are planted on the surface so as for their leg portions to reach into the process cartridge interior. The charging bias contact point 120 is exposed on the driving side surface (lateral side C1) of the cleaning unit C, and the developing bias contact point 121 and toner remaining detecting contact point 122 are exposed on the driving side surface (lateral side D1) of the developing unit D.

More specifically, referring to FIG. 20, in this embodiment, the helical drum gear 7*b* is provided at one end of the photosensitive drum 7 in the axial direction of the drum 7 as described before. This helical drum gear 7*b* engages with the helical driver gear 28 provided on the apparatus main assembly 14 to rotate the drum 7. As this helical gear 7*b* rotates, it generates a thrust (in the direction of an arrow d in FIG. 20), pressing thereby the drum 7, which is mounted on the cleaning means frame portion 13 with the allowance of some play in its longitudinal direction, toward the direction of the helical gear 7*b*. As a result, one 7*b*1 of the lateral surfaces of the helical gear 7*b* remains in contact with the internal surface 13*k*1 of one 13*k* of the lateral surfaces of the cleaning means frame portion 13 of the cartridge frame, whereby the position of the drum 7 within the cartridge B in the axial direction is regulated. The grounding contact point 119 and charging bias contact point 120 are exposed on the one 13*k* of the lateral surfaces of the cleaning means portion 13 of the frame, wherein the grounding contact point 119 is at the end of the drum shaft 7*a*, and projects outward slightly (approximately 0.8 mm) beyond the end of the aforementioned cylindrical guide 13*a*. This drum shaft 7*a* is put through the drum cylinder 7*d* (aluminum cylinder in this embodiment) covered with a photosensitive layer 7*e*, and is supported at each end by the cylindrical guide 13*a*, which in turn is supported on the lateral walls 13*c* and 13*d*. The drum cylinder 7*d* and shaft 7*a* are connected with a grounding plate 7*f*, which is in contact with both the internal surface 7*d*1 of the drum cylinder 7*d* and peripheral surface 7*a*1 of the shaft 7*a*.

The charging bias contact point 120 is located almost directly above the long guide 12, that is, adjacent to the cleaning means portion 13 of the frame, which supports the charging roller 8 (FIG. 9A). Also, the charging bias contact point 120 is electrically connected to the charging roller shaft 8*a* through an electrically conductive member 120*a*, which is in contact with the charging roller shaft 8*a*.

Next, the developing bias contact point 121 and toner remaining detecting contact point 122 will be described. These two contact points 121 and 122 are located on one surface, D1, of the lateral surface of the developing unit D, that is, the same side as the lateral surface 13*k* of the cleaning means portion 13 of the frame. The developing bias contact point 121 is located directly below the long guide 12*a* and adjacent to the right-hand end of the frame portion 12*c* where the magnet 9*g* contained in the developing roller 9*c* is supported (FIG. 5), and is electrically connected to the developing roller 9*c* through the coil spring contact point 91, which is in contact with the lateral end of the developing roller 9*c* (FIG. 9B). Referring to FIG. 5, the toner remaining detecting contact point 122 is disposed on the upstream side of the long guide 12*a* relative to the cartridge inserting direction (arrow X direction in FIG. 8), and is connected to an antenna rod 9*h*. which is disposed on the side of the toner container 11A and extends in the longitudinal direction of the developing roller 9*c* in parallel with the developing roller 9*c* as shown in FIG. 9B), through the electrically conductive member 9*f*, which is in contact with an antenna rod 9*h*. The antenna rod 9*h* is disposed so as to hold a predetermined distance from the developing roller 9*c*. The capacitance between this antenna rod 9*h* and developing roller 9*c* varies in response to the amount of the toner present between two components; therefore, the amount of the remaining toner is detected by measuring this capacitance change as a potential difference change, through a control section (unillustrated) in the apparatus main assembly 14.

Here, the terminology "amount of the remaining toner" means an amount of the toner that creates a predetermined amount of capacitance by being present between the developing roller 9*c* and antenna rod 9*h*. In other words, the detection of the predetermined amount of capacitance means that the amount of the toner remaining in the toner chamber 11A has reached the predetermined amount.

Thus, it is detected by the control section, which is provided in the apparatus main assembly 14 and is connected to the cartridge B through the toner remaining detecting contact point 122, that the capacitance has reached a predetermined first value; whereby it is determined that the amount of the toner remaining in the toner chamber 11*a* has reached the predetermined amount. When it is detected that the capacitance has reached the aforementioned first determined value, the apparatus main assembly 14 signals the need for process cartridge B exchange (for example, flashing light, buzzing sound). When the capacitance detected by the control section matches a predetermined second value, which is smaller than the first value, the detecting circuit determines that the cartridge B has been installed in the apparatus main assembly 14. The control section circuit does not allow the apparatus main assembly 14 to be driven unless it detects that the cartridge B has been installed in the apparatus main assembly. In other words, the control section does not allow the apparatus main assembly 14 to start forming images.

It may be arranged so that a warning signal (for example, blinking light or the like) may be provided to inform the operator of the absence of the cartridge B in the apparatus.

Next, a description will be given as to the connection between the contact point provided on the cartridge B and the contact point member provided on the apparatus main assembly 14.

Referring to FIGS. 19A, and 19B, four contact point members, which make contact with corresponding contact points 119–122 when the process cartridge is installed in the apparatus A, are provided on one of the lateral walls of the cartridge accommodating space S of the image forming apparatus A (grounding contact point member 123 which electrically contacts the grounding contact point 119, charging bias contact point member 124 which electrically contacts the charging bias contact point 120, developing contact point member 125 which electrically contacts the developing bias contact point 121, and toner detection contact point member 126 which electrically contacts the toner remaining detecting contact point 122).

As shown in FIGS. 19A and 19B, the grounding contact point member 123 is disposed in correspondence to the groove 16*a*5. The developing bias contact point member 125 and toner remaining detecting contact point member 126 are disposed below the first guide portion 16*a*. The charging bias contact point member 124 is disposed above the second guide portion 16*b*.

Here, the positional relationship between the contact points and guides will be described.

First, referring to FIG. 5, as for the positional relationship in the vertical direction (as seen from the horizontal direction), the developing bias contact point 121 is the bottommost one; the toner remaining detecting contact point 122, long guide 12*a* and cylindrical guide 13*a* (grounding contact point 119) are disposed above the bias contact point 121, being at about the same level; above them is the short guide 13*b*, and the topmost one is the charging bias contact point 120. As for the positional relationship in the cartridge inserting direction (arrow X direction), the toner remaining detecting contact point 122 is the most upstream one; next is the long guide 12*a*; at a further downstream location is the charging bias contact point 120 and developing bias contact point 121; and at the most downstream locations are short guide 13*b* and cylindrical guide 13*a* (grounding contact point 119). Arranging the contact points as described above allows the charging bias contact point 120 to be positioned near the charging roller 8; the developing bias contact point 121, near the developing roller 9*c*; the toner remaining detecting contact point 122, near the antenna rod 9*h*; and the grounding contact point 119 to be positioned near the photosensitive drum 7. Therefore, the wiring for the contact points can be shortened.

The measurements of the contact points are as follows: the charging bias contact point 120 is approximately 10.0 mm in height and width (tolerable range of 8.0 mm to 12.0 mm); developing bias contact point 121, approximately 9.0 mm in height (tolerable range of 6.0 mm to 12.0 mm) and approximately 8.0 mm (tolerable range of 5.0 mm to 11.0 mm); toner remaining detecting contact point 122, approximately 8.0 mm (tolerable range of 6.0 mm to 10.0 mm) in height and approximately 9.0 mm (tolerable range of 7.0 mm to 11.0 mm) in width; and grounding contact point 119 is circular and its diameter is approximately 7.0 mm. The charging bias contact point 120, developing bias contact point 121, and toner remaining detecting contact point 122 are rectangular.

The grounding contact point member 123 is an electrically conductive plate spring member, and is mounted in the groove 16*a*5, in which the cylindrical guide 13*a* (in which the drum shaft 7*a* of the photosensitive drum 7 is fitted), on which the grounding contact point 119 of the cartridge B is mounted, is disposed to fix the position of the cartridge B, whereby the grounding contact point member 123 is grounded through the chassis of the apparatus main assembly (FIGS. 19A, 19B , and 26). The other contact point members 124, 125 and 126 are mounted in the corresponding holder covers 127 in such a manner as to be projected therefrom by the corresponding compression springs 129. This arrangement will be described referring to the charging bias contact point member 124. Referring to FIG. 20, the charging bias contact point member 124 is placed under a holder cover so that it projects but does not come off, and then, this holder cover 127 is fixed to a circuit board 128 mounted on one of the lateral walls of the apparatus main assembly, whereby the contact point members are electrically connected to the wiring patterns by the electrically conductive compression springs 129, correspondingly.

Next, referring to FIGS. 21A through 21C, it will be described with reference to the charging bias contact point member 120 how the contact points on the cartridge side come in contact with the corresponding contact point members on the image forming apparatus side when the process cartridge B is installed into the image forming apparatus A. FIGS. 21A through 21C are explanatory drawings, which depicts the state of the process cartridge B in the image forming apparatus A, wherein an arrow mark H designates the movement of the charging bias contact point 124 on the apparatus main assembly, relative to the process cartridge B, when the cartridge B is installed into the image forming apparatus A. It should be noted here that FIGS. 21A through 21C are a cross-section of FIG. 5 at a line O.

During the installation of the process cartridge B into the image forming apparatus A using the guide members 16*a* and 16*b* as the guide, the charging bias contact point member 124 is in the state depicted in FIG. 21A before it reaches the predetermined position where it is to be fixedly disposed. At this time, the charging bias contact point member 124 is not in contact with the flat surface 20 of the cleaning means portion 13 of the frame. As the cartridge B is further inserted, the charging bias contact point member 124 is advanced to a position in FIG. 21B. In this state, it remains in contact with the slanted surface 31 (FIG. 5) formed on the right lateral wall 13*c* of the cleaning means portion 13 of the frame; slides on this slanted surface 31, whereby it is gradually pressed, compressing thereby gradually the compression spring 129; and smoothly moves onto the flat surface 32 where the charging bias contact point 120 is exposed. When the inserted cartridge B arrives at the predetermined location, the contact member 124 arrives at a position in FIG. 21C, where it makes contact with the charging bias contact point 120. The other contact point members 125 and 126 come in contact with the contact points 121 and 122, respectively, in the same manner.

With such an arrangement as described above being in place, when the cartridge B is guided by the guide member 16 into the predetermined cartridge accommodating location, the contact points and the corresponding contact point members are reliably placed in contact with each other.

Further, when the process cartridge B is positioned at the predetermined location in the apparatus main assembly 14, the grounding contact point member 123 in the form of a plate spring makes contact with the grounding contact point 119 projecting from the cylindrical guide 13*a* (FIG. 20). As the process cartridge B is inserted into the apparatus main assembly 14. the grounding contact point 119 and grounding contact member 123 electrically contact with each other, grounding thereby the photosensitive drum 7. The charging bias contact point 120 and charging bias contact member 124 electrically contact with each other, allowing thereby a high voltage (superposed voltage of AC and DC voltages) to be applied to the charging roller 8. The developing bias contact point 121 and developing contact member 125 make electrical contact with each other, allowing thereby a high voltage to be applied to the developing roller 9*c*. The toner remaining detecting contact point 122 and toner remaining detecting contact member 126 make electrical contact with each other, allowing thereby information reflecting the capacitance to be transmitted to the apparatus main assembly 14.

Next, a case in which the photosensitive drum 7 is rotated by driving the image forming apparatus A, will be described. The photosensitive drum 7 is given an approximately 2 mm to 3 mm thrust play in the axial direction so that it is easier to install the process cartridge B into the image forming apparatus A. Therefore, it is necessary for the charging bias contact point member 124 or the like to be capable of projecting by a distance larger than the thrust play. Further, in this embodiment, a plate spring 45 is provided, which presses the process cartridge B toward one side (side where the contact point members 123–126 are located) of the apparatus main assembly when the cartridge B is in the apparatus main assembly. This plate spring 45 is on the side opposite to the side where the contact point members are located, above the first installation guide 16*a*.

Further, when the contact points 119–122 of the process cartridge B are disposed, as they are in this embodiment, on the side where the helical drum gear 7*b* is disposed (lateral wall on the driving side), the connection for mechanically driving the cartridge B by the apparatus main assembly through the helical drum gear 7*b*, and the electrical connection between the cartridge B and apparatus main assembly through the contact points 119–122, can be made on the same side of the cartridge B. Therefore, when the aforementioned side of the cartridge B is used as the referential side, the integrated error in the component sizes can be reduced, which makes it possible to mount more accurately the contact points and helical gear. Further, when a helical drum gear with teeth cut in such a direction as to generate a thrust directed toward the side where the helical drum gear is positioned is used, the position of the photosensitive drum 7 in the axial direction is fixed on the side where the contact points are located; therefore, in this case, the accuracy in the positional relationship between the photosensitive drum 7 and the contact points is also improved, in addition to the aforementioned effects. Further, when a lever 23 (FIG. 6) for opening or closing the drum shutter 18 is located, as it is in the aforementioned embodiment, on the side opposite to the one where the contact points 119–122 are located, the frictional resistance generated on one side of the cartridge by the contact points 119–122 as the cartridge B is inserted into the image forming apparatus A, and the resistance (or pressure), which is made by the lever 23 (FIG. 6) for opening or closing the drum shutter member 18, are distributed toward the longitudinal ends of the cartridge B when the process cartridge B is inserted into the image forming apparatus A; in other words, the resistance generated when the cartridge B is inserted is evenly distributed in the longitudinal direction of the cartridge B. Therefore, the cartridge B can be smoothly inserted.

Further, as described in the preceding embodiment, when all the contact points of the process cartridge B are positioned on one and the same lateral wall of the cartridge frame, and the process cartridge B is placed under the elastic pressure generated by the plate spring, it is possible to provide stable electrical connections between the contact points and the corresponding contact point members on the apparatus main assembly side.

Figure 22:
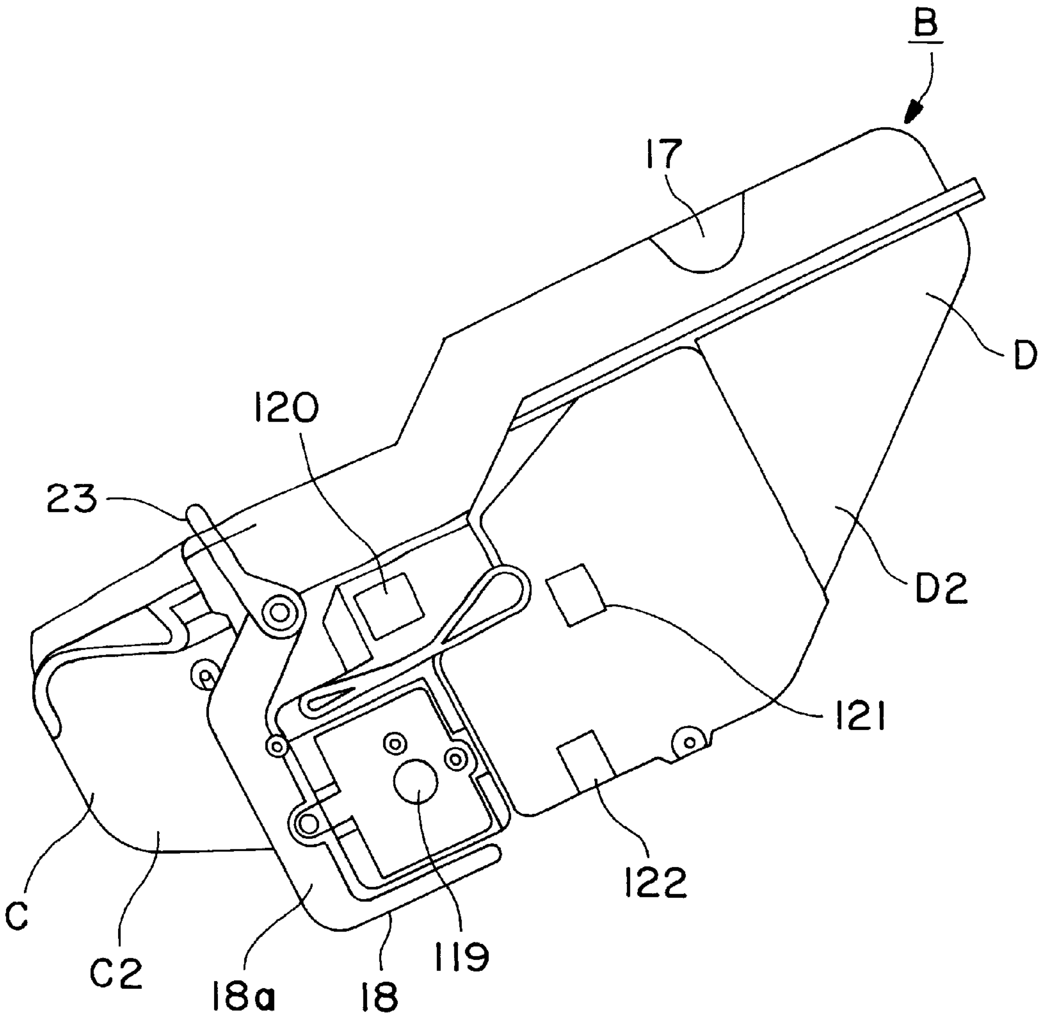
FIG. 22 is a side view of a process cartridge according to an embodiment of the present invention.

FIG. 22 illustrates an arrangement in which the contact points are located on the side where the aforementioned lever 23 is located. This arrangement can also sufficiently provide the aforementioned effects.

Further, in each of the preceding embodiments, the process cartridge B is of a type which is used to form a monochrome image, but the present invention is also applicable to a multicolor process cartridge, which comprises two or more developing means and is used to form a multicolor image (image of two colors, three colors, or full-color).

As for the electrophotographic photosensitive member, it is not limited to the aforementioned photosensitive drum 7. The present invention is also applicable to the following. To begin with, the photoconductive material is usable as the photosensitive material. As for the photoconductive material, amorphous silicon, amorphous selenium, zinc oxide, titanium oxide, organic photoconductor (OPC), or the like, is usable. Further, as for the configuration of a base member on which the photosensitive material is placed, a base member in the form of a drum or a belt is used. For example, in the case of the base member of the drum type, the photoconductive material is coated, deposited, or placed by the like means on a cylinder of aluminum alloy or the like.

As for the developing method, the present invention is compatible with various well-known methods such as the double component magnetic brush developing method, cascade developing method, touch down developing method, cloud developing method, and the like.

Further, as to the structure of the charging means, the so-called contact charging method is employed in the first embodiment, but it is needless to say that the present invention is also applicable to other conventional charging methods such as the one in which a metallic shield of aluminum or the like is placed on three sides of a tungsten wire, and positive or negative ions generated by applying a high voltage to the tungsten wire are transferred onto the surface of the photosensitive drum to charge it uniformly.

Further, the aforementioned charging means may be of the blade type, (charging blade), pad type, block type, rod type, wire type, or the like, in addition to the roller type described previously.

As for the method for cleaning the residual toner on the photosensitive drum, the cleaning means may be constituted of a blade, fur brush, magnetic brush, or the like.

As described above, all of the plural electrical contact points of the process cartridge are disposed on only one of the lateral surfaces of the cartridge frame; therefore, the electrical connection between the process cartridge and image forming apparatus can be reliably established by positioning the process cartridge in such a manner as to be pressed by elastic means toward its lateral surface where the electrical contact points are disposed.

Further, the electrical connection, as well as the driving mechanism connection, between the process cartridge and image forming apparatus can be more reliably established by means of disposing the helical gear and electrical contact points on the side toward which the electrophotographic photosensitive member is pressed by the rotation of the helical gear for transmitting the driving force to the photosensitive member.

Further, the distance the wiring must be routed within the process cartridge can be shortened by means of disposing each of the contact points in the same manner as described in the preceding embodiments.

Further, according to the embodiment, the electrical circuit board of the apparatus main assembly, to which the aforementioned electrical contact points are to be connected, can be vertically arranged on the lateral surface of the apparatus main assembly; therefore, the apparatus size can be reduced.

As described in the foregoing, according to the embodiment, the toner supply performance is high even if the amount of toner is large.

According to the present invention, there is provided a developing device frame, a process cartridge and an electrophotographic image forming apparatus, which are easy to assemble.

While the invention has been described with reference to the structures disclosed herein, it is not confined to the details set forth and this application is intended to cover such modifications or changes as may come within the purposes of the improvements or the scope of the following claims.

What is claimed is:

1. A developing device frame usable with a process cartridge detachably mountable to a main assembly of an electrophotographic image forming apparatus, wherein the process cartridge includes an electrophotographic photosensitive member, a developing roller for supplying toner to the electrophotographic photosensitive member to develop a latent image formed on the electrophotographic photosensitive member, a toner accommodating portion for accommodating the toner to be used for a development operation of the developing roller, and a stirring member for stirring the toner, said developing device frame comprising:

a developing roller mounting portion for mounting the developing roller;

an antenna member mounting portion for mounting, along a longitudinal direction of the developing roller mounted to said developing roller mounting portion, an antenna member having a portion opposed to the developing roller and an extended portion extended from the opposed portion, the extended portion being not opposed to the developing roller, wherein the antenna member produces an electric signal to be transmitted to a detecting means provided in the main assembly of the electrophotographic image forming apparatus to indicate that the process cartridge is mounted to the main assembly of the electrophotographic image forming apparatus; and a first gear mounting portion for mounting a first gear for transmitting, to the stirring member, a driving force for rotating the stirring member, wherein the first gear is disposed at the same side, in a longitudinal direction of said developing device frame, as a side where the extended portion is extended, wherein the first gear transmits to the stirring member a driving force received from a developing roller gear provided at one end of the developing roller mounted to said developer roller mounting portion.

2. A developing device frame according to claim 1, wherein said antenna member mounting portion is provided with an opening through which the antenna member is extended from the opposed portion, and the antenna member is mounted to said antenna member mounting portion through the opening.

3. A developing device frame according to claim 1 or 2, wherein said antenna member mounting portion is provided with an engagement opening, wherein an end of the antenna member is bent into a substantially U-shaped configuration, which extends through the engagement opening to mount to the end of said antenna member mounting portion.

4. A developing device frame according to claim 1, wherein the first gear is meshed with the developing roller gear positioned at said one end of the developing roller and with a stirring member gear positioned at an end of the stirring member to transmit, to the stirring member, a rotational driving force transmitted from the developing roller.

5. A developing device frame according to claim 1, further comprising:

a second gear mounting portion for mounting a second gear meshed with the first gear;

a third gear mounting portion for mounting a third gear meshed with the second gear; and a fourth gear mounting portion for mounting a fourth gear meshed with the third gear, wherein the third gear is provided at an end of a toner feeding member, provided inside the toner accommodating portion, for feeding toner accommodated inside the toner accommodating portion, and functions to transmit a rotational driving force to the toner feeding member, and the fourth gear is meshed with a second stirring member gear provided at an end of a second stirring member for stirring toner fed from the toner accommodating portion.

6. A developing device frame according to claim 5, wherein said developing device frame is provided with a side plate at a side having said first gear mounting portion, and said side plate is provided with a through hole, through which the third gear extends and engages the toner accommodating portion to transmit a rotational driving force to the toner feeding member mounted in the toner accommodating portion.

7. A developing device frame according to claim 5, wherein said developing device frame is provided with a side plate at a side having said first gear mounting portion, and said side plate is provided with a through hole, through which the third gear extends for transmitting a rotational driving force to the toner feeding member mounted in the toner accommodating portion, and wherein said side plate is further provided with said second gear mounting portion, said third gear mounting portion, and said fourth gear mounting portion.

8. A developing device frame according to claim 1, further comprising a developing blade mounting portion for mounting a developing blade for regulating a toner amount deposited on a peripheral surface of the developing roller.

9. A developing device frame according to claim 1, further comprising two portions each supporting a seal member, wherein each of the seal members is respectively contacted to the developing roller at each longitudinal end thereof.

10. A developing device frame according to claim 1, wherein the first gear transmits a rotational driving force from the developing roller gear to the stirring member through a plurality of gears.

11. A process cartridge detachably mountable to a main assembly of an electrophotographic image forming apparatus, said process cartridge comprising:

a. an electrophotographic photosensitive member;

b. a developing roller for supplying toner to said electrophotographic photosensitive member to develop a latent image formed thereon;

c. a toner accommodating portion for accommodating the toner to be used for development by said developing roller;

d. a stirring member for stirring the toner; and e. a developing device frame including:

(i) a developing roller mounting portion for mounting the developing roller;

(ii) an antenna member mounting portion for mounting, along a longitudinal direction of the developing roller, an antenna member having a portion opposed to the developing roller and an extended portion extended from the opposed portion, the extended portion being not opposed to the developing roller, wherein the antenna member produces an electric signal to be transmitted to the main assembly of the electrophotographic image forming apparatus to indicate that said process cartridge is mounted to the main assembly of the electrophotographic image forming apparatus; and (iii) a first gear mounting portion for mounting a first gear for transmitting, to said stirring member, a rotational driving force for rotating said stirring member, wherein the first gear is disposed at a same side, in a longitudinal direction of said developing device frame, as a side where the extended portion is extended, and wherein the first gear transmits, to the stirring member, a rotational driving force received from a developing roller gear provided at one end of the developing roller mounted to said developing roller mounting portion, wherein said developing roller is mounted to said developing roller mounting portion, and the antenna member is mounted to said antenna member mounting portion, and the first gear is mounted to said first gear mounting portion.

12. A process cartridge according to claim 11, wherein said antenna member mounting portion is provided with an opening through which the antenna member is extended from the opposed portion, and the antenna member is mounted to said antenna member mounting portion through the opening.

13. A process cartridge according to claim 11 or 12, wherein said antenna member mounting portion is provided with an engagement opening, wherein an end of the antenna member is bent into a substantially U-shaped configuration, through which an end of the extended portion extends through the engagement opening to mount to the end to said antenna member mounting portion.

14. A process cartridge according to claim 11, wherein the first gear is meshed with the developing roller gear positioned at said one end of the developing roller and with a stirring member gear positioned at an end of the stirring member to transmit the stirring member, a rotational driving force transmitted from the developing roller.

15. A process cartridge according to claim 11, wherein said developing device frame further includes:

a second gear mounting portion for mounting a second gear meshed with the first gear;

a third gear mounting portion for mounting a third gear meshed with the second gear; and a fourth gear mounting portion for mounting a fourth gear meshed with the third gear, wherein the third gear is provided at an end of a toner feeding member, provided inside said toner accommodating portion, for feeding toner accommodated inside said toner accommodating portion, and functions to transmit a rotational driving force to said toner feeding member, and the fourth gear is meshed with a second stirring member gear provided at an end of a second stirring member for stirring toner fed from said toner accommodating portion, and wherein the second gear is mounted to said second gear mounting portion, and the third gear is mounted to said third gear mounting portion, and the fourth gear is mounted to said fourth gear mounting portion.

16. A process cartridge according to claim 11, wherein said developing device frame is provided with a side plate at a side having said first gear mounting portion, and said side plate is provided with a through hole, and wherein a driving force transmitting member for transmitting a rotational force to a toner feeding member extends through said through hole.

17. A process cartridge according to claim 15, wherein said developing device frame is provided with a side plate at a side having said first gear mounting portion, and said side plate is provided with a through hole, and wherein a driving force transmitting member for transmitting a rotational force to the toner feeding member extends through the through hole.

18. A process cartridge according to claim 11, wherein said developing device frame further includes a developing blade mounting portion for mounting a developing blade for regulating a toner amount deposited on a peripheral surface of the developing roller, and the developing blade is mounted to said developing blade mounting portion.

19. A process cartridge according to claim 16, further comprising two portions, each supporting a seal member, wherein each of said seal members is respectively contacted to said developing roller at each longitudinal end thereof.

20. A process cartridge according to claim 11, further comprising a charging member for charging the electrophotographic photosensitive member.

21. A process cartridge according to claim 11 or 20, further comprising a cleaning member for removing toner remaining on the electrophotographic photosensitive member.

22. A process cartridge according to claim 11, wherein the first gear transmits a rotational driving force from the developing roller gear to the stirring member through a plurality of gears.

23. An electrophotographic image forming apparatus for forming an image on a recording medium, to which a process cartridge is detachably mountable, said electrophotographic image forming apparatus comprising:

I. mounting means for mounting the process cartridge, the process cartridge including:
 a. an electrophotographic photosensitive member;
 b. a developing roller for supplying toner to the electrophotographic photosensitive member to develop a latent image formed thereon;
 c. a toner accommodating portion for accommodating the toner to be used for development by the developing roller;
 d. a stirring member for stirring the toner; and
 e. a developing device frame including:
  (i) a developing roller mounting portion for mounting the developing roller;
  (ii) an antenna member mounting portion for mounting, along a longitudinal direction of the developing roller, an antenna member having a portion opposed to the developing roller and an extended portion extended from the opposed portion, the extended portion being not opposed to the developing roller, wherein the antenna member produces an electric signal to be transmitted to a main assembly of the electrophotographic image forming apparatus to indicate that the process cartridge is mounted to the main assembly of the electrophotographic image forming apparatus; and
  (iii) a first gear mounting portion for mounting a first gear for transmitting, to the stirring member, a rotational driving force for rotating the stirring member, wherein the first gear is disposed at the same side, in a longitudinal direction of the process cartridge, as a side where the extended portion is extended,
  wherein the first gear transmits, to the stirring member, a driving force received from a developing roller gear provided at one end of the developing roller mounted to the developer roller mounting portion, and
  wherein the developing roller is mounted to the developing roller mounting portion, and the antenna member is mounted to the antenna member mounting portion, and the first gear is mounted to the first gear portion;

II. feeding means for feeding the recording medium; and

III. detecting means for detecting that the process cartridge is mounted to the main assembly of the electrophotographic image forming apparatus.

24. A developing device frame usable with a process cartridge detachably mountable to a main assembly of an electrophotographic image forming apparatus, the process cartridge including an electrophotographic photosensitive member, a developing roller for supplying toner to the electrophotographic photosensitive member to develop a latent image formed on the electrophotographic photosensitive member, a toner accommodating portion for accommodating toner to be used by the developing roller, and a stirring member for stirring the toner fed from the toner accommodating portion, said developing device frame comprising:

(i) a developing roller mounting portion for mounting the developing roller;

(ii) a developing blade mounting portion for mounting a developing blade for regulating an amount of the toner deposited on a peripheral surface of the developing roller;

(iii) an antenna member mounting portion for mounting, along a longitudinal direction of the developing roller mounted to said developing roller mounting portion, an antenna member having a portion opposed to the developing roller and an extended portion extended to a portion extended from the opposed portion, the extended portion being not opposed to the developing roller, wherein the antenna member produces an electric signal to be transmitted to the main assembly of the electrophotographic image forming apparatus to indicate that the process cartridge is mounted to the main assembly of the electrophotographic image forming apparatus;

(iv) a first gear mounting portion for mounting a first gear for transmitting, to the stirring member, a rotational driving force for rotating the stirring member, wherein the first gear is disposed at the same side, in a longitudinal direction of said developing device frame, as a side where the extended portion is extended, wherein the first gear transmits, to the stirring member, a rotational driving force received from a developing roller gear provided at one end of the developing roller mounted to said developer roller mounting portion;

(v) a second gear mounting portion for mounting a second gear meshed with the first gear;

(vi) a third gear mounting portion for mounting a third gear meshed with the second gear;

(vii) a fourth gear mounting portion for mounting a fourth gear meshed with the third gear, wherein the third gear is provided at an end of a toner feeding member, provided inside the toner accommodating portion, for feeding toner accommodated inside the toner accommodating portion, and functions to transmit a rotational driving force to the toner feeding member, and said fourth gear is meshed with a second stirring member gear provided at an end of a second stirring member for stirring toner, wherein said developing device frame is provided with a side plate at a side having said first gear mounting portion, and said side plate is provided with a through hole, in which the third gear is engaged to transmit a rotational driving force to the toner feeding member mounted in the toner accommodating portion.

25. A developing device frame according to claim 24, wherein said antenna member mounting portion is provided with an opening, through which the antenna member is extended from the opposed portion, and the antenna member is mounted to said antenna member mounting portion through the opening.

26. A developing device frame according to claim 24 or 25, wherein said antenna member mounting portion is provided with an engagement opening for engagement with an end of the extended portion, wherein an end of the antenna member is bent into a substantially U-shaped configuration, which extends through the engagement opening to mount to the end to said antenna member mounting portion.

27. A developing device frame according to claim 24, wherein the first gear is meshed with the developing roller gear positioned at said one end of the developing roller and with a stirring member gear positioned at an end of the stirring member to transmit, to the stirring member, a rotational driving force transmitted from the developing roller.

28. A developing device frame according to claim 24 or 25, further comprising two portions each supporting a seal member, wherein each of said seal members is respectively contacted to the developing roller at each longitudinal end thereof.

29. A process cartridge detachably mountable to a main assembly of an electrophotographic image forming apparatus, said process cartridge comprising:

a. an electrophotographic photosensitive member;

b. a charging member for charging said electrophotographic photosensitive member;

c. a developing roller for supplying toner to said electrophotographic photosensitive member to develop a latent image formed thereon;

d. a toner accommodating portion for accommodating the toner to be used for development by said developing roller;

e. a first stirring member for stirring the toner;

f. a second stirring member for stirring the toner; and g. a developing device frame including:

(i) a developing roller mounting portion for mounting said developing roller;

(ii) a developing blade mounting portion for mounting a developing blade for regulating an amount of the toner deposited on a peripheral surface of said developing roller;

(iii) an antenna member mounting portion for mounting, along a longitudinal direction of said developing roller mounted to said developing roller mounting portion, an antenna member having a portion opposed to said developing roller and an extended portion extended from the opposed portion, the extended portion being not opposed to said developing roller, wherein the antenna member produces an electric signal to be transmitted to a detecting element provided in the main assembly of the electrophotographic image forming apparatus to indicate that said process cartridge is mounted to the main assembly of the electrophotographic image forming apparatus;

(iv) a first gear mounting portion for mounting a first gear for transmitting, to said first stirring member, a rotational driving force for rotating said first stirring member, wherein the first gear is disposed at a same side, in a longitudinal direction of said developing device frame, as a side where the extended portion is extended, wherein the first gear transmits, to said first stirring member a rotational driving force received from a developing roller gear provided at one end of said developing roller mounted to said developer roller mounting portion;

(v) a second gear mounting portion for mounting a second gear meshed with the first gear;

(vi) a third gear mounting portion for mounting a third gear meshed with the second gear; and (vii) a fourth gear mounting portion for mounting a fourth gear meshed with the third gear, wherein the third gear is provided at an end of a toner feeding member, provided inside said toner accommodating portion, for feeding the toner accommodated inside said toner accommodating portion, and functions to transmit a rotational driving force to the toner feeding member, and the fourth gear is meshed with a second stirring member gear provided at an end of the second stirring member, wherein said developing device frame is provided with a side plate at a side having said first gear mounting portion, and said side plate is provided with a through hole, through which said third gear extends and engages the toner feeding member to transmit a rotational driving force to the toner feeding member mounted in said toner accommodating portion, wherein said side plate is provided with said second gear mounting portion, said third gear mounting portion, and said fourth gear mounting portion, wherein said developing roller is mounted to said developing roller mounting portion, and the antenna member is mounted to said antenna member mounting portion, and the first gear is mounted to said first gear mounting portion, and the developing blade is mounted to said developing blade mounting portion, and wherein the first, the second, the third, and the fourth gears are mounted to said first, said second, said third, and said fourth gear mounting portions, respectively.

30. A process cartridge according to claim 29, wherein said antenna member mounting portion is provided with an open through which the antenna member is extended from the opposed portion, and the antenna member is mounted to said antenna member mounting portion through said opening.

31. A process cartridge according to claim 29 or 30, wherein said antenna member mounting portion is provided with an engagement opening for engagement with an end of the extended portion, wherein an end of the antenna member is bent into a substantially U-shaped configuration, which extends through the engagement opening to mount to the end to said antenna member mounting portion.

32. A process cartridge according to claim 29, wherein the first gear is meshed with the developing roller gear positioned at said one end of the developing roller and with a stirring member gear positioned at an end of said first stirring member to transmit, to said first stirring member, a rotational driving force transmitted from the developing roller.

33. A process cartridge according to claim 29, further comprising two portions each supporting a seal member, wherein each of said seal members is respectively contacted to said developing roller at each longitudinal end thereof.

34. A process cartridge according to claim 29, further comprising a cleaning member for removing toner remaining on said electrophotographic photosensitive member.

35. An electrophotographic image forming apparatus for forming an image on a recording medium, to which a process cartridge is detachably mountable, said electrophotographic image forming apparatus comprising:

I. mounting means for mounting the process cartridge, the process cartridge including:

a. an electrophotographic photosensitive member;

b. a charging member for charging the electrophotographic photosensitive member;

c. a developing roller for supplying toner to the electrophotographic photosensitive member to develop a latent image formed thereon;

d. a toner accommodating portion for accommodating the toner to be used for development by the toner;

e. a first stirring member for stirring the toner;

f. a second stirring member for stirring the toner; and g. a developing device frame including:

(i) a developing roller mounting portion for mounting said developing roller;

(ii) a developing blade mounting portion for mounting a developing blade for regulating an amount of the toner deposited on a peripheral surface of said developing roller;

(iii) an antenna member mounting portion for mounting, along a longitudinal direction of said developing roller mounted to said developing roller mounting portion, an antenna member having a portion opposed to said developing roller and an extended portion extended from the opposed portion, the extended portion being not opposed to said developing roller, wherein the antenna member produces an electric signal to be transmitted to a detecting element provided in a main assembly of the electrophotographic image forming apparatus to indicate that said process cartridge is mounted to the main assembly of the electrophotographic image forming apparatus;

(iv) a first gear mounting portion for mounting a first gear for transmitting to said first stirring member a rotational driving force for rotating said first stirring member, wherein the first gear is disposed at a same side, in a longitudinal direction of said developing device frame, as a side where the extended portion is extended, and wherein the first gear transmits, to the first stirring member, a rotational driving force received from a developing roller gear provided at one end of said developing roller mounted to said developer roller mounting portion;

(v) a second gear mounting portion for mounting a second gear meshed with the first gear;

(vi) a third gear mounting portion for mounting a third gear meshed with the second gear; and (vii) a fourth gear mounting portion for mounting a fourth gear meshed with the third gear;

wherein the third gear is provided at an end of a toner feeding member, provided inside said toner accommodating portion, for feeding the feeding toner accommodated inside said toner accommodating portion, and functions to transmit a rotational driving force to the toner feeding member, and the fourth gear is meshed with a second stirring member gear provided at an end of the second stirring member, wherein said developing device frame is provided with a side plate at a side having said first gear mounting portion, and said side plate is provided with a through hole, through which said third gear extends and engages the toner feeding member to transmit a rotational driving force to the toner feeding member mounted in said toner accommodating portion, wherein said side plate is provided with said second gear mounting portion, said third gear mounting portion, and said fourth gear mounting portion, wherein said developing roller is mounted to said developing roller mounting portion, and the antenna member is mounted to said antenna member mounting portion, and the first gear is mounted to said first gear mounting portion, and the developing blade is mounted to said developing blade mounting portion, and wherein the second, the third, and the fourth gears are mounted to said second, said third, and said fourth gear mounting portions, respectively; and II. feeding means for feeding a recording material, wherein the detecting element detects that the process cartridge is mounted to the main assembly of the electrophotographic image forming apparatus by receiving an electric signal from the antenna member.

36. A process cartridge detachably mountable to a main assembly of an electrophotographic image forming apparatus, said process cartridge comprising:

a. an electrophotographic photosensitive member;

b. a charging roller for charging said electrophotographic photosensitive member;

c. a developing roller supplying toner to said electrophotographic photosensitive member to develop a latent image formed thereon;

d. a toner accommodating portion for accommodating toner to be used for development by a developing roller;

e. a stirring member for stirring toner; and f. a developing device frame including:

(i) a developing roller mounting portion for mounting the developing roller;

(ii) a developing blade mounting portion for mounting a developing blade for regulating an amount of toner deposited on a peripheral surface of the developing roller;

(iii) an antenna member mounting portion for mounting, along a longitudinal direction of the developing roller, an antenna member having a portion opposed to the developing roller and an extended portion extended from the opposed portion, said extended portion being not opposed to the developing roller, wherein the antenna member produces an electric signal to be transmitted to a detecting element provided in the main assembly of the electrophotographic image forming apparatus to indicate that said process cartridge is mounted to the main assembly of the electrophotographic image forming apparatus;

(iv) a first gear mounting portion for mounting a first gear for transmitting, to said stirring member, a rotational driving force for rotating said stirring member, wherein the first gear is disposed at the same side, in the longitudinal direction of said developing device frame, as a side where the extended portion is extended;

(v) a second gear mounting portion for mounting a second gear meshed with the first gear;

(vi) a third gear mounting portion for mounting a third gear meshed with the second gear; and (vii) a fourth gear mounting portion for mounting a fourth gear meshed with the third gear, wherein the third gear is provided at an end of a toner feeding member, provided inside said toner accommodating portion, for feeding toner accommodated inside said toner accommodating portion, and functions to transmit a rotational driving force to the toner feeding member, and the fourth gear is meshed with a second stirring member gear provided at an end of a second stirring member for stirring toner, wherein said developing device frame is provided with a side plate at a side having said first gear mounting portion, and said side plate is provided with a through hole for transmitting a rotational driving force to the toner feeding member mounted in said toner accommodating portion, wherein said side plate is provided with said second gear mounting portion, said third gear mounting portion, and said fourth gear mounting portion, wherein the developing roller is mounted to said developing roller mounting portion, and the antenna member is mounted to said antenna member mounting portion, and the first gear is mounted to said first gear mounting portion, and the developing blade is mounted to said developing blade mounting portion, wherein the second, third, and fourth gears are mounted to said second, third, and fourth gear mounting portions, respectively, and wherein said antenna member mounting portion is provided with an engagement portion for engagement with an end of the extended portion, wherein the end of the antenna member is bent and is engaged with said engagement portion to mount it to said antenna member mounting portion.

37. A process cartridge to claim 36, wherein the first gear is meshed with a developing roller and with a stirring member gear positioned at an end of said stirring member for transmitting to said stirring member, a rotational driving force transmitted from said developing roller.

38. A process cartridge according to claim 29 or 37, wherein an end cover covers the first gear, the second gear, the third gear, and the fourth gear.

39. A process cartridge according to claim 36, further comprising two portions each supporting a seal member, wherein each of said seal members is respectively contacted to said developing roller at each longitudinal end thereof.

40. A process cartridge according to claim 36, further comprising a cleaning member for removing toner remaining on said electrophotographic photosensitive member.

41. A process cartridge according to claim 36, wherein said engagement portion is a hole.

42. A process cartridge according to claim 11 or 41, wherein an end cover covers the first gear.

43. A process cartridge detachably mountable to a main assembly of an electrophotographic image forming apparatus, said process cartridge comprising:

a. an electrophotographic photosensitive member;

b. a developing roller for supplying toner to said electrophotographic photosensitive member to develop a latent image formed thereon;

c. a toner accommodating portion for accommodating the toner to be used for development by said developing roller;

d. a stirring member for stirring the toner; and e. a developing device frame including:

(i) a developing roller mounting portion for mounting the developing roller;

(ii) an antenna member mounting portion for mounting, along a longitudinal direction of the developing roller, an antenna member having a portion opposed to the developing roller and an extended portion extended from the opposed portion, said extended portion being not opposed to the developing roller, wherein the antenna member produces an electric signal to be transmitted to the main assembly of the electrophotographic image forming apparatus to indicate that said process cartridge is mounted to the main assembly of the electrophotographic image forming apparatus; and (iii) a first gear mounting portion for mounting a first gear for transmitting, to said stirring member, a rotational driving force for rotating said stirring member, wherein the first gear is disposed at the same side, in the longitudinal direction of said developing device frame, as a side where the extended portion is extended, wherein the developing roller is mounted to said developing roller mounting portion, and the antenna member is mounted to said antenna member mounting portion, and the first gear is mounted to said first gear mounting portion, and wherein said antenna member mounting portion is provided with an engagement opening for engagement with an end of the extended portion, wherein an end of the antenna member is bent into a substantially U-shaped configuration, which extends through the engagement opening to mount to the end to said antenna member mounting portion.

44. A process cartridge according to claim 43, wherein said antenna member mounting portion is provided with an opening through which the antenna member is extended from the opposed portion, and the antenna member is mounted to said antenna member mounting portion through said opening.

45. A process cartridge according to claim 43, wherein the first gear is meshed with a developing roller gear positioned at an end of the developing roller and with a stirring member gear positioned at an end of said stirring member for transmitting, to said stirring member, a rotational driving force transmitted from the developing roller.

46. A process cartridge according to claim 43, wherein said developing device frame further comprises:

a second gear mounting portion for mounting a second gear meshed with the first gear;

a third gear mounting portion for mounting a third gear meshed with the second gear; and a fourth gear mounting portion for mounting a fourth gear meshed with the third gear, wherein the third gear is provided at an end of a toner feeding member, provided inside said toner accommodating portion, for feeding toner accommodated inside said toner accommodating portion, and functions to transmit a rotational driving force to said toner feeding member, and the fourth gear is meshed with a second stirring member gear provided at an end of a second stirring member for stirring toner fed from said toner accommodating portion, and wherein the second gear is mounted to said second gear mounting portion, and said third gear is mounted to said third gear mounting portion, and said fourth gear is mounted to said fourth gear mounting portion.

47. A process cartridge according to claim 43, wherein said developing device frame is provided with a side plate at a side having said first gear mounting portion, and said side plate is provided with a through hole, through which a driving force transmitting member gear extends for transmitting a rotational driving force to a toner feeding member mounted in said toner accommodating portion.

48. A process cartridge according to claim 46, wherein said developing device frame is provided with a side plate at a side having said first gear mounting portion, and said side plate is provided with a through hole for transmitting a rotational driving force to the toner feeding member mounted in said toner accommodating portion.

49. A process cartridge according to claim 43, wherein said developing device frame further comprises a developing blade mounting portion for mounting a developing blade for regulating a toner amount deposited on a peripheral surface of the developing roller, and said developing blade is mounted to said developing blade mounting portion.

50. A process cartridge according to claim 47, further comprising two portions each supporting a seal member, wherein each of said seal members is respectively contacted to said developing roller at each longitudinal end thereof.

51. A process cartridge according to claim 43, further comprising a charging member for charging said electrophotographic photosensitive member.

52. A process cartridge according to claim 43 or 51, further comprising a cleaning member for removing toner remaining on said electrophotographic photosensitive member.

53. A process cartridge detachably mountable to a main assembly of an electrophotographic image forming apparatus, said process cartridge comprising:

a. an electrophotographic photosensitive drum;

b. a charging member for charging said electrophotographic photosensitive drum, c. a developing roller for supplying toner to said electrophotographic photosensitive drum to develop a latent image formed thereon;

d. a cleaning member for removing toner remaining on said electrophotographic photosensitive drum;

e. a toner accommodating portion for accommodating the toner to be used for development by said developing roller;

f. a toner feeding member, provided inside said toner accommodating portion, for feeding toner accommodated inside said toner accommodating portion toward said developing roller; and g. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, said extended portion being not opposed to said developing roller, wherein said antenna member produces an electric signal to be transmitted to the main assembly of the electrophotographic image forming apparatus to indicate that said process cartridge is mounted to the main assembly of the electrophotographic image forming apparatus; and (iii) a gear mounting portion for mounting a gear for transmitting, to said toner feeding member, a rotational driving force for rotating said toner feeding member, wherein the gear is disposed at a same side, in the longitudinal direction of said developing device frame, as a side where said extended portion is extended, wherein said antenna member mounting portion is provided with an engagement portion for engagement with a portion of said extended portion, wherein an end of the antenna member is bent, and said portion of the extended portion is engaged with said engagement portion, wherein said developing device frame is provided with a side plate at a same side having said gear mounting portion, and said side plate is provided with a through hole, through which extends the gear provided in said gear mounting portion to transmit a rotational driving force to the toner feeding member mounted in said toner accommodation portion, and said gear mounting portion is provided in said side plate;

said process cartridge further including:

two portions each supporting a seal member, wherein each of said seal members is respectively contacted to said developing roller at each longitudinal end thereof, wherein said developing roller is mounted to said developing roller mounting portion, and said antenna member is mounted to said antenna member mounting portion, and said gear is mounted to said gear mounting portion.

54. A process cartridge according to claim 52 or 53, wherein an end cover covers the gear.

55. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by said developing roller;

f. a toner feeding member, provided inside said toner accommodating portion, for feeding the toner accommodated inside said toner accommodating portion toward said developing roller; and g. a developing device frame including:

(i) a developing roller mounting portion for mounting said developing roller;

(ii) an antenna member mounting portion for mounting, along a longitudinal direction of said developing roller, an antenna member having a portion opposed to said developing roller, and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus; and (iii) a gear mounting portion for mounting a gear for transmitting, to said toner feeding member, a rotational driving force for rotating said toner feeding member, wherein said gear is disposed at a same side, in a longitudinal direction of said developing device frame, as a side where the extended portion is extended, wherein said antenna member mounting portion is provided with an engagement portion for engagement with a portion of the extended portion, wherein an end of the antenna member is bent, and said portion of the extended portion is engaged with said engagement portion, wherein said developing device frame is provided with a side plate at a same side having said gear mounting portion, and said side plate is provided with a through hole, through which the gear provided in said gear mounting portion extends for transmitting a rotational driving force to said toner feeding member mounted in said toner accommodation portion by the gear provided in said gear mounting portion, and said gear mounting portion is provided in said side plate, wherein said developing roller is mounted to said developing roller mounting portion, and the antenna member is mounted to said antenna member mounting portion, and the gear is mounted to said gear mounting portion, and wherein said electrophotographic photosensitive drum, charging member, and cleaning member are supported on a drum frame, which is rotatably coupled with said developing device frame.

56. A process cartridge according to claim 55, wherein an end cover covers the transmitting gear, the toner feeding member gear, and the stirring member gear.

57. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by said developing roller;

f. a toner feeding member, provided inside said toner accommodating portion, for feeding the toner accommodated inside said toner accommodating portion toward said developing roller;

g. a stirring member for stirring the toner fed from said toner accommodating portion by said toner feeding member; and h. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus;

(iii) a transmitting gear mounting portion for mounting a transmitting gear for receiving a rotational driving force from a developing gear provided at one end of said developing roller;

(iv) a toner feeding member gear mounting portion for mounting a toner feeding member gear for transmitting a rotational driving force transmitted by the transmitting gear to said toner feeding member, wherein said toner feeding member gear is provided at one end of said toner feeding member inside said toner accommodating portion; and (v) a stirring member gear mounting portion for mounting a stirring member gear for transmitting a rotational driving force transmitted by the toner feeding member gear to the stirring member, wherein said stirring member gear is provided at one end of the stirring member, wherein said transmitting gear mounting portion, said toner feeding member gear mounting portion, and said stirring member gear mounting portion are disposed at a same side, in a longitudinal direction of said developing device frame, as a side where the extended portion is extended, wherein said developing device frame is provided with a side plate at said same side, and said side plate is provided with a through hole through which the toner feeding member gear extends for transmitting a rotational driving force to said toner feeding member mounted in said toner accommodation portion by the toner feeding member gear provided in said toner feeding member gear mounting portion, and said toner feeding member gear mounting portion is provided in said side plate, wherein said developing roller is mounted to said developing roller mounting portion, and the antenna member is mounted to said antenna member mounting portion, and the transmitting gear is mounted to said antenna member mounting portion, and wherein said electrophotographic photosensitive drum, charging member, and cleaning member are supported on a drum frame, which is rotatably coupled with said developing device frame.

58. A process cartridge according to claim 57, wherein the transmitting gear includes a first transmitting gear and a second transmitting gear, which are mounted to said transmitting gear mounting portion, and the first transmitting gear is in meshing engagement with the developing gear and the second transmitting gear, and wherein the second transmitting gear is in meshing engagement with the toner feeding member gear, and wherein said process cartridge further comprises a third transmitting gear for transmitting a rotational driving force received from the toner feeding member gear to the stirring member gear, wherein said third transmitting gear mounting portion is disposed at a same side, in a longitudinal direction of said developing device frame.

59. A process cartridge according to claim 58, wherein as seen in a longitudinal direction of said developing device frame, the antenna member mounted to said antenna member mounting portion is in a nonoverlapping relation with the first transmitting gear and the second transmitting gear, which are mounted to said transmitting gear mounting portion, the toner feeding member gear mounted to said toner feeding member gear mounting portion, said second transmitting gear mounting portion or the stirring member gear mounted to said stirring member gear mounting portion.

60. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by said developing roller;

f. a toner feeding member, provided inside said toner accommodating portion, for feeding the toner accommodated inside said toner accommodating portion toward said developing roller;

g. a stirring member for stirring the toner fed from said toner accommodating portion by said toner feeding member; and h. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus;

(iii) a toner feeding member gear mounting portion for mounting a toner feeding member gear for transmitting a rotational driving force transmitted by a developing roller gear provided at one end of said developing roller to said toner feeding member, wherein the toner feeding member gear is provided at one end of said toner feeding member; and (iv) a stirring member gear mounting portion for mounting a stirring member gear for transmitting a rotational driving force transmitted by the developing roller gear to the stirring member, wherein the stirring member gear is provided at one end of said stirring member, wherein said toner feeding member gear mounting portion and said stirring gear mounting portion are disposed at a same side, in a longitudinal direction of said developing device frame, as a side where the extended portion is extended, wherein said developing roller is mounted to said developing roller mounting portion, and the antenna member is mounted to said antenna member mounting portion, and the toner feeding member gear is mounted to said toner feeding member gear mounting portion, and the stirring member gear is mounted to said stirring member gear mounting portion, and wherein as seen in a longitudinal direction of said developing device frame, the antenna member mounted to said antenna member mounting portion is in a nonoverlapping relation with the toner feeding member gear mounted to said toner feeding member gear mounting portion and the stirring member gear mounted to said stirring member gear mounting portion, and wherein said electrophotographic photosensitive drum, charging member and cleaning member, are supported on a drum frame, which is rotatably coupled with said developing device frame.

61. A process cartridge according to claim 60, wherein the toner feeding member gear is supplied with a rotational driving force from the developing roller gear through a first transmitting gear and a second transmitting gear, and the stirring member gear is supplied with a rotational driving force from the toner feeding member gear through a third transmitting gear, wherein as seen in a longitudinal direction of said developing device frame, the antenna member mounted to said antenna member mounting portion is in nonoverlapping relation with the toner feeding member gear, the stirring member gear, the first transmitting gear, the second transmitting gear, and the third transmitting gear.

62. A process cartridge according to claim 60, wherein the toner feeding member gear is supplied with a rotational driving force from the developing roller gear through a first transmitting gear and a second transmitting gear, and the stirring member gear is supplied with a rotational driving force from the developing roller gear through the first transmitting gear, wherein as seen in a longitudinal direction of said developing device frame, the antenna member mounted to said antenna member mounting portion is in a nonoverlapping relation with the toner feeding member gear, the stirring member gear, the first transmitting gear and the second transmitting gear.

63. A process cartridge according to claim 59 or 62, wherein an end cover covers the toner feeding member gear and the stirring member gear.

64. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by said developing roller;

f. a toner feeding member, provided inside said toner accommodating portion, for feeding the toner accommodated inside said toner accommodating portion toward said developing roller;

g. a stirring member for stirring toner fed from said toner accommodating portion by said toner feeding member; and h. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus;

(iii) a toner feeding member gear mounting portion for mounting a toner feeding member gear for transmitting a rotational driving force transmitted by a developing roller gear provided at one end of said developing roller to said toner feeding member, wherein the toner feeding member gear is provided at one end of said toner feeding member; and (iv) a stirring member gear mounting portion for mounting a stirring member gear for transmitting a rotational driving force transmitted by the developing roller gear to the stirring member gear, wherein the stirring member gear is provided at one end of said stirring member, wherein said toner feeding member gear mounting portion and said stirring member gear mounting portion are disposed at a same side, in a longitudinal direction of said developing device frame, as a side where the extended portion is extended, wherein said developing roller is mounted to said developing roller mounting portion, and the antenna member is mounted to said antenna member mounting portion, and the toner feeding member gear is mounted to the toner feeding member gear mounting portion, and the stirring member gear is mounted to said stirring member gear mounting portion, wherein said antenna member mounting portion is provided with an opening, through which the extended portion and the antenna member is mounted to said antenna member mounting portion through the opening, which is disposed at a same side in the longitudinal direction of said developing device frame, and wherein said electrophotographic photosensitive drum, changing member, and cleaning member are supported on a drum frame, which is rotatably coupled with said developing device frame.

65. A process cartridge according to claim 64, wherein the toner feeding member gear is supplied with a rotational driving force from the developing roller gear through a first transmitting gear and a second transmitting gear, and the stirring member gear is supplied with a rotational driving force from the toner feeding member gear through a third transmitting gear, wherein as seen in a longitudinal direction of said developing device frame, the antenna member mounted to said antenna member mounting portion is in a nonoverlapping relation with the toner feeding member gear, the stirring member gear, the first transmitting gear, the second transmitting gear and the third transmitting gear.

66. A process cartridge according to claim 64, wherein the toner feeding member gear is supplied with a rotational driving force from the developing roller gear through a first transmitting gear and a second transmitting gear, and the stirring member gear is supplied with a rotational driving force from the developing roller gear through the first transmitting gear, wherein as seen in a longitudinal direction of said developing device frame, the antenna member mounted to said antenna member mounting portion is in a nonoverlapping relation with the toner feeding member gear, the stirring member gear, the first transmitting gear, and the second transmitting gear.

67. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by a developing roller;

f. a toner feeding member, provided inside said toner accommodating portion, for feeding the toner accommodated inside said toner accommodating portion toward said developing roller;

g. a stirring member for stirring toner fed from said toner accommodating portion by said toner feeding member; and h. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus;

(iii) a toner feeding member gear mounting portion for mounting a toner feeding member gear for transmitting a rotational driving force transmitted by a developing roller gear provided at one end of said developing roller to said toner feeding member, wherein the toner feeding member gear is provided at one end of said toner feeding member; and (iv) a stirring member gear mounting portion for mounting a stirring member gear for transmitting a rotational driving force transmitted by the developing roller gear to said stirring member, wherein the stirring member gear is provided at one end of said stirring member, wherein said toner feeding member gear mounting portion and said stirring member gear mounting portion are disposed at a same side, in a longitudinal direction of said developing device frame, as a side where the extended portion is extended, wherein said developing roller is mounted to said developing roller mounting portion, and the antenna member is mounted to said antenna member mounting portion, and the toner feeding member gear is mounted to said toner feeding member gear mounting portion, and the stirring member gear is mounted to said stirring member gear mounting portion, wherein said developing device frame is provided with an end cover at a same side, in the longitudinal direction of said developing device frame, and said end cover is provided with a developing bias contact for receiving a developing bias voltage to be supplied to said developing roller and a detecting contact for transmitting an electric signal produced by the antenna member to the main assembly of the eeectrophotograph image forming apparatus, when said process cartridge is mounted to the main assembly of the electrophotographic image forming apparatus, wherein said developing bias contact is electrically connected with said developing roller, and said detecting contact is electrically connected with the antenna member, and wherein said end cover covers the toner feeding member gear and the stirring member gear, and wherein said electrophotographic photosensitive drum, charging member, and cleaning member are supported on a drum frame, which is rotatably coupled with said developing device frame.

68. A process cartridge according to claim 67, wherein the toner feeding member gear is supplied with a rotational driving force from the developing roller gear through a first transmitting gear and a second transmitting gear, and the stirring member gear is supplied with a rotational driving force from the toner feeding member gear through a third transmitting gear, wherein as seen in a longitudinal direction of said developing device frame, the antenna member mounted to said antenna member mounting portion is in a nonoverlapping relation with the toner feeding member gear, the stirring member gear, the first transmitting gear, the second transmitting gear, and the third transmitting gear.

69. A process cartridge according to claim 67, wherein the toner feeding member gear is supplied with a rotational driving force from the developing roller gear through a first transmitting gear and a second transmitting gear, and the stirring member gear is supplied with a rotational driving force from the developing roller gear through the first transmitting gear, wherein as seen in a longitudinal direction of the developing device frame, the antenna member mounted to said antenna member mounting portion is in a nonoverlapping relation with the toner feeding member gear, the stirring member gear, the first transmitting gear, and the second transmitting gear.

70. A process cartridge detachably mountable to a main assembly of an electrophotographic image forming apparatus, said process cartridge comprising:

a. an electrophotographic photosensitive drum;

b. a charging member for charging said electrophotographic photosensitive drum;

c. a developing roller for supplying toner to said electrophotographic photosensitive drum to develop a latent image formed thereon;

d. a cleaning member for removing the toner remaining on said electrophotographic photosensitive drum;

e. a toner accommodating portion for accommodating the toner to be used for development by said developing roller;

f. a toner feeding member, provided inside said toner accommodating portion, for feeding the toner accommodated inside said toner accommodating portion toward said developing roller;

g. a stirring member for stirring the toner fed from said toner accommodating portion by said toner feeding member; and h. a developing device frame including:

(i) a developing roller mounting portion for mounting said developing roller;

(ii) an antenna member mounting portion for mounting, along a longitudinal direction of said developing roller, an antenna member having a portion opposed to said developing roller and an extended portion extended from the opposed portion, the extended portion being not opposed to said developing roller, wherein the antenna member produces an electric signal to be transmitted to the main assembly of the electrophotographic image forming apparatus to indicate that said process cartridge is mounted to the main assembly of the electrophotographic image forming apparatus;

(iii) a transmitting gear mounting portion for mounting a transmitting gear for receiving a rotational driving force from a developing gear provided at one end of said developing roller;

(iv) a toner feeding member gear mounting portion for mounting a toner feeding member gear for transmitting a rotational driving force transmitted by the transmitting gear to said toner feeding member, wherein the toner feeding member gear is provided at one end of said toner feeding member; and (v) a stirring member gear mounting portion for mounting a stirring member gear for transmitting a rotational driving force transmitted by the toner feeding member gear to the stirring member, wherein said stirring member gear is provided at one end of said stirring member, wherein the transmitting gear mounting portion, said toner feeding member gear mounting portion, and said stirring member gear mounting portion are disposed at a same side, in a longitudinal direction of said developing device frame, as a side where the extended portion is extended, wherein said developing device frame is provided with a side plate at said same side, and said side plate is provided with a through hole, through which the toner feeding member gear extends for transmitting a rotating force to the toner feeding member mounted in said toner accommodation portion by the toner feeding member gear provided in said toner feeding member gear mounting portion, and said toner feeding member gear mounting portion is provided in said side plate, wherein said developing roller is mounted to said developing roller mounting portion, and the antenna member is mounted to said antenna member mounting portion, the transmitting gear is mounted to said transmitting gear mounting portion, the toner feeding member gear is mounted to said toner feeding member gear mounting portion, and the stirring member gear is mounted to said stirring member gear mounting portion, wherein said antenna member mounting portion is provided with an engagement portion for engagement with an end of the extended portion, and the end of the extended portion is engaged with said engagement portion, wherein as seen in a longitudinal direction of said developing device frame, the antenna member mounted to said antenna member mounting portion is in nonoverlapping relation with the transmitting gear mounted to said transmitting gear mounting portion, the toner feeding member gear mounted to said toner feeding member gear mounting portions and the stirring member gear mounted to said stirring member gear mounting portion, wherein said antenna member mounting portion is provided with an opening, through which the extended portion and the antenna member is mounted to said antenna member mounting portion through the opening, which is disposed at said same side in the longitudinal direction of said developing device frame, wherein said developing device frame is provided with an end cover at a same side, in the longitudinal direction of said developing device frame, and said end cover is provided with a developing bias contact for receiving a developing bias voltage to be supplied to said developing roller and a detecting contact for transmitting the electric signal produced by the antenna member to the main assembly of the electrophotograph image forming apparatus, when said process cartridge is mounted to the main assembly of the electrophotographic image forming apparatus, and wherein said developing bias contact is electrically connected with the developing roller, and said detecting contact is electrically connected with the antenna member, and wherein said end cover covers the transmitting gear, the toner feeding member gear, and the stirring member gear, and wherein said electrophotographic photosensitive drum, charging member, and cleaning member are supported on a drum frame, which is rotatably coupled with said developing device frame.

71. A process cartridge according to claim 70, wherein the transmitting gear includes a first transmitting gear, and a second transmitting gear which are mounted to said transmitting gear mounting portion, and the first transmitting gear is in meshing engagement with the developing gear and the second transmitting gear, wherein the second transmitting gear is in meshing engagement with the toner feeding member gear, wherein said process cartridge further comprises a third transmitting gear mounting portion for mounting a third transmitting gear for transmitting a rotational driving force for transmitting a rotational driving force received from the toner feeding member gear to the stirring member gear, and wherein the third transmitting gear mounting portion is disposed at a same side, in a longitudinal direction of said developing device frame.

72. A process cartridge according to claim 71, wherein as seen in a longitudinal direction of said developing device frame, the antenna member mounted to said antenna member mounting portion is in nonoverlapping relation with the first transmitting gear, the second transmitting gear, the toner feeding member gear, and the stirring member gear.

73. A process cartridge according to claim 55, 57, 60, 64, or 67, wherein said antenna member mounting portion is provided with an engagement portion for engagement with a portion of the extended portion, and wherein an end of the antenna member is bent, and the portion of the extended portion is engaged with the engagement portion.

74. A process cartridge according to claim 55, 57, 60, or 67, wherein said antenna member mounting portion is provided with an opening, wherein the antenna member is mounted to said antenna member mounting portion through said opening, and wherein said opening is disposed at a same side in a longitudinal direction of said developing device frame.

75. A process cartridge according to claim 53, 55, 57, 60, 64, or 67, wherein said developing device frame is provided with an end cover at a same side, in a longitudinal direction of said developing device frame, and said end cover is provided with a developing bias contact for receiving a developing bias voltage to be supplied to said developing roller and a detecting contact for transmitting an electric signal produced by the antenna member to the main assembly of the electrophotographic image forming apparatus, when said process cartridge is mounted to the main assembly of the electrophotographic image forming apparatus, wherein said developing bias contact is electrically connected with said developing roller, wherein said detecting contact is electrically connected with the antenna member, and wherein said end cover covers said toner feeding member gear and the stirring member gear, and wherein said electrophotographic photosensitive drum, said charging member, and cleaning member are supported on a drum frame, which is rotatably coupled with said developing device frame.

* * * * *

UNITED STATES PATENT AND TRADEMARK OFFICE

CERTIFICATE OF CORRECTION

PATENT NO. : 6,169,865 B1
DATED : January 2, 2001
INVENTOR(S) : Shigeo Miyabe et al.

It is certified that error appears in the above-identified patent and that said Letters Patent is hereby corrected as shown below:

Drawings,
Insert attached Figure 34.

Column 14,
Line 60, "10 mm.) The" should read -- 10 mm). The --.

Column 16,
Line 7, "Further,the" should read -- Further, the --; and
Line 63, "31B at" should read -- 31B, at --.

Column 20,
Line 9, "12i2 ." should read -- 12i2. --;
Line 13, "holes 12i2" should read -- holes 12i2. --; and
Line 14, ". Also" should read -- Also --.

Column 23,
Line 4, "effeciency" should read -- efficiency --;
Line 24, "121n" should read -- 12n --.

Column 25,
Line 35, "with th" should read -- with the --.

Column 28,
Line 61, "9h." should read -- 9h, --; and
Line 64, "FIG. 9B)," should read -- FIG. 9B, --.

Column 29,
Line 41, "19A, and" should read -- 19A and --.

Column 30,
Line 41, "19B , and" should read -- 19B, and --; and
Line 61, "depicts" should read -- depict --.

Column 31,
Line 34, "14. the" should read -- 14, the --.

CERTIFICATE OF CORRECTION

PATENT NO. : 6,169,865 B1 
DATED : January 2, 2001
INVENTOR(S) : Shigeo Miyabe et al.

It is certified that error appears in the above-identified patent and that said Letters Patent is hereby corrected as shown below:

Column 33,
Line 10, "type, (charging" should read -- type (charging --.

Column 43,
Line 22, "transmitting to" should read -- transmitting, to --; and
Line 36, "claim 11 or 41," should read -- claim 11 or 43, --.

Column 45,
Line 17, "drum," should read -- drum; --.

Column 46,
Line 10, "claim 52 or 53," should read -- claim 53 or 55, --.

Column 47,
Line 9, "claim 55," should read -- claim 57, --.

Column 50,
Line 8, "claim 59 or 62," should read -- claim 60 or 64, --.

Column 52,
Line 44, "eeectrophotograph" should read -- electrophotograph --.

Signed and Sealed this

Seventh Day of October, 2003

JAMES E. ROGAN
*Director of the United States Patent and Trademark Office*